(12) United States Patent
Yerramalli et al.

(10) Patent No.: US 11,051,175 B2
(45) Date of Patent: Jun. 29, 2021

(54) UPLINK TRANSMISSION TECHNIQUES IN SHARED SPECTRUM WIRELESS COMMUNICATIONS

(71) Applicant: QUALCOMM Incorporated, San Diego, CA (US)

(72) Inventors: Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 16/104,030

(22) Filed: Aug. 16, 2018

(65) Prior Publication Data

US 2019/0059001 A1 Feb. 21, 2019

Related U.S. Application Data

(60) Provisional application No. 62/547,735, filed on Aug. 18, 2017.

(51) Int. Cl.
*H04W 16/14* (2009.01)
*H04L 5/00* (2006.01)
(Continued)

(52) U.S. Cl.
CPC ............ *H04W 16/14* (2013.01); *H04L 1/0073* (2013.01); *H04L 1/1822* (2013.01);
(Continued)

(58) Field of Classification Search
CPC ............. H04W 16/14; H04W 72/0413; H04W 72/1268; H04W 74/0808; H04W 74/008;
(Continued)

(56) References Cited

U.S. PATENT DOCUMENTS

2012/0014269 A1 1/2012 Ray et al.
2013/0286904 A1* 10/2013 Xu .................. H04L 5/1469
370/280

(Continued)

FOREIGN PATENT DOCUMENTS

WO WO-2018090861 A1 5/2018
WO WO-2018144976 A2 8/2018

OTHER PUBLICATIONS

Institute for Information Industry (III): "On eMBB and URLLC Multiplexing in Uplink", 3GPP Draft; R1-1702295 on EMBB and URLLC Multiplexing in Uplink, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), pp. 1-6, XP051209449, Retrieved from the Internet: URL: http://www.3gpp.org/ftp/Meetings_3GPP_SYNC/RAN1/Docs/ [retrieved on Feb. 12, 2017].

(Continued)

*Primary Examiner* — Gregory B Sefcheck
*Assistant Examiner* — Joshua Smith
(74) *Attorney, Agent, or Firm* — Qualcomm Incorporated

(57) ABSTRACT

Methods, systems, and devices for wireless communication are described. The described techniques provide for transmission of uplink data from a user equipment (UE) in the absence of scheduled uplink resources for the uplink data transmission that are allocated to the UE prior to the transmission of the uplink data. Various examples provide uplink configurations that may be used for unscheduled uplink transmissions of a UE, which may be selected dynamically or semi-statically. Unscheduled uplink transmissions may be transmitted in shared radio frequency spectrum according to one or more frame structures, and access to the shared radio frequency spectrum may be determined based on a priority of an operator associated (Continued)

with a UE for accessing the spectrum. Beamforming techniques may be used for transmissions and beam widths may be selected based on the information in a transmission, an operator priority for use of shared radio frequency spectrum, or any combination thereof.

30 Claims, 31 Drawing Sheets

(51) Int. Cl.
| | | |
|---|---|---|
| *H04L 1/18* | (2006.01) | |
| *H04L 1/00* | (2006.01) | |
| *H04W 72/04* | (2009.01) | |
| *H04W 72/12* | (2009.01) | |
| *H04W 74/08* | (2009.01) | |
| *H04B 7/0413* | (2017.01) | |
| *H04B 7/06* | (2006.01) | |
| *H04W 74/00* | (2009.01) | |

(52) U.S. Cl.
CPC .......... *H04L 1/1864* (2013.01); *H04L 5/0042* (2013.01); *H04L 5/0053* (2013.01); *H04L 5/0094* (2013.01); *H04L 5/0096* (2013.01); *H04W 72/0413* (2013.01); *H04W 72/1268* (2013.01); *H04W 74/0808* (2013.01); *H04B 7/0413* (2013.01); *H04B 7/0617* (2013.01); *H04L 5/0007* (2013.01); *H04L 5/0064* (2013.01); *H04W 74/008* (2013.01)

(58) Field of Classification Search
CPC .... H04W 74/08; H04L 5/0053; H04L 5/0096; H04L 1/1822; H04L 1/1864; H04L 5/0042; H04L 5/0094; H04L 1/0073; H04L 5/0007; H04L 5/0064; H04L 1/1854; H04L 1/1896; H04B 7/0413; H04B 7/0617
See application file for complete search history.

(56) References Cited

U.S. PATENT DOCUMENTS

| | | | | |
|---|---|---|---|---|
| 2016/0143006 | A1* | 5/2016 | Ghosh | H04W 74/004 370/329 |
| 2016/0330011 | A1* | 11/2016 | Lee | H04L 5/006 |
| 2017/0257850 | A1* | 9/2017 | Oh | H04W 72/042 |
| 2017/0272220 | A1* | 9/2017 | Chen | H04L 5/0035 |
| 2017/0347322 | A1* | 11/2017 | Lee | H04L 5/0007 |
| 2017/0366311 | A1* | 12/2017 | Iyer | H04L 5/005 |
| 2018/0049236 | A1* | 2/2018 | Sun | H04W 72/14 |
| 2018/0084486 | A1* | 3/2018 | Pradas | H04W 24/10 |
| 2018/0115983 | A1* | 4/2018 | Harada | H04W 24/10 |
| 2019/0037596 | A1 | 1/2019 | Liu et al. | |
| 2019/0097693 | A1* | 3/2019 | Park | H04L 5/0023 |

OTHER PUBLICATIONS

Intel Corporation: "Uplink Grant Free Transmission for URLLC Services", 3GPP Draft; R1-1702242 Intel-URLLC_UL_GF, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), pp. 1-7, XP051209400, Retrieved from the Internet: URL: http://www.3gpp.org/ftp/Meetings_3GPP_SYNC/RAN1/Docs/ [retrieved on Feb. 12, 2017].

Intel Corporation: "Uplink URLLC Transmission Without Grant", 3GPP Draft; R1-1701206 Intel—UL GF URLLC_Revision, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 18, 2017, 10 Pages, XP051222250, Retrieved from the Internet: URL: http://www.3gpp.org/ftp/tsg_ran/WG1_RL1/TSGR1_AH/NR_AH_1701/Docs/ [retrieved on Jan. 18, 2017].

International Search Report and Written Opinion—PCT/US2018/046920—ISA/EPO—dated Nov. 30, 2018 (175960WO).

LG Electronics: "Discussion on Grant-Based and Grant-Free UL Transmissions for Latency Reduction", 3GPP Draft; R1-1702490 Discussion on Grant-Based and Grant-Free UL Transmissions for Latency Reduction, 3rd Generation Partnership Project (3GPP), Mobile Competence Centre; 650, Route Des Lucioles; vol. RAN WG1, No. Athens, Greece; Feb. 13, 2017-Feb. 17, 2017 Feb. 12, 2017 (Feb. 12, 2017), 9 Pages, XP051209644, Retrieved from the Internet: URL: http://www.3gpp.org/ftp/Meetings_3GPP_SYNC/RAN1/Docs/ [retrieved on Feb. 12, 2017].

* cited by examiner

UPLINK TRANSMISSION TECHNIQUES IN SHARED SPECTRUM WIRELESS COMMUNICATIONS

CROSS REFERENCES

The present Application for Patent claims the benefit of U.S. Provisional Patent Application No. 62/547,735 by YERRAMALLI, et al., entitled "UPLINK TRANSMISSION TECHNIQUES IN SHARED SPECTRUM WIRELESS COMMUNICATIONS," filed Aug. 18, 2018, assigned to the assignee hereof, and expressly incorporated herein.

BACKGROUND

The following relates generally to wireless communication, and more specifically to uplink transmission techniques in shared spectrum wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

SUMMARY

The described techniques relate to improved methods, systems, devices, or apparatuses that support uplink transmission techniques in shared spectrum wireless communications. Generally, the described techniques provide for transmission of uplink data from a user equipment (UE) in the absence of scheduled uplink resources for the uplink data transmission that are allocated to the UE prior to the transmission of the uplink data. Various examples provide frame structures that may be used for unscheduled uplink transmissions of a UE. In some cases, a base station may configure a UE with two or more configurations (e.g., through radio resource control (RRC) signaling) for uplink transmissions, and may dynamically indicate (e.g., via downlink control information (DCI)) which configuration is to be used for one or more particular uplink transmissions. In some cases, unscheduled uplink transmissions may be transmitted in shared radio frequency spectrum. In some cases, access to the shared radio frequency spectrum may be determined based on a priority of an operator associated with a UE for accessing the spectrum. In some cases, beamforming techniques may be used for uplink and downlink transmissions and beam widths for beamformed transmissions may be selected based on the information transmitted in a transmission, a dynamic indication of an uplink transmission configuration, an operator priority for use of shared radio frequency spectrum, or any combination thereof.

A method of wireless communication is described. The method may include receiving, at a user equipment (UE), a plurality of uplink configurations from a base station, the plurality of uplink configurations for unscheduled uplink transmissions from the UE to the base station, receiving, at the UE, a dynamic indication of a first uplink configuration of the plurality of uplink configurations to be used for a first unscheduled uplink transmission from the UE to the base station, and transmitting the first unscheduled uplink transmission using the first uplink configuration.

An apparatus for wireless communication is described. The apparatus may include means for receiving, at a user equipment (UE), a plurality of uplink configurations from a base station, the plurality of uplink configurations for unscheduled uplink transmissions from the UE to the base station, means for receiving, at the UE, a dynamic indication of a first uplink configuration of the plurality of uplink configurations to be used for a first unscheduled uplink transmission from the UE to the base station, and means for transmitting the first unscheduled uplink transmission using the first uplink configuration.

Another apparatus for wireless communication is described. The apparatus may include a processor, memory in electronic communication with the processor, and instructions stored in the memory. The instructions may be operable to cause the processor to receive, at a user equipment (UE), a plurality of uplink configurations from a base station, the plurality of uplink configurations for unscheduled uplink transmissions from the UE to the base station, receive, at the UE, a dynamic indication of a first uplink configuration of the plurality of uplink configurations to be used for a first unscheduled uplink transmission from the UE to the base station, and transmit the first unscheduled uplink transmission using the first uplink configuration.

A non-transitory computer readable medium for wireless communication is described. The non-transitory computer-readable medium may include instructions operable to cause a processor to receive, at a user equipment (UE), a plurality of uplink configurations from a base station, the plurality of uplink configurations for unscheduled uplink transmissions from the UE to the base station, receive, at the UE, a dynamic indication of a first uplink configuration of the plurality of uplink configurations to be used for a first unscheduled uplink transmission from the UE to the base station, and transmit the first unscheduled uplink transmission using the first uplink configuration.

In some examples of the method, apparatus, and non-transitory computer-readable medium described above, the receiving the plurality of uplink configurations comprises: receiving radio resource control (RRC) signaling from the base station that includes the plurality of uplink configurations.

In some examples of the method, apparatus, and non-transitory computer-readable medium described above, the receiving the dynamic indication of the first uplink configuration comprises: receiving downlink control information (DCI) or a medium access control (MAC) control element (MAC-CE) from the base station that indicates the first uplink configuration may be to be used for the first unscheduled uplink transmission.

In some examples of the method, apparatus, and non-transitory computer-readable medium described above, each uplink configuration of the plurality of uplink configurations comprises one or more parameters associated with an unscheduled uplink transmission, the one or more parameters including one or more of: a number of transport blocks (TBs) to be carried in each unscheduled uplink transmission according to the uplink configuration, a scheduling set size that indicates a size of each unscheduled uplink transmission according to the uplink configuration, an interlace allocation for each unscheduled uplink transmission according to the uplink configuration, a number of configured hybrid acknowledgment repeat request (HARQ) processes for the number of TBs to be carried in each unscheduled uplink transmission according to the uplink configuration, an acknowledgment/negative-acknowledgment (ACK/NACK) bundling scheme for each unscheduled uplink transmission according to the uplink configuration, a rank indication for each unscheduled uplink transmission according to the uplink configuration, a scaling factor to be used to determine uplink control information (UCI) resources for each unscheduled uplink transmission according to the uplink configuration, the scaling factor based at least in part on the rank indication and number of TBs, a demodulation reference signal (DMRS) configuration for each unscheduled uplink transmission according to the uplink configuration, a number of repetitions for each unscheduled uplink transmission according to the uplink configuration, or any combination thereof.

In some examples of the method, apparatus, and non-transitory computer-readable medium described above, each of the plurality of uplink configurations includes an identification index number, and wherein the dynamic indication includes the identification index number of the first uplink configuration.

In some examples of the method, apparatus, and non-transitory computer-readable medium described above, the dynamic indication of a first uplink configuration of the plurality of uplink configurations may be used for a plurality of unscheduled uplink transmissions from the UE to the base station until a second dynamic indication indicates a different uplink configuration may be to be used for uplink transmissions.

In some examples of the method, apparatus, and non-transitory computer-readable medium described above, the transmitting comprises identifying, at the UE, wireless resources within a shared radio frequency spectrum band that may be available for unscheduled uplink transmissions, determining that at least a portion of the identified wireless resources may be available for the first unscheduled uplink transmission, and transmitting the first unscheduled uplink transmission based at least in part on the determining.

In some examples of the method, apparatus, and non-transitory computer-readable medium described above, the determining comprises: performing a listen-before-talk (LBT) procedure at the UE to determine availability of at least the portion of the identified wireless resources for the first unscheduled uplink transmission.

In some examples of the method, apparatus, and non-transitory computer-readable medium described above, the identifying comprises receiving a first downlink transmission in a first portion of a self-contained radio subframe that indicates that a second portion of the self-contained radio subframe may be available for the unscheduled uplink transmission, and wherein the first downlink transmission includes the dynamic indication of the first uplink configuration of the plurality of uplink configurations.

Some examples of the method, apparatus, and non-transitory computer-readable medium described above may further include processes, features, means, or instructions for receiving, subsequent to transmitting the first unscheduled uplink transmission, an acknowledgment indicating successful or unsuccessful receipt of the first unscheduled uplink transmission at the base station.

A method of wireless communication is described. The method may include configuring a user equipment (UE) with a plurality of uplink configurations, the plurality of uplink configurations for unscheduled uplink transmissions from the UE to a base station, identifying wireless resources that are available for unscheduled uplink transmissions, transmitting, to the UE, an indication of the identified wireless resources that are available for unscheduled uplink transmissions and a first uplink configuration of the plurality of uplink configurations to be used for unscheduled uplink transmissions using the identified wireless resources, and monitoring the identified wireless resources for a first unscheduled uplink transmission from the UE.

An apparatus for wireless communication is described. The apparatus may include means for configuring a user equipment (UE) with a plurality of uplink configurations, the plurality of uplink configurations for unscheduled uplink transmissions from the UE to a base station, means for identifying wireless resources that are available for unscheduled uplink transmissions, means for transmitting, to the UE, an indication of the identified wireless resources that are available for unscheduled uplink transmissions and a first uplink configuration of the plurality of uplink configurations to be used for unscheduled uplink transmissions using the identified wireless resources, and means for monitoring the identified wireless resources for a first unscheduled uplink transmission from the UE.

Another apparatus for wireless communication is described. The apparatus may include a processor, memory in electronic communication with the processor, and instructions stored in the memory. The instructions may be operable to cause the processor to configure a user equipment (UE) with a plurality of uplink configurations, the plurality of uplink configurations for unscheduled uplink transmissions from the UE to a base station, identify wireless resources that are available for unscheduled uplink transmissions, transmit, to the UE, an indication of the identified wireless resources that are available for unscheduled uplink transmissions and a first uplink configuration of the plurality of uplink configurations to be used for unscheduled uplink transmissions using the identified wireless resources, and monitor the identified wireless resources for a first unscheduled uplink transmission from the UE.

A non-transitory computer readable medium for wireless communication is described. The non-transitory computer-readable medium may include instructions operable to cause a processor to configure a user equipment (UE) with a plurality of uplink configurations, the plurality of uplink configurations for unscheduled uplink transmissions from the UE to a base station, identify wireless resources that are available for unscheduled uplink transmissions, transmit, to the UE, an indication of the identified wireless resources that are available for unscheduled uplink transmissions and a first uplink configuration of the plurality of uplink configurations to be used for unscheduled uplink transmissions using the identified wireless resources, and monitor the identified wireless resources for a first unscheduled uplink transmission from the UE.

In some examples of the method, apparatus, and non-transitory computer-readable medium described above, the configuring the UE with the plurality of uplink configurations comprises: transmitting radio resource control (RRC) signaling to the UE that includes the plurality of uplink configurations.

In some examples of the method, apparatus, and non-transitory computer-readable medium described above, the transmitting the indication of the identified wireless resources and the first uplink configuration comprises: transmitting downlink control information (DCI) or a MAC-CE to the UE that indicates the first uplink configuration may be to be used for unscheduled uplink transmissions in the identified wireless resources.

In some examples of the method, apparatus, and non-transitory computer-readable medium described above, each uplink configuration of the plurality of uplink configurations comprises one or more parameters associated with an unscheduled uplink transmission, the one or more parameters including one or more of: a number of transport blocks (TBs) to be carried in each unscheduled uplink transmission according to the uplink configuration, a scheduling set size that indicates a size of each unscheduled uplink transmission according to the uplink configuration, an interlace allocation for each unscheduled uplink transmission according to the uplink configuration, a number of configured hybrid acknowledgment repeat request (HARQ) processes for the number of TBs to be carried in each unscheduled uplink transmission according to the uplink configuration, an acknowledgment/negative-acknowledgment (ACK/NACK) bundling scheme for each unscheduled uplink transmission according to the uplink configuration, a rank indication for each unscheduled uplink transmission according to the uplink configuration, a scaling factor to be used to determine uplink control information (UCI) resources for each unscheduled uplink transmission according to the uplink configuration, the scaling factor based at least in part on the rank indication and number of TBs, a demodulation reference signal (DMRS) configuration for each unscheduled uplink transmission according to the uplink configuration, a number of repetitions for each unscheduled uplink transmission according to the uplink configuration, or any combination thereof.

In some examples of the method, apparatus, and non-transitory computer-readable medium described above, each of the plurality of uplink configurations includes an identification index number, and wherein the indication of the first uplink configuration includes the identification index number of the first uplink configuration.

In some examples of the method, apparatus, and non-transitory computer-readable medium described above, the identified wireless resources may be wireless resources within a shared radio frequency spectrum band.

Some examples of the method, apparatus, and non-transitory computer-readable medium described above may further include processes, features, means, or instructions for receiving a first unscheduled uplink transmission from the UE according to the first uplink configuration. Some examples of the method, apparatus, and non-transitory computer-readable medium described above may further include processes, features, means, or instructions for determining whether information contained in the first unscheduled uplink transmission may be successfully decoded at the base station. Some examples of the method, apparatus, and non-transitory computer-readable medium described above may further include processes, features, means, or instructions for transmitting a downlink transmission that includes an acknowledgment/negative-acknowledgment (ACK/NACK) indicating successful or unsuccessful receipt of the first unscheduled uplink transmission at the base station.

DETAILED DESCRIPTION

Figure 1:
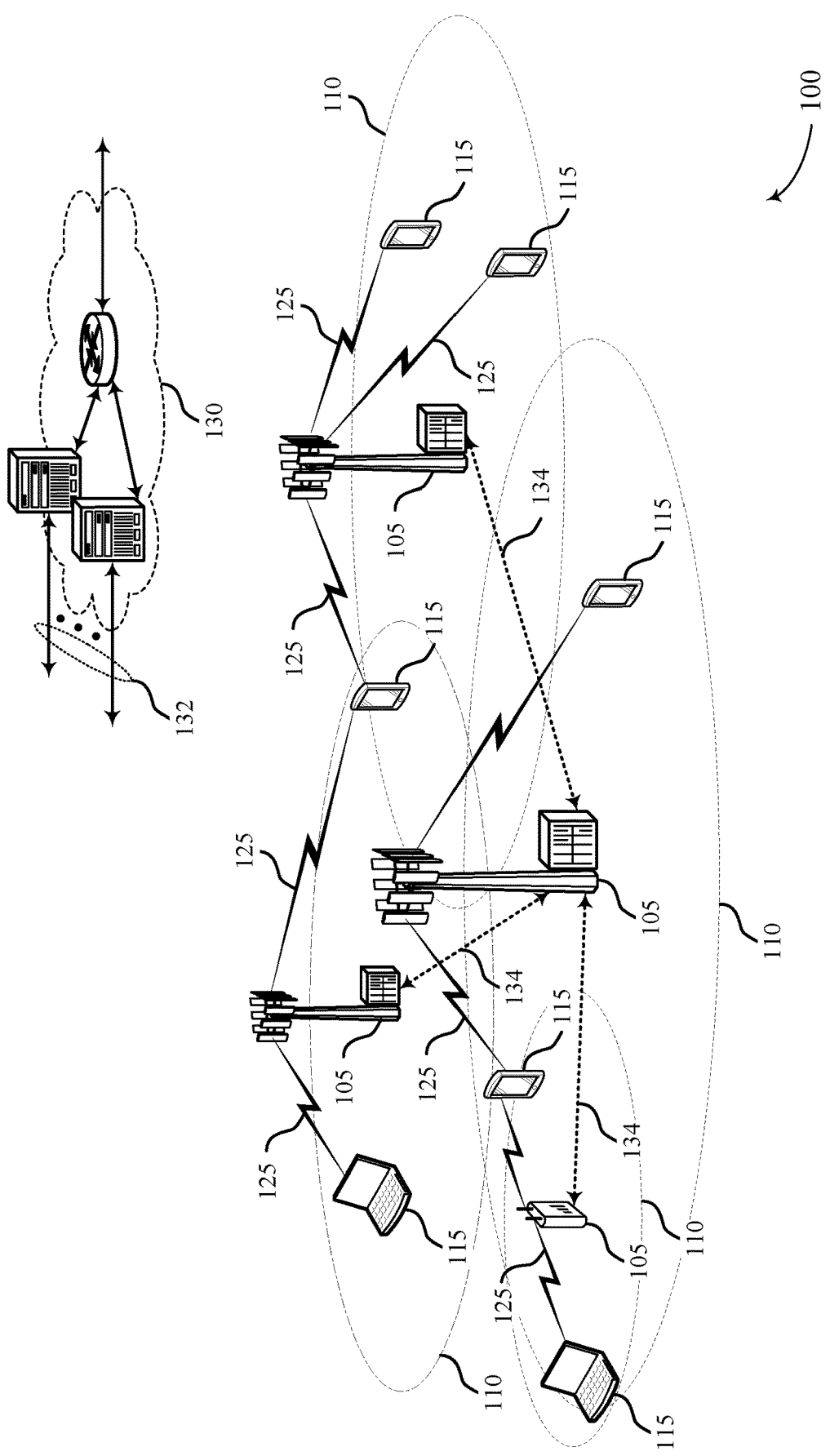
FIG. 1 illustrates an example of a system for wireless communication that supports uplink transmission techniques in shared spectrum wireless communications in accordance with aspects of the present disclosure.

In some wireless communications networks, a base station may provide scheduling information to UEs. The UEs may use the scheduling information to determine when they may transmit on an uplink channel to the base station. In some cases, a UE may request uplink resources and provide a buffer status report (BSR) that indicates an amount of data in a UE buffer that is to be transmitted. A base station may use such information to schedule uplink resources for the UE and may communicate the scheduled uplink resources to the UE. In networks that use shared radio frequency spectrum, contention-based transmissions may be utilized in which a listen-before-talk (LBT) procedure may be performed to verify that the radio frequency spectrum is not being used by another transmitter. Such contention-based access may mean that the uplink resources for an uplink transmission may be uncertain, depending upon whether the shared radio frequency spectrum is available for transmissions. Furthermore, a scheduling request from a UE may also be dependent upon availability of the shared radio frequency spectrum, and in cases where a number of transmitters are using the shared radio frequency spectrum there may be delays between the arrival of uplink data in a buffer at a UE and an actual uplink transmission containing the data. Thus, techniques such as provided herein may allow unscheduled uplink transmissions by a UE in which uplink data may be transmitted in the absence of specific scheduled resources from a base station, which may help to enhance network efficiency and reduce latency between arrival and transmission of uplink data.

Various techniques discussed herein provide a UE with uplink configurations, indications of a preconfigured uplink configuration to use for one or more unscheduled uplink transmissions, frame structures that may be used for unscheduled uplink transmissions, or any combination thereof. In some cases, a base station may configure a UE with two or more configurations (e.g., through radio resource control (RRC) signaling) for uplink transmissions, and may dynamically indicate (e.g., via downlink control information (DCI) or a medium access control (MAC) control element (MAC-CE)) which configuration is to be used for one or more particular uplink transmissions. In some cases, unscheduled uplink transmissions may be transmitted in shared radio frequency spectrum. In some cases, access to the shared radio frequency spectrum may be determined based on a priority of an operator associated with a UE for accessing the spectrum. In some cases, beamforming techniques may be used for uplink and downlink transmissions and beam widths for beamformed transmissions may be selected based on the information transmitted in a transmission, an operator priority for use of shared radio frequency spectrum, a configuration indicated by a base station, or any combination thereof. In some cases, a base station may indicate periods of time during which the UEs may transmit autonomously, and UEs may perform autonomous transmissions during these periods of time. In some cases, a base station may indicate a particular uplink configuration of a number of preconfigured uplink configurations that a UE is to use for a period of time.

Aspects of the disclosure are initially described in the context of a wireless communications system. Aspects of the disclosure are further illustrated by and described with reference to apparatus diagrams, system diagrams, and flowcharts that relate to uplink transmission techniques in shared spectrum wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. In some cases, the wireless communications system 100 may use shared or unlicensed radio frequency spectrum for all or a portion of wireless communications, and UEs 115 may be configured to transmit unscheduled uplink transmissions.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

In some cases, wireless system 100 may utilize both licensed and unlicensed or shared radio frequency spectrum bands. For example, wireless system 100 may employ LTE License Assisted Access (LTE-LAA) or LTE Unlicensed (LTE U) radio access technology or NR technology in an unlicensed or shared spectrum band (NR-SS), such as the 5 Ghz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases UEs 115, when using shared radio frequency spectrum, may transmit unscheduled uplink transmissions according to an uplink configuration and using a frame structure such as discussed herein. In some cases, a base station may preconfigure a UE with two or more configurations (e.g., via RRC signaling) for uplink transmissions, and may dynamically indicate (e.g., via DCI or a MAC-CE) which configuration is to be used for one or more particular uplink transmissions or for a particular time period. In some cases, access to the shared radio frequency spectrum may be determined based on a priority of an operator associated with a UE for accessing the spectrum, and a contention window (CW) for accessing the shared radio frequency spectrum may be set based on such an operator priority. In some cases, beamforming techniques may be used for uplink and downlink transmissions and beam widths or precoding for beamformed transmissions may be selected based on the information transmitted in a transmission, an operator priority for use of shared radio frequency spectrum, or any combination thereof.

Figure 2:
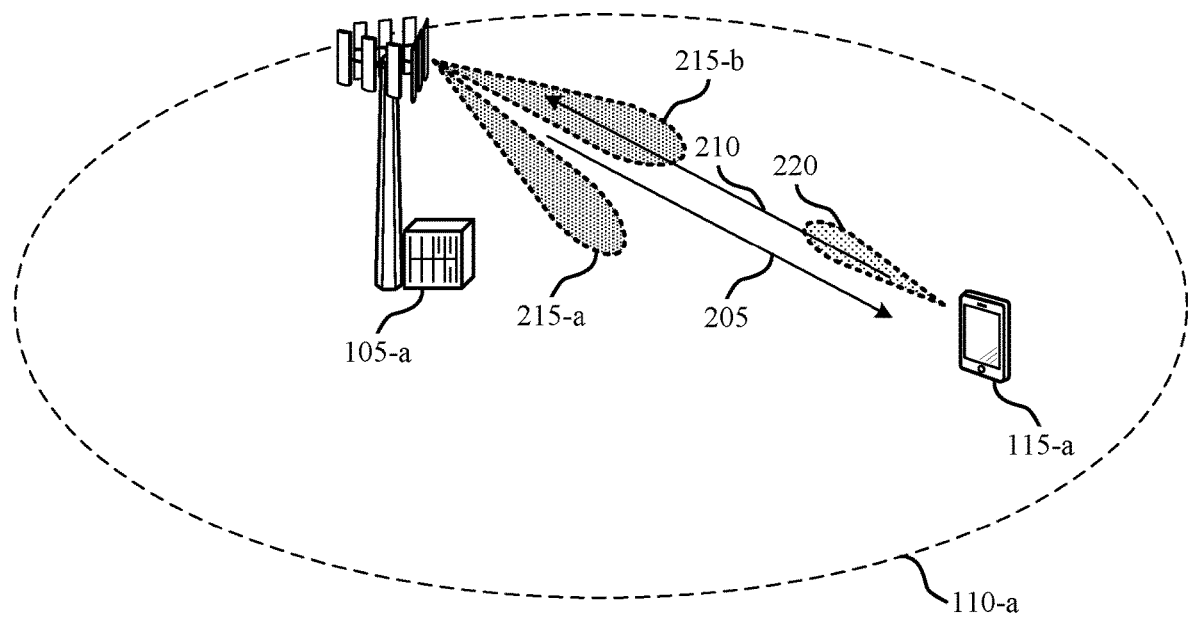
FIG. 2 illustrates an example of a wireless communications system that supports uplink transmission techniques in shared spectrum wireless communications in accordance with aspects of the present disclosure.

FIG. 2 illustrates an example of a wireless communications system 200 that supports uplink transmission techniques in shared spectrum wireless communications in accordance with various aspects of the present disclosure. In some examples, wireless communications system 200 may implement aspects of wireless communication system 100. Wireless communications system 200 includes base station 105-a and UE 115-a, which may be examples of aspects of a base station 105 and a UE 115 as described above with reference to FIG. 1. In the example of FIG. 2, the wireless communications system 200 may operate according to a radio access technology (RAT) such as an LTE, a 5G or NR RAT, although techniques described herein may be applied to any RAT and to systems that may concurrently use two or more different RATs.

Base station 105-a may communicate with UE 115-a over a downlink carrier 205 and an uplink carrier 210. In some examples, beamforming may be used for transmissions, and downlink carrier 205 may be transmitted on a first downlink beam 215-a or a second downlink beam 215-b directed in a different direction than first downlink beam 215-a. Uplink carrier 210 may be transmitted using an uplink beam 220. In some examples, base station 105-a may allocate resources for communication with UEs over uplink carrier 210 and downlink carrier 205. For example, base station 105-a may allocate uplink subframes in uplink carrier 210 for uplink transmissions from UE 115-a. In some cases, the UE 115-a may use one or more of the uplink subframes to transmit an unscheduled uplink transmission.

Various aspects of the present disclosure provide techniques for unscheduled uplink transmissions. In some cases, the base station 105-a may configure certain uplink subframes for unscheduled uplink transmissions, and may transmit such configuration to the UE 115-a (e.g., via RRC signaling). If the UE 115-a has uplink data to transmit and does not have any allocated uplink resources for the transmission, the UE 115-a may attempt an unscheduled uplink transmission of the data in one or more of the uplink subframes that are configured for unscheduled uplink transmissions. In some cases, a priority or quality of service parameter associated with the uplink data may be used by the UE 115-a to determine whether to attempt an unscheduled uplink transmission of the data. For example, data having a relatively low latency requirement may be transmitted in unscheduled uplink transmissions and data having relatively higher latency requirements may be transmitted only in scheduled uplink resources. In other cases, the UE 115-a may be configured by the base station 105-a to transmit unscheduled uplink transmissions or to transmit only scheduled uplink transmissions. Various uplink configurations, frame structures, operator priority techniques, beamforming techniques, and combinations thereof, are provided herein for transmission of unscheduled uplink transmissions.

In some cases, DCI may be provided by the base station 105-a that may indicate the availability of resources for unscheduled uplink transmissions. Such DCI may include, according to aspects of the present disclosure, an indication of which of a number of preconfigured uplink transmission configurations that the UE 115-a is to use for unscheduled uplink transmissions. Additionally, in some cases such DCI may include, for example, an uplink HARQ acknowledgment bitmap, an MCS for the uplink transmissions (e.g., 5 or 10 bits), power control information, a precoding matrix indicator (PMI). By selecting which of a number of preconfigured uplink transmission configurations that the UE 115-a is to use, the base station 105-a may dynamically adapt the number of transport blocks (TBs) used for unscheduled uplink transmissions without adding a significant amount of data associated with the different configurations in the DCI. In some cases, a MAC-CE may be provided by the base station 105-a, alone or in conjunction with DCI, that may indicate the availability of resources for unscheduled uplink transmissions, one or more parameters associated with such transmissions, or combinations thereof. The preconfigured uplink transmission configurations, in some examples, may be RRC configured at the UE 115-a (and at other UEs) and may include two or more configuration or profiles for unscheduled uplink transmissions.

In some cases, each configuration may include one or more of a number of TBs to be carried in each uplink subframe, a schedule of a set size (e.g., one subframe, slot, or mini-slot), an interlace allocation (e.g., whether to use a continuous bandwidth waveform or an interlaced waveform and particular interlace(s) to use), a number of configured HARQ processes (e.g., a number of HARQ processes for one TB or two TB operation), an ACK/NACK bundling scheme, a rank indication, scaling factors to be used to determine uplink control information (UCI) resources (which may be different for each different transmission rank and number of TBs), a demodulation reference signal (DMRS) configuration that may enable single (SU) or multi-user (MU) MIMO, a number of repetitions for the transmission, or any combination thereof. The UE 115-a, upon receiving an indication of a selected uplink transmission configuration in the DCI, may use the corresponding configuration for unscheduled uplink transmissions. In some cases, each of the two or more configurations may have a corresponding configuration index, and the DCI or MAC-CE may indicate an index value that may be used by the UE 115-a to identify the selected uplink transmission configuration. In some cases, a DCI or MAC-CE transmission may include an indication of a first uplink configuration, and the first uplink configuration may be used for a number of unscheduled uplink transmissions from the UE 115-a to the base station 105-a, until a different indication (e.g., in a subsequent DCI transmitted after some time period) indicates a different uplink configuration is to be used for unscheduled uplink transmissions.

Figure 3:
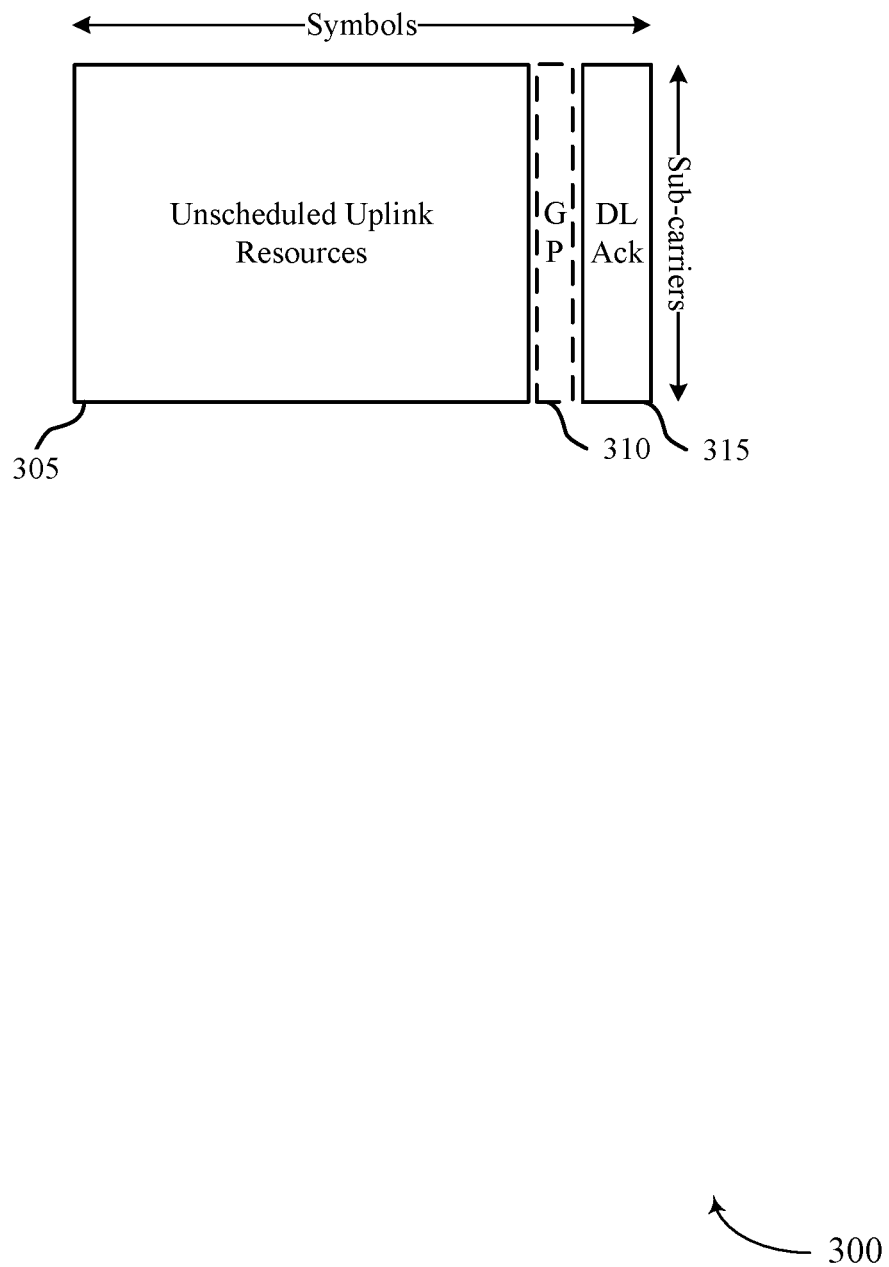
FIG. 3 illustrates an example of an unscheduled uplink transmission frame structure that supports uplink transmission techniques in shared spectrum wireless communications in accordance with aspects of the present disclosure.

FIG. 3 illustrates an example of an uplink frame structure 300 that supports uplink transmission techniques in shared spectrum wireless communications in accordance with various aspects of the present disclosure. In some examples, uplink frame structure 300 may be used implement aspects of wireless communication system 100.

In some examples, such as in an NR network, self-contained subframes may be used for at least some transmissions in the network, in which a data transmission (e.g., a physical uplink shared channel (PUSCH) or physical downlink shared channel (PDSCH) transmission) and an associated feedback transmission indicating whether the data transmission was successfully received (e.g., a HARQ ACK/NACK transmission) are transmitted within a same subframe. In some cases, a base station may configure one or more slots or subframes for unscheduled uplink transmissions. In some cases, for example, a base station may configure three out of every 10 subframes for unscheduled or grantless uplink transmissions, and may communicate such configuration to UEs semi-statically, such as through RRC signaling. In the example of FIG. 3, a subframe or slot may include unscheduled uplink resources 305, followed by a guard period 310 that allows switching of transmit/receive components at a UE from a transmit mode to a receive mode. After the guard period, downlink acknowledgment resources 315 may carry feedback (e.g., HARQ ACK/NACK feedback) that indicates successful or unsuccessful receipt of the uplink transmission using the unscheduled uplink resources 305.

A UE configured for unscheduled uplink transmissions may determine that it has data that may be transmitted in an unscheduled uplink transmission and, during uplink frame structure 300, may perform a LBT procedure and begin transmitting the uplink transmission using unscheduled uplink resources 305. In some cases, responsive to the unscheduled uplink transmission, a base station may provide an indication using the downlink acknowledgement resources that the UE is to continue using unscheduled uplink resources or may indicate that the UE is to discontinue using unscheduled uplink resources (e.g., because the base station will provide uplink grants in future subframes).

Figure 4:
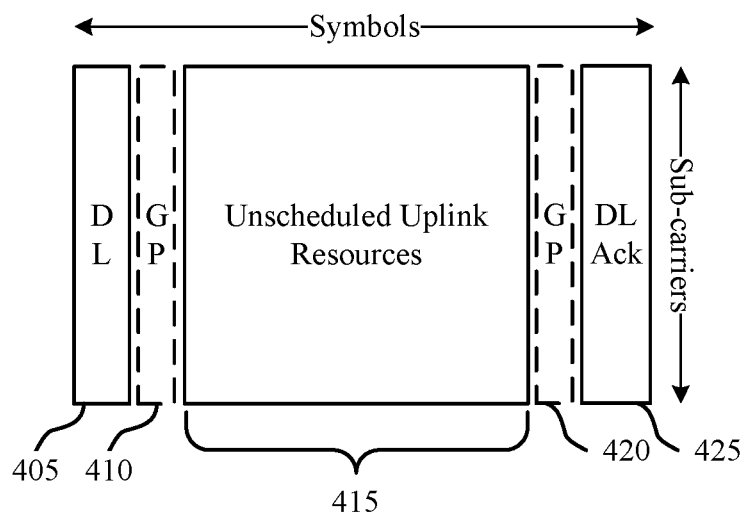
FIG. 4 illustrates another example of an unscheduled uplink transmission frame structure that supports uplink transmission techniques in shared spectrum wireless communications in accordance with aspects of the present disclosure.

FIG. 4 illustrates another example of an uplink frame structure 400 that supports uplink transmission techniques in shared spectrum wireless communications in accordance with various aspects of the present disclosure. In some examples, uplink frame structure 400 may implement aspects of wireless communication system 100. In this example, the uplink frame structure 400 includes initial downlink resources 405 that may be used to indicate that the uplink frame structure 400 is available for unscheduled uplink transmissions. Such an indication may be multiplexed with other downlink control information that may indicate an uplink configuration of a number of preconfigured uplink configurations is to be used for the uplink transmissions, in some examples. Using such initial downlink resources 405, a base station may dynamically indicate that resources are available for unscheduled uplink transmissions, and may also indicate a configuration (e.g., a single or multiple TB configuration of a number of preconfigured uplink configurations) for the unscheduled uplink transmissions.

In this example, a guard period 410 may follow the initial downlink resources 405 that may allow for switching of UE transmit/receive hardware from a receive mode to a transmit mode. Unscheduled uplink resources 415 may be available for uplink transmissions following the guard period 410, with a second guard period 420 following the unscheduled uplink resources 415 to allow switching of the UE transmit/receive circuitry back to a receive mode. Downlink acknowledgment resources 425 may be used for transmission of feedback information to indicate that the unscheduled uplink transmission in unscheduled uplink resources 415 was successfully or unsuccessfully received at the base station. In some cases, the downlink acknowledgment resources 425 may include other information as well, such as an indication that the UE is to continue or discontinue using unscheduled uplink resources similarly as discussed above.

As indicated above, the initial downlink resources 405 may be used in some cases, to dynamically announce an unscheduled or grantless uplink (GUL) opportunity in a subframe. If a UE has uplink data to be transmitted and the initial downlink resources 405 contain an announcement of an unscheduled uplink transmission, the UE may then attempt to use the unscheduled uplink resources 415 for an uplink transmission (e.g., by performing a LBT procedure and transmitting if the channel is available). In some cases, a base station may configure certain uplink subframes or slots as being potentially available for unscheduled uplink transmissions, and a UE may decode transmissions in the initial downlink resources 405 of such subframes or slots to determine whether there is an opportunity for unscheduled uplink transmission. If the UE does not receive an indication of availability for unscheduled uplink transmissions, the UE will not use the subframe or slot for an unscheduled uplink transmission. In some cases, the initial downlink resources 405 may also include a reference signal transmission (e.g., a channel state information reference signal (CSI-RS)), and the UE may perform channel estimation using the reference signal and determine a UE rank or modulation and coding scheme (MCS) for the uplink transmission.

Figure 5:
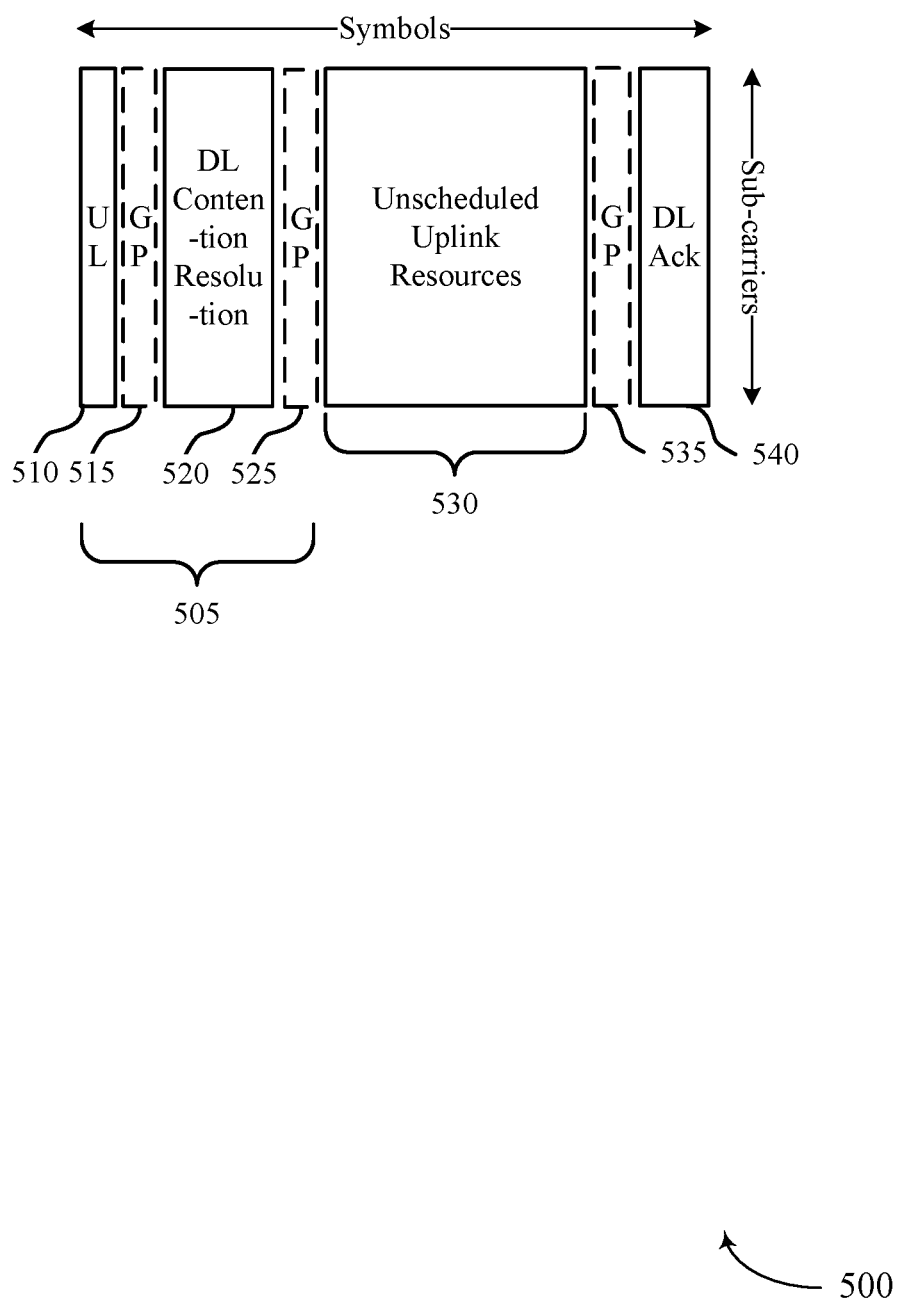
FIG. 5 illustrates another example of an unscheduled uplink transmission frame structure that supports uplink transmission techniques in shared spectrum wireless communications in accordance with aspects of the present disclosure.

FIG. 5 illustrates another example of an uplink frame structure 500 that supports uplink transmission techniques in shared spectrum wireless communications in accordance with various aspects of the present disclosure. In some examples, uplink frame structure 500 may implement aspects of wireless communication system 100. In this example, the uplink frame structure 500 includes an initial contention stage 505 in which a UE may announce that it has uplink data to transmit in initial uplink resources 510. The base station may receive the indication of uplink data, and after a guard period 515 may transmit a downlink contention resolution 520 which includes an indication of a UE that is selected to transmit using unscheduled uplink resources 530 after a second guard period 525, and may also indicate a configuration (e.g., a single or multiple TB configuration of a number of preconfigured uplink configurations) for the unscheduled uplink transmissions.

Thus, in this example multiple UEs may contend for the channel, and the base station may select one or more UEs to transmit using unscheduled uplink resources 530. The transmission in the initial uplink resources 510 may, in some cases, be an identifier of the UE (e.g., a waveform transmitted by the UE to indicate the UE has data to transmit) or may be an indication of an amount of data to be transmitted such as may be included in a BSR, for example. A third guard period 535 may follow the unscheduled uplink resources 530, followed by downlink acknowledgment resources 540.

Downlink acknowledgment resources 540 may be used for transmission of feedback information to indicate that the unscheduled uplink transmission in unscheduled uplink resources 530 was successfully or unsuccessfully received at the base station. In some cases, the downlink acknowledgment resources 540 may include other information as well, such as an indication that the UE is to continue or discontinue using unscheduled uplink resources similarly as discussed above. In any of the frame structures 300-500, the downlink acknowledgment resources may include ACK/NACK information that may be transmitted in a feedback channel (e.g., a physical HARQ indicator channel (PHICH)) or in DCI associated with unscheduled uplink transmissions.

In some cases, the base station may configure a CORESET of parameters for uplink transmissions, such as a specific CORESET for unscheduled uplink transmission DCI, or part of a regular CORESET, that may indicate portions of DCI that may be used for feedback transmission.

Figure 6:
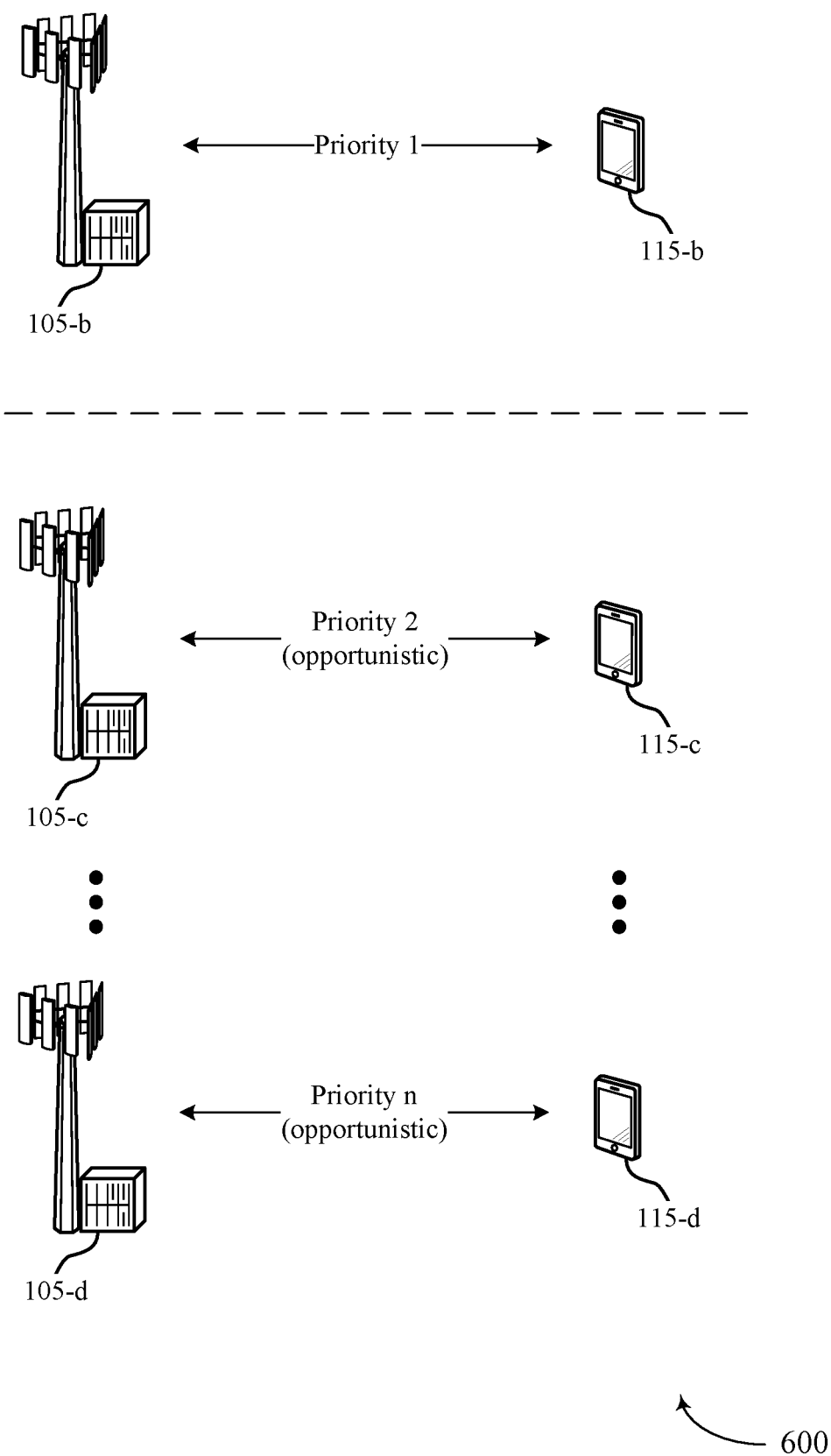
FIG. 6 illustrates an example of operator priorities for shared radio frequency spectrum that supports uplink transmission techniques in shared spectrum wireless communications in accordance with aspects of the present disclosure.

FIG. 6 illustrates an example of shared spectrum operator priorities 600 that support uplink transmission techniques in shared spectrum wireless communications in accordance with various aspects of the present disclosure. In some examples, operator priorities 600 may be used to implement aspects of wireless communication system 100. Such operator priorities 600 may be used, in some deployments, based on an agreement among multiple operators that may each have transmitting devices contending for access to shared radio frequency spectrum. One operator may have priority to use shared radio frequency spectrum resources over other operators, such as for certain time resources, frequency resources, or combinations thereof. The operator with the highest priority may be considered to have guaranteed resources, and lower priority operators may use such resources only in the event that any higher priority operators are not using the resources, and such resources may be considered to be opportunistic resources for such lower priority operators. The different operators may cycle through which operator has highest priority, for example, or certain operators may agree to always operate to use resources opportunistically (e.g., based on a type of communication or compensation received from other operators).

In the example of FIG. 6, a first base station 105-b and a first UE 115-b may be associated with a first operator that has the highest priority for the shared radio frequency spectrum. A second base station 105-c through an nth base station 105-d, and corresponding second UE 115-c through nth UE 115-d, may have second through nth priority access to the shared radio frequency spectrum, and thus have opportunistic access to the spectrum. In some cases, a base station 105 may configure its associated UE 115 with a separate configuration for guaranteed versus opportunistic shared radio frequency spectrum resources. In some cases, a contention window (CW) used for channel access (e.g., in a LBT procedure) may be set by a UE 115 based on the priority of the operator. In some cases, first UE 115-b operating using guaranteed resources may double its CW duration in the event of an unsuccessful attempt to access the resources, and the second UE 115-c through nth UE 115-d operating using opportunistic resources may increase their CW by a different amount in the event of an unsuccessful attempt to access the resources. For example, UEs 115-c through 115-d operating using opportunistic resources may increase the CW size but may not double the CW size (e.g., the CW increase is slightly less than double). Such a different change to the CW duration may account for the fact that the associated base stations 105 may not be able to listen in that subframe or may experience some interference which did not block the uplink transmission.

In some cases, UEs 115 may keep different CW durations for scheduled uplink transmissions, unscheduled uplink transmissions, uplink transmissions using guaranteed resources, uplink transmission using opportunistic resources, or any combinations thereof. In some cases, UEs 115 may, prior to the first uplink transmission, perform energy or signal sensing as part of a LBT procedure, which may be performed at the beginning of the unscheduled uplink transmission resources, or just prior to the unscheduled uplink transmission resources. The base stations 105, in such cases, may refrain from scheduling any transmissions during the uplink contention interval, to allow the UEs 115 to gain the medium. In cases that use beamformed transmission beams, the base stations 105 may refrain from scheduling any transmissions during the uplink contention interval at least in the direction of any potential UEs 115 that may be configured for unscheduled uplink transmissions.

Figure 7:
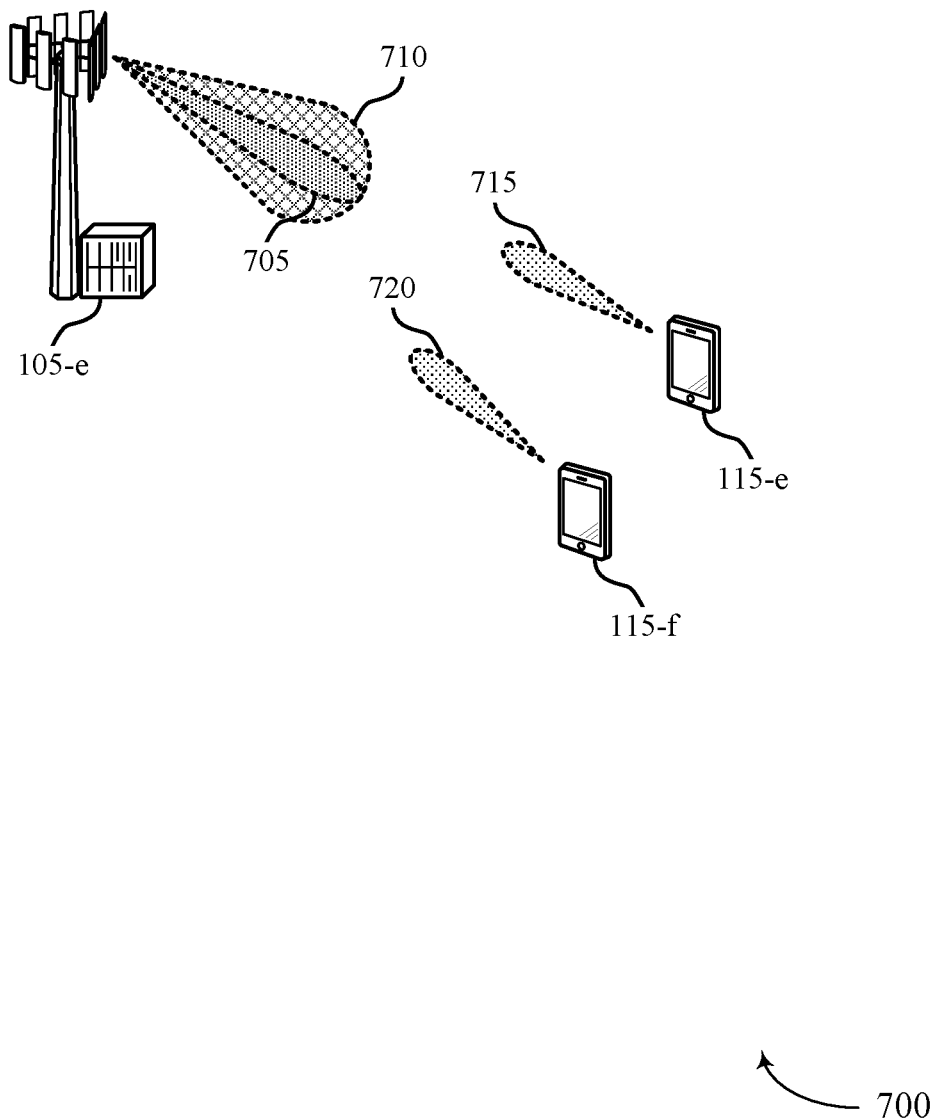
FIG. 7 illustrates an example of transmission beams that support uplink transmission techniques in shared spectrum wireless communications in accordance with aspects of the present disclosure.

FIG. 7 illustrates an example of transmission beams in a wireless communications system 700 that support uplink transmission techniques in shared spectrum wireless communications in accordance with various aspects of the present disclosure. In some examples, wireless communications system 700 may implement aspects of wireless communication system 100. In this example, a base station 105-e may use beamforming for beam 705 and beam 710 to transmit/receive transmissions, a first UE 115-e may use beamformed transmission beam 715 to transmit uplink transmissions, and a second UE 115-f may use a second beamformed transmission beam 720 to transmit uplink transmissions.

For scheduled uplink transmissions, the base station 105-e may be aware, for example, that first UE 115-e is to transmit and that second UE 115-f is not transmitting, and may use relatively narrow beam 705 for receiving the transmission which may provide an improved link relative to a wider beam. However, if both UEs 115 are configured to transmit unscheduled uplink transmissions, the base station 105-e may not know which UE 115 will transmit and thus may not know which beam directions that potential UEs 115 could use in unscheduled uplink transmission resources. In some cases, the base station 105-e may configure unscheduled uplink resources that are tied to each beam or a group of beams, and for each unscheduled uplink resource may use the appropriate corresponding beamforming.

In some cases, resources within the shared radio frequency spectrum may be opportunistic. In such cases, the base station 105-e may listen on wider beam 710, or may not listen at all in that resource. In some cases, the base station 105-e may configure a transmission power offset, extra bandwidth or extra time resources, an MCS/rank offset, an additional number of repetitions for uplink transmissions (which may be combined at a receiving base station), or any combination thereof, between scheduled and unscheduled uplink transmissions, in order to compensate for the beamforming loss experienced by an unscheduled uplink transmission. Further, in some cases the base station 105-e may transmit a common PDCCH to multiple UEs 115, using wider beam width 710, to enable some common signaling to multiple UEs 115. In such cases, the base station 105-e may provide an indication of unscheduled uplink transmission resources for current or future slots/subframes in the common PDCCH. For example, the base station 105-e may indicate in slot n, that unscheduled uplink resources in slot n+k in beam direction 'm' would be available. Such unscheduled uplink resources may be dynamically allocated, or may be semi-statically configured and activated/withdrawn using a common PDCCH based indication.

Figure 8:
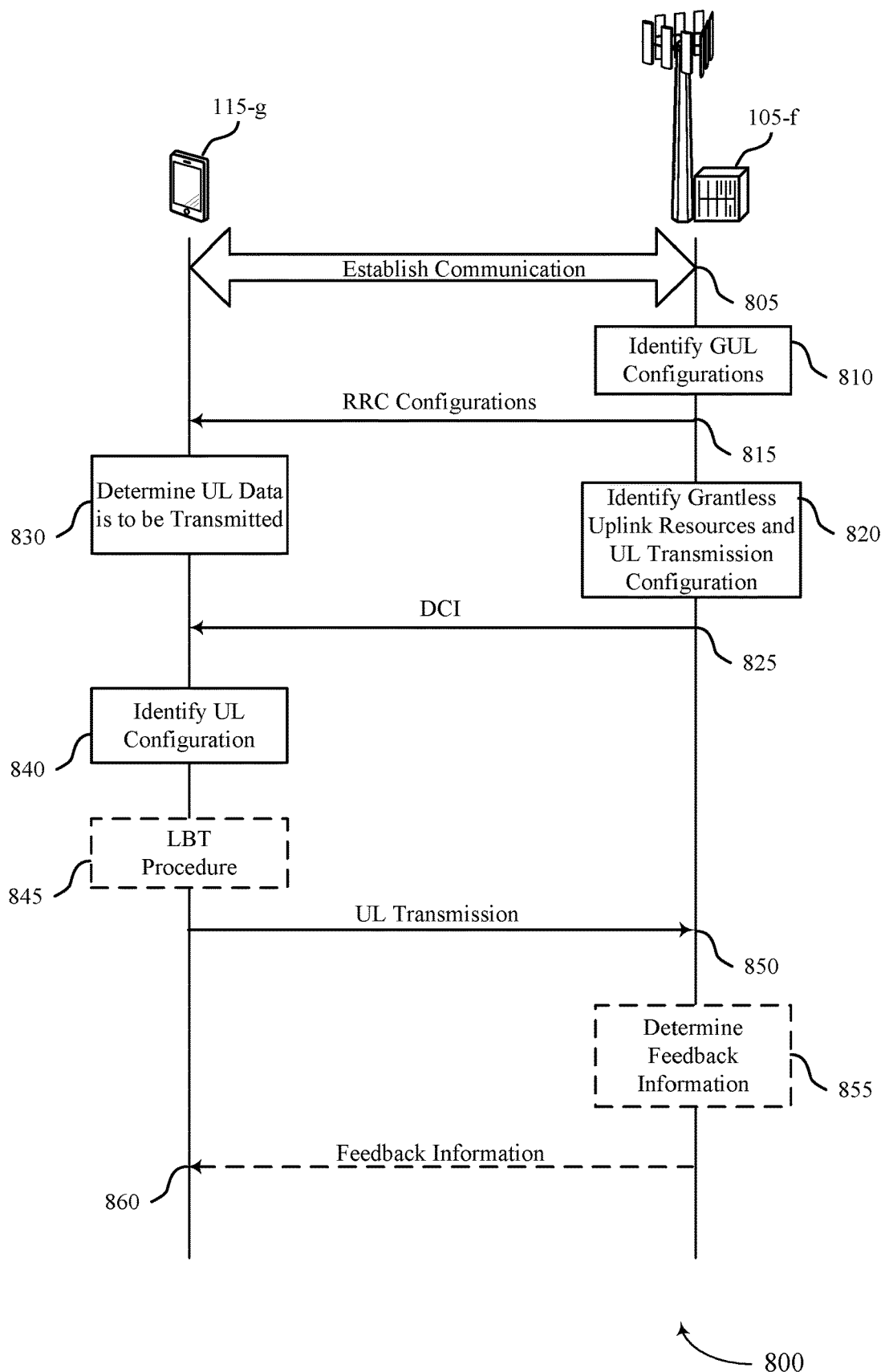
FIGS. 8 through 11 illustrate examples of process flows that support uplink transmission techniques in shared spectrum wireless communications in accordance with aspects of the present disclosure.

FIG. 8 illustrates an example of a process flow 800 that supports uplink transmission techniques in shared spectrum wireless communications in accordance with various aspects of the present disclosure. In some examples, process flow 800 may implement aspects of wireless communication system 100. Process flow 800 may include a base station 105-f, and a UE 115-g, which may be examples of the corresponding devices described with reference to FIG. 1-2. The base station 105-f and the UE 115-g may establish a connection 805 according to established connection establishment techniques for the wireless communications system.

At block 810, the base station 105-f may identify unscheduled or grantless uplink (GUL) configurations that may be used at the UE 115-g for transmissions of unscheduled uplink transmissions. As indicated above, in some cases it may be desirable for unscheduled uplink transmissions to be transmitted using different numbers of TBs, different numbers of repetitions, or a different number of layers, depending upon the conditions present and available uplink resources for unscheduled uplink transmissions. In some cases, the base station 105-f may preconfigure a number of configurations at the UE 115-g, and may transmit an indication of which particular uplink configuration is to be used. In some cases, each configuration may include one or more of a number of TBs to be carried in each uplink subframe, a schedule of a set size (e.g., one subframe, slot, or mini-slot), an interlace allocation, a number of configured HARQ processes (e.g., a number of HARQ processes for one TB or two TB operation), an ACK/NACK bundling scheme, a rank indication, scaling factors to be used to determine UCI resources (which may be different for each different transmission rank and number of TBs), a DMRS configuration that may enable SU or MU-MIMO, a number of repetitions for each uplink transmission, or any combination thereof. The base station 105-f may provide these various configurations to the UE 115-g via RRC configurations 815.

At block 820, the base station 105-f, and may identify grantless uplink resources and uplink transmission configuration. As indicated above, in some cases, the base station 105-f may configure certain resources for scheduled uplink transmissions and unscheduled uplink transmissions. As discussed above, in some cases base station 105-f may configure a certain amount of uplink resources for unscheduled uplink transmissions to provide UE 115-g opportunities to transmit uplink data without first having to receive an allocation of scheduled resources, which may reduce latency for such uplink transmissions and enhance system efficiency. The base station 105-f may transmit, in some cases, an indication of available uplink resources in DCI 825, which may also include which of the uplink configurations is to be used for the uplink transmission.

At block 830, the UE 115-g may determine that uplink data is to be transmitted. In some cases, the UE 115-g may receive data in an uplink buffer that is to be transmitted in an uplink transmission. In some cases, the UE 115-g may determine that the received data may be transmitted using unscheduled uplink transmissions, such as based on a service that provides the data and an associated quality of service (QoS) of the service or latency requirement of the service. For example, services that have a low latency requirement (e.g., an ultra-reliable low latency (URLLC) service) may use unscheduled uplink transmission resources, while services that have a relatively latency insensitive (e.g., an enhanced mobile broadband (eMBB) service) may use only scheduled uplink transmission resources.

At block 840, the UE 115-g, upon receiving the indication of the selected uplink transmission configuration in the DCI 825, may identify an uplink configuration from a number of different configured uplink configurations that is to be used for an unscheduled uplink transmission of the data that is to be transmitted. In some cases, each of the different unscheduled uplink transmission configurations may have a corresponding configuration index, and the DCI 825 may indicate an index value that may be used by the UE 115-g to identify the selected uplink transmission configuration. By selecting which of a number of preconfigured uplink transmission configurations that the UE 115-g is to use, the base station 105-f may dynamically adapt, for example, the number of TBs used for unscheduled uplink transmissions without adding a significant amount of data associated with the different configurations in the DCI 825.

The UE 115-g, at optional block 845, may perform an LBT procedure prior to channel access. For example, if the UE 115-g is operating according to the frame structure of FIG. 3 or 5, the UE 115-g may initially obtain the channel in the shared radio frequency spectrum and perform the associated LBT procedure. Furthermore, if the UE 115-g and base station 105-f use a contention stage such as discussed above with respect to FIG. 5, the base station 105-f and UE 115-g may perform an associated contention procedure.

The UE 115-g may transmit the unscheduled uplink transmission 850 to the base station 105-f. Such a transmission may be transmitted using the identified uplink configuration, and may use unscheduled uplink resources (e.g., guaranteed or opportunistic resources, as discussed above). At optional block 855, the base station 105-f may determine feedback information (e.g., HARQ ACK/NACK feedback information), and may transmit the feedback information 860 to the UE 115-g.

Figure 9:
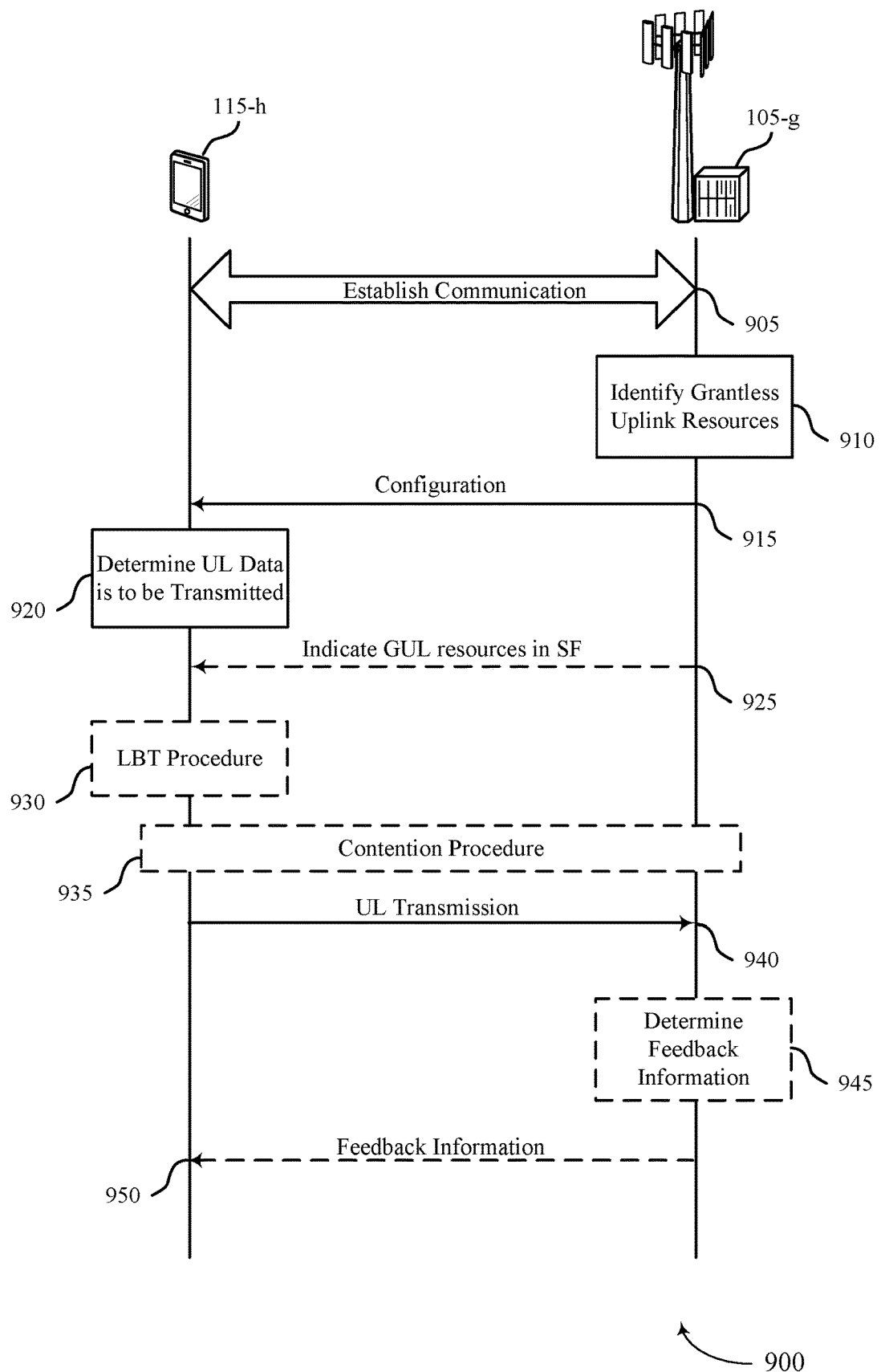

FIG. 9 illustrates an example of a process flow 900 that supports uplink transmission techniques in shared spectrum wireless communications in accordance with various aspects of the present disclosure. In some examples, process flow 900 may implement aspects of wireless communication system 100. Process flow 900 may include a base station 105-g, and a UE 115-h, which may be examples of the corresponding devices described with reference to FIG. 1-2. The base station 105-g and the UE 115-h may establish a connection 905 according to established connection establishment techniques for the wireless communications system.

At block 910, the base station 105-g may identify unscheduled or grantless uplink resources, and may configure certain resources for scheduled uplink transmissions and unscheduled uplink transmissions. As discussed above, in some cases base station 105-g may configure a certain amount of uplink resources for unscheduled uplink transmissions to provide UE 115-h opportunities to transmit uplink data without first having to receive an allocation of scheduled resources, which may reduce latency for such uplink transmissions and enhance system efficiency. The base station 105-g may transmit configuration information 915 to the UE 115-h, which may include an indication of which subframes/slots are configured for unscheduled uplink transmissions.

At block 920, the UE 115-h may determine that uplink data is to be transmitted. In some cases, the UE 115-h may receive data in an uplink buffer that is to be transmitted in an uplink transmission. In some cases, the UE 115-h may determine that the received data may be transmitted using unscheduled uplink transmissions, such as based on a service that provides the data and an associated quality of service (QoS) of the service or latency requirement of the service. For example, services that have a low latency requirement (e.g., an ultra-reliable low latency (URLLC) service) may use unscheduled uplink transmission resources, while services that have a relatively latency insensitive (e.g., an enhanced mobile broadband (eMBB) service) may use only scheduled uplink transmission resources.

The base station 105-g may optionally transmit an indication of GUL resources in an initial downlink transmission, such as discussed above with respect to FIG. 4. The UE 115-h may receive such an indication and determine whether unscheduled uplink resources are available for use or not. The UE 115-*h*, at optional block 930, may perform an LBT procedure prior to channel access. For example, if the UE 115-*h* is operating according to the frame structure of FIG. 3 or 5, the UE 115-*h* may initially obtain the channel in the shared radio frequency spectrum and perform the associated LBT procedure. Furthermore, if the UE 115-*h* and base station 105-*g* use a contention stage such as discussed above with respect to FIG. 5, the base station 105-*g* and UE 115-*h* may perform an associated contention procedure 935.

The UE 115-*h* may transmit the unscheduled uplink transmission 940 to the base station 105-*g*. Such a transmission may use unscheduled uplink resources, which may be guaranteed or opportunistic resources, as discussed above. At optional block 945, the base station 105-*g* may determine feedback information (e.g., HARQ ACK/NACK feedback information), and may transmit the feedback information 950 to the UE 115-*h*.

Figure 10:
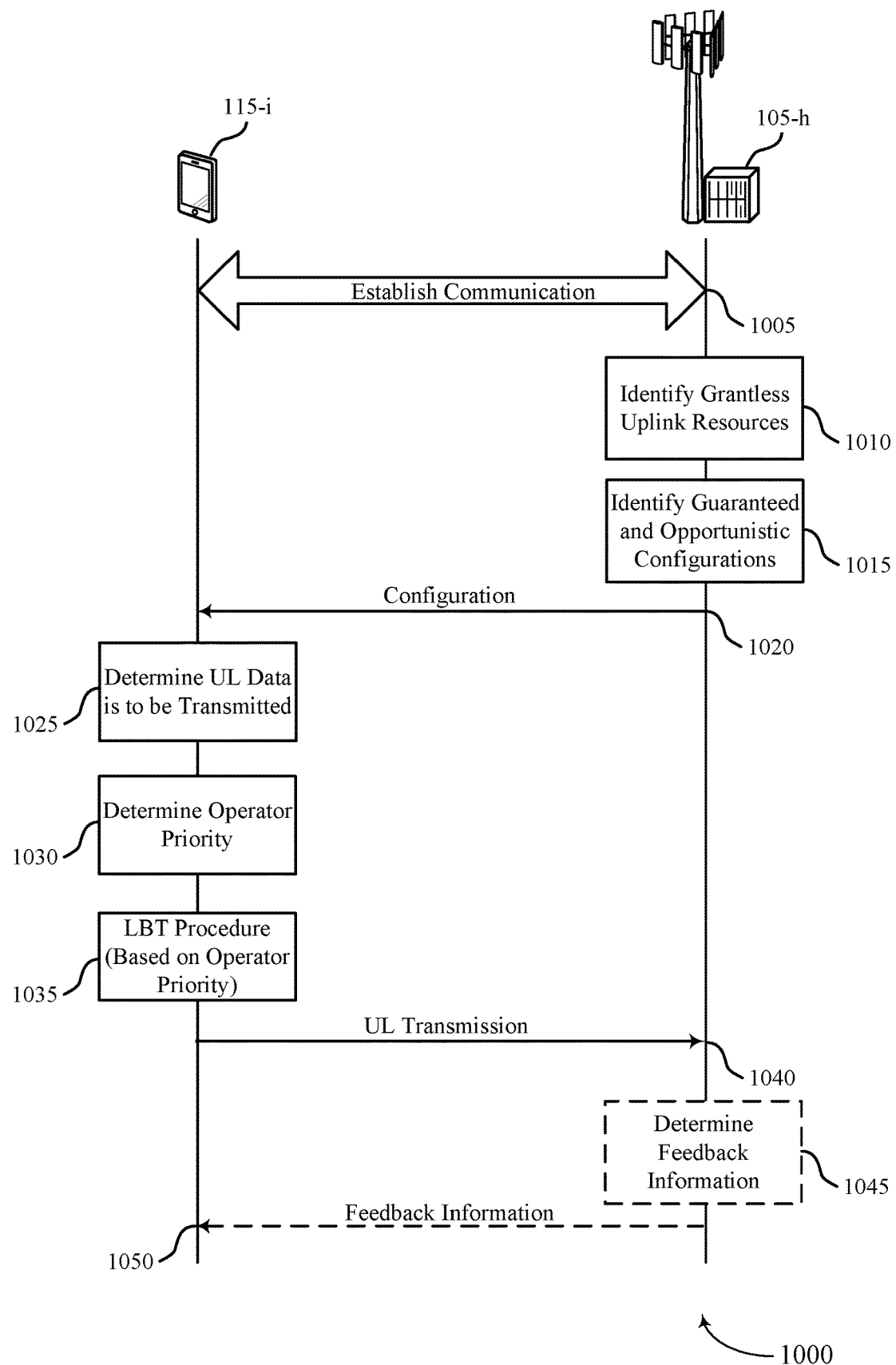

FIG. 10 illustrates another example of a process flow 1000 that supports uplink transmission techniques in shared spectrum wireless communications in accordance with various aspects of the present disclosure. In some examples, process flow 1000 may implement aspects of wireless communication system 100. Process flow 1000 may include a base station 105-*h*, and a UE 115-*i*, which may be examples of the corresponding devices described with reference to FIG. 1-2. The base station 105-*h* and the UE 115-*i* may establish a connection 1005 according to established connection establishment techniques for the wireless communications system.

At block 1010, the base station 105-*h* may identify unscheduled or grantless uplink resources, and may configure certain resources for scheduled uplink transmissions and unscheduled uplink transmissions. As discussed above, in some cases base station 105-*h* may configure a certain amount of uplink resources for unscheduled uplink transmissions to provide UE 115-*i* opportunities to transmit uplink data without first having to receive an allocation of scheduled resources, which may reduce latency for such uplink transmissions and enhance system efficiency.

At block 1015, the base station 105-*h* may identify guaranteed and opportunistic configurations for use based on a priority of access to the shared radio frequency spectrum band. As discussed above with respect to FIG. 6, different configurations may be provided, that may include different CW durations for example, that the UE 115-*i* may use based on whether an uplink transmission will use guaranteed versus opportunistic uplink resources. The base station 105-*h* may transmit configuration information 1020 to the UE 115-*i*, which may include an indication of which subframes/slots are configured for unscheduled uplink transmissions and configuration information for guaranteed and opportunistic uplink transmissions.

At block 1025, the UE 115-*i* may determine that uplink data is to be transmitted. In some cases, the UE 115-*i* may receive data in an uplink buffer that is to be transmitted in an uplink transmission. In some cases, the UE 115-*i* may determine that the received data may be transmitted using unscheduled uplink transmissions, such as based on a service that provides the data and an associated QoS of the service or latency requirement of the service. For example, services that have a low latency requirement (e.g., a URLLC service) may use unscheduled uplink transmission resources, while services that have a relatively latency insensitive (e.g., an eMBB service) may use only scheduled uplink transmission resources.

At block 1030, the UE 115-*i* may determine an operator priority. The operator priority may be determined based on a priority for accessing the shared radio frequency spectrum band, for example. In some cases, the base station 105-*h* may indicate in the configuration information the resources in which the base station 105-*h* and UE 115-*i* have guaranteed resources, and opportunistic resources with associated priority levels. Based on the particular resources, the UE 115-*i* may then determine the operator priority.

At block 1035, the UE 115-*i* may perform an LBT procedure to gain channel access to the shared radio frequency spectrum. The LBT procedure may be performed based on parameters that may be set based on the operator priority for the corresponding resources (e.g., a CW duration that may be set based on whether the UE 115-*i* is attempting to transmit on guaranteed or opportunistic resources).

If the LBT procedure is successful, the UE 115-*i* may transmit the unscheduled uplink transmission 1040 to the base station 105-*h*. Such a transmission may use unscheduled uplink resources, which may be guaranteed or opportunistic resources, as discussed above. At optional block 1045, the base station 105-*h* may determine feedback information (e.g., HARQ ACK/NACK feedback information), and may transmit the feedback information 1050 to the UE 115-*i*.

Figure 11:
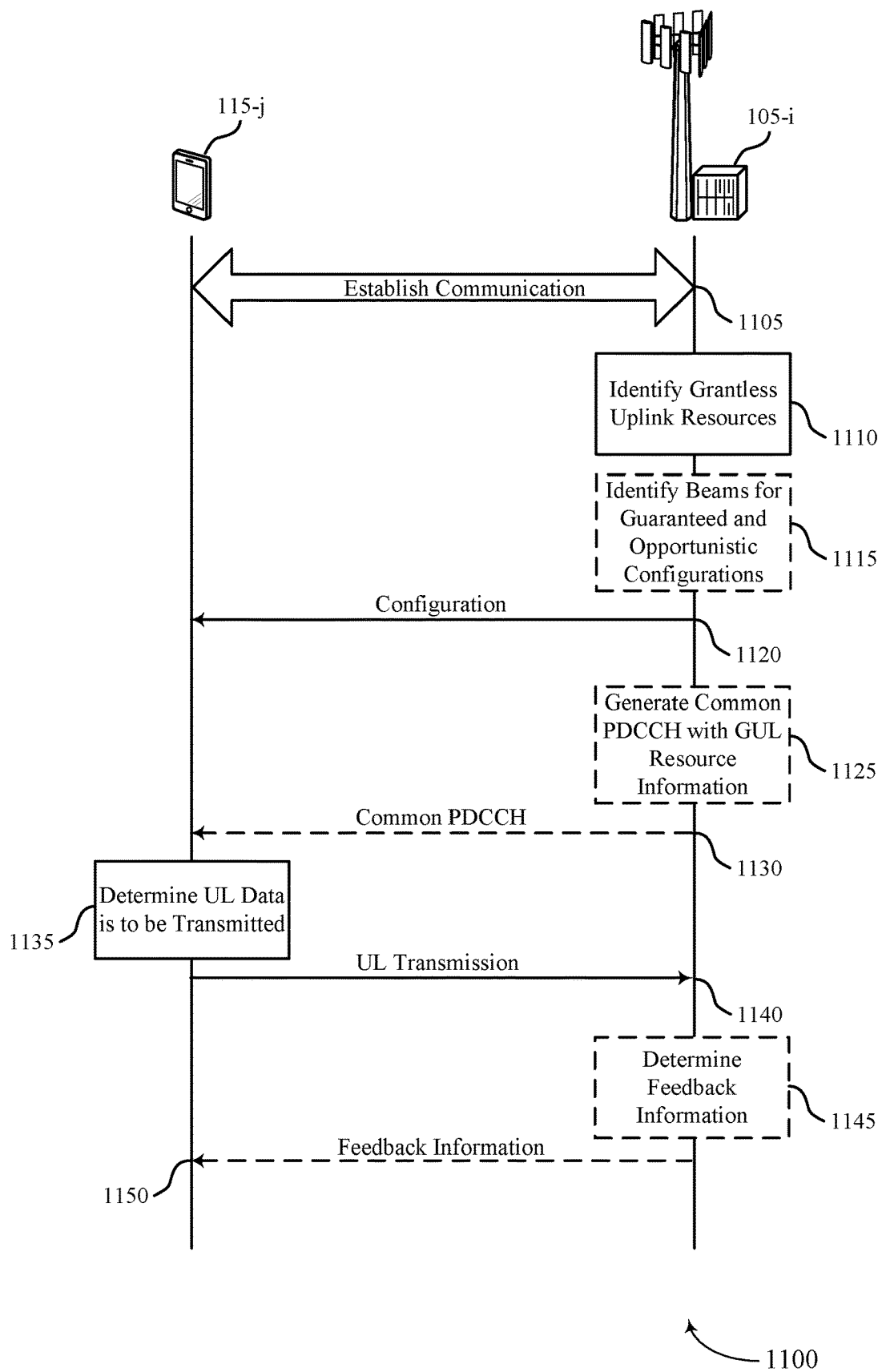

FIG. 11 illustrates another example of a process flow 1100 that supports uplink transmission techniques in shared spectrum wireless communications in accordance with various aspects of the present disclosure. In some examples, process flow 1100 may implement aspects of wireless communication system 100. Process flow 1100 may include a base station 105-*i*, and a UE 115-*j*, which may be examples of the corresponding devices described with reference to FIG. 1-2. The base station 105-*i* and the UE 115-*j* may establish a connection 1105 according to established connection establishment techniques for the wireless communications system.

At block 1110, the base station 105-*i* may identify unscheduled or grantless uplink resources, and may configure certain resources for scheduled uplink transmissions and unscheduled uplink transmissions. As discussed above, in some cases base station 105-*i* may configure a certain amount of uplink resources for unscheduled uplink transmissions to provide UE 115-*j* opportunities to transmit uplink data without first having to receive an allocation of scheduled resources, which may reduce latency for such uplink transmissions and enhance system efficiency.

At optional block 1115, the base station 105-*i* may identify directional beams for guaranteed and opportunistic configurations for use based on a priority of access to the shared radio frequency spectrum band. As discussed above with respect to FIG. 7, different beams may be used to monitor for unscheduled uplink transmissions based on whether such a transmission will use guaranteed versus opportunistic resources. The base station 105-*i* may transmit configuration information 1120 to the UE 115-*j*, which may include an indication of which subframes/slots are configured for unscheduled uplink transmissions on certain beams, and configuration information for guaranteed and opportunistic uplink transmissions.

At optional block 1125, the base station 105-*i* may generate common PDCCH information with grantless uplink (GUL), or unscheduled uplink, resource information, such as discussed above with respect to FIG. 7. The base station 105-*i* may transmit the common PDCCH 1130 to the UE 115-*j* (and any other served UEs) using a transmission beam that may be wider than a transmission beam used for communicating with a single UE.

At block 1135, the UE 115-*j* may determine that uplink data is to be transmitted. In some cases, the UE 115-*j* may receive data in an uplink buffer that is to be transmitted in an uplink transmission. In some cases, the UE 115-*j* may determine that the received data may be transmitted using unscheduled uplink transmissions, such as based on a service that provides the data and an associated QoS of the service or latency requirement of the service. For example, services that have a low latency requirement (e.g., a URLLC service) may use unscheduled uplink transmission resources, while services that have a relatively latency insensitive (e.g., an eMBB service) may use only scheduled uplink transmission resources The UE 115-*j* may transmit the unscheduled uplink transmission 1140 to the base station 105-*i*. Such a transmission may use unscheduled uplink resources, which may be guaranteed or opportunistic resources, as discussed above. At optional block 1145, the base station 105-*i* may determine feedback information (e.g., HARQ ACK/NACK feedback information), and may transmit the feedback information 1150 to the UE 115-*j*.

Figure 12:
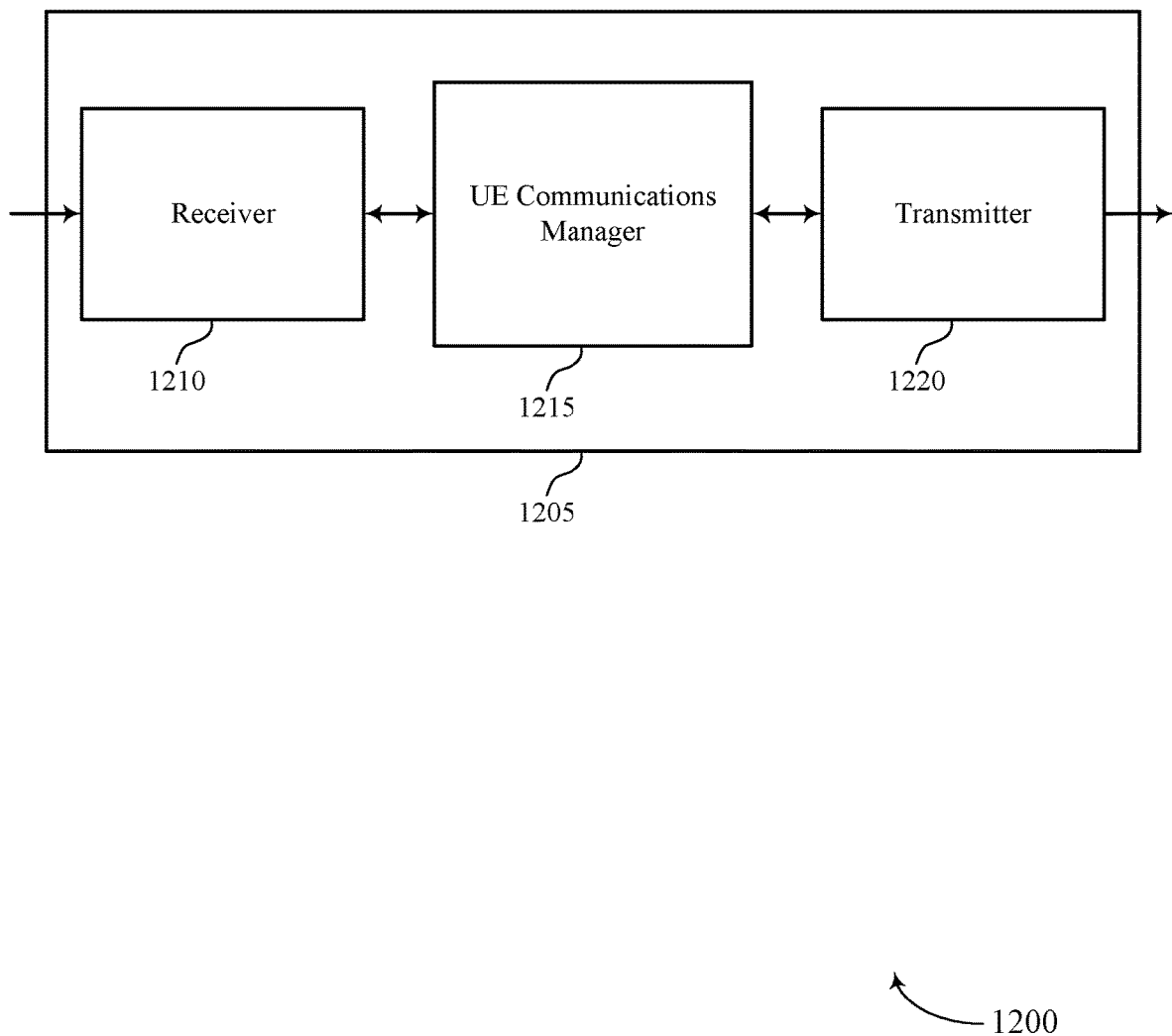
FIGS. 12 through 14 show block diagrams of a device that supports uplink transmission techniques in shared spectrum wireless communications in accordance with aspects of the present disclosure.

FIG. 12 shows a block diagram 1200 of a wireless device 1205 that supports uplink transmission techniques in shared spectrum wireless communications in accordance with aspects of the present disclosure. Wireless device 1205 may be an example of aspects of a UE 115 as described herein. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to uplink transmission techniques in shared spectrum wireless communications, etc.). Information may be passed on to other components of the device. The receiver 1210 may be an example of aspects of the transceiver 1535 described with reference to FIG. 15. The receiver 1210 may utilize a single antenna or a set of antennas.

UE communications manager 1215 may be an example of aspects of the UE communications manager 1515 described with reference to FIG. 15. UE communications manager 1215 and/or at least some of its various sub-components may be implemented in hardware, software executed by a processor, firmware, or any combination thereof. If implemented in software executed by a processor, the functions of the UE communications manager 1215 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1215 and/or at least some of its various sub-components may be physically located at various positions, including being distributed such that portions of functions are implemented at different physical locations by one or more physical devices. In some examples, UE communications manager 1215 and/or at least some of its various sub-components may be a separate and distinct component in accordance with various aspects of the present disclosure. In other examples, UE communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1215 may identify wireless resources within a shared radio frequency spectrum band that are available for an unscheduled uplink transmission within a self-contained radio subframe, determine that at least a portion of the identified wireless resources is available for the unscheduled uplink transmission, and transmit the unscheduled uplink transmission during the self-contained radio subframe based on the determining. The UE communications manager 1215 may also identify a first configuration or a second configuration for transmitting an unscheduled uplink transmission in a shared radio frequency spectrum band based on an operator priority for accessing the shared radio frequency spectrum band, perform, based on the identified first configuration or second configuration, a LBT procedure at the UE to determine availability of at least a portion of the identified wireless resources for the unscheduled uplink transmission, and transmit the unscheduled uplink transmission using the shared radio frequency spectrum band based on the LBT procedure. In some cases, the UE communications manager 1215 may receive a plurality of uplink configurations from a base station, the plurality of uplink configurations for unscheduled uplink transmissions from the UE to the base station, receive a dynamic indication of a first uplink configuration of the plurality of uplink configurations to be used for a first unscheduled uplink transmission from the UE to the base station, and transmit the first unscheduled uplink transmission using the first uplink configuration Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
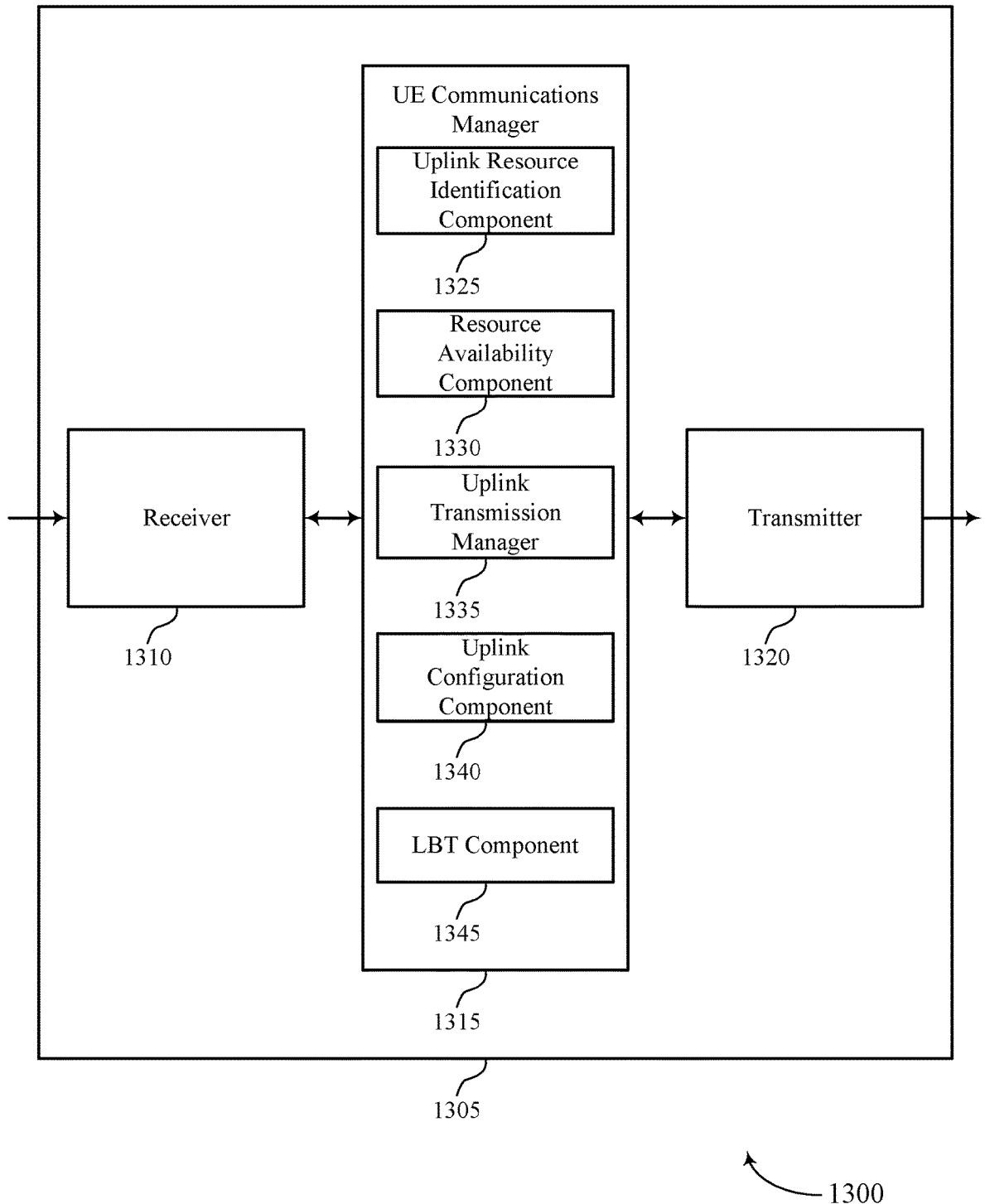

FIG. 13 shows a block diagram 1300 of a wireless device 1305 that supports uplink transmission techniques in shared spectrum wireless communications in accordance with aspects of the present disclosure. Wireless device 1305 may be an example of aspects of a wireless device 1205 or a UE 115 as described with reference to FIG. 12. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to uplink transmission techniques in shared spectrum wireless communications, etc.). Information may be passed on to other components of the device. The receiver 1310 may be an example of aspects of the transceiver 1535 described with reference to FIG. 15. The receiver 1310 may utilize a single antenna or a set of antennas.

UE communications manager 1315 may be an example of aspects of the UE communications manager 1515 described with reference to FIG. 15. UE communications manager 1315 may also include uplink resource identification component 1325, resource availability component 1330, uplink transmission manager 1335, uplink configuration component 1340, and LBT component 1345.

Uplink resource identification component 1325 may identify wireless resources within a shared radio frequency spectrum band that are available for an unscheduled uplink transmission within a self-contained radio subframe. In some cases, the identifying includes identifying one or more self-contained radio subframes that are configured for unscheduled uplink transmissions, the one or more self-contained radio subframes including first resources for uplink data transmissions and second resources for downlink transmissions responsive to the uplink data transmissions. In some cases, the identifying includes receiving a first downlink transmission in a first portion of the self-contained radio subframe that indicates that a second portion of the self-contained radio subframe is available for the unscheduled uplink transmission. In some cases, the availability of the self-contained radio subframe for the unscheduled uplink transmission is dynamically indicated in the first downlink transmission. In some cases, the identifying includes identifying the self-contained radio subframe as available for the unscheduled uplink transmission, transmitting an indication that the UE has uplink data to transmit, and receiving an indication that the UE is to transmit the uplink data in the self-contained radio subframe. In some cases, the indication includes a waveform associated with the UE or a BSR of the UE.

Resource availability component 1330 may determine that at least a portion of the identified wireless resources is available for the unscheduled uplink transmission.

Uplink transmission manager 1335 may manage transmission of the unscheduled uplink transmission during the self-contained radio subframe. In some cases, uplink transmission manager 1335 may receive, subsequent to transmitting the unscheduled uplink transmission, an indication to continue or to discontinue transmitting unscheduled uplink transmissions. In some cases, uplink transmission manager 1335 may identify a selected configuration indicated in DCI or a MAC-CE that indicates the first uplink configuration is to be used for the first unscheduled uplink transmission, and may use the first uplink configuration for the transmission of the unscheduled uplink transmission.

Uplink configuration component 1340 may receive, in some cases, RRC signaling from a base station with a number of uplink configurations that may be selected for use in unscheduled uplink transmissions. In some cases, uplink configuration component 1340 may identify a first configuration or a second configuration for transmitting an unscheduled uplink transmission in a shared radio frequency spectrum band based on an operator priority for accessing the shared radio frequency spectrum band. In some cases, the operator priority indicates whether an operator associated with the UE has priority over one or more other operators in a time duration, and the first configuration provides a first set of channel access parameters for use when the operator associated with the UE has higher priority than other operators, and the second configuration provides a second set of channel access parameters for use when the operator associated with the UE has lower priority than at least one other operator, the second set of channel access parameters allowing channel access only when at least the portion of the identified wireless resources are unused by any higher priority operator.

LBT component 1345 may perform a LBT procedure at the UE to determine availability of at least a portion of the identified wireless resources for the unscheduled uplink transmission. In some cases, the LBT procedure may be based on an identified first configuration or second configuration associated with guaranteed or opportunistic uplink resources. In some cases, the determination of availability includes performing a LBT procedure at the UE to determine availability of at least the portion of the identified wireless resources for the unscheduled uplink transmission. In some cases, the performing the LBT procedure further includes sensing that another transmitter is transmitting using at least the portion of the identified wireless resources, determining a CW duration based on the identified first configuration or second configuration, and determining, upon expiration of the CW, whether another transmitter is transmitting using at least the portion of the identified wireless resources. In some cases, the CW duration is set to a first value when the first configuration is used for the unscheduled uplink transmission and is set to a second value when the second configuration is used for the unscheduled uplink transmission. In some cases, the CW duration is set to a first value for scheduled uplink transmission and is set to a second value for unscheduled uplink transmissions.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
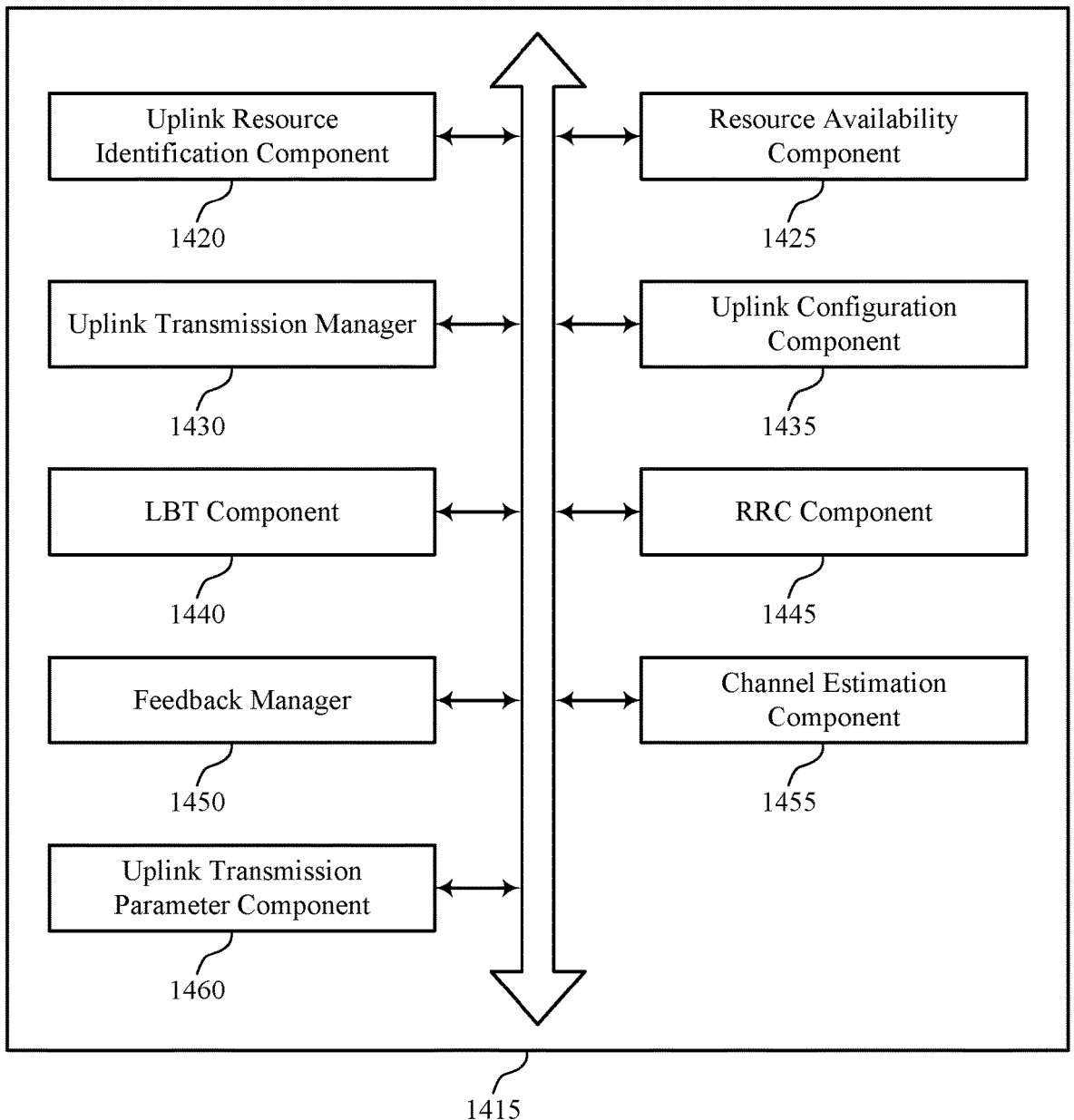

FIG. 14 shows a block diagram 1400 of a UE communications manager 1415 that supports uplink transmission techniques in shared spectrum wireless communications in accordance with aspects of the present disclosure. The UE communications manager 1415 may be an example of aspects of a UE communications manager 1215, a UE communications manager 1315, or a UE communications manager 1515 described with reference to FIGS. 12, 13, and 15. The UE communications manager 1415 may include uplink resource identification component 1420, resource availability component 1425, uplink transmission manager 1430, uplink configuration component 1435, LBT component 1440, radio resource control (RRC) component 1445, feedback manager 1450, channel estimation component 1455, and uplink transmission parameter component 1460. Each of these modules may communicate, directly or indirectly, with one another (e.g., via one or more buses).

Uplink resource identification component 1420 may identify wireless resources within a shared radio frequency spectrum band that are available for an unscheduled uplink transmission within a self-contained radio subframe. In some cases, the identifying includes identifying one or more self-contained radio subframes that are configured for unscheduled uplink transmissions, the one or more self-contained radio subframes including first resources for uplink data transmissions and second resources for downlink transmissions responsive to the uplink data transmissions. In some cases, the identifying includes receiving a first downlink transmission in a first portion of the self-contained radio subframe that indicates that a second portion of the self-contained radio subframe is available for the unscheduled uplink transmission. In some cases, the availability of the self-contained radio subframe for the unscheduled uplink transmission is dynamically indicated in the first downlink transmission. In some cases, the identifying includes identifying the self-contained radio subframe as available for the unscheduled uplink transmission, transmitting an indication that the UE has uplink data to transmit, and receiving an indication that the UE is to transmit the uplink data in the self-contained radio subframe. In some cases, the indication includes a waveform associated with the UE or a BSR of the UE.

Resource availability component 1425 may determine that at least a portion of the identified wireless resources is available for the unscheduled uplink transmission.

Uplink transmission manager 1430 may manage transmission of the unscheduled uplink transmission during the self-contained radio subframe. In some cases, uplink transmission manager 1430 may receive, subsequent to transmitting the unscheduled uplink transmission, an indication to continue or to discontinue transmitting unscheduled uplink transmissions. In some cases, uplink transmission manager 1430 may identify a selected configuration indicated in DCI or a MAC-CE that indicates the first uplink configuration is to be used for the first unscheduled uplink transmission, and may use the first uplink configuration for the transmission of the unscheduled uplink transmission.

Uplink configuration component 1435 may receive, in some cases, RRC signaling from a base station with a number of uplink configurations that may be selected for use in unscheduled uplink transmissions. In some cases, uplink configuration component 1435 may identify a first configuration or a second configuration for transmitting an unscheduled uplink transmission in a shared radio frequency spectrum band based on an operator priority for accessing the shared radio frequency spectrum band. In some cases, the operator priority indicates whether an operator associated with the UE has priority over one or more other operators in a time duration, and the first configuration provides a first set of channel access parameters for use when the operator associated with the UE has higher priority than other operators, and the second configuration provides a second set of channel access parameters for use when the operator associated with the UE has lower priority than at least one other operator, the second set of channel access parameters allowing channel access only when at least the portion of the identified wireless resources are unused by any higher priority operator.

LBT component 1440 may perform a LBT procedure at the UE to determine availability of at least a portion of the identified wireless resources for the unscheduled uplink transmission. In some cases, the LBT procedure may be based on an identified first configuration or second configuration associated with guaranteed or opportunistic uplink resources. In some cases, the determination of availability includes performing a LBT procedure at the UE to determine availability of at least the portion of the identified wireless resources for the unscheduled uplink transmission. In some cases, the performing the LBT procedure further includes sensing that another transmitter is transmitting using at least the portion of the identified wireless resources, determining a CW duration based on the identified first configuration or second configuration, and determining, upon expiration of the CW, whether another transmitter is transmitting using at least the portion of the identified wireless resources. In some cases, the CW duration is set to a first value when the first configuration is used for the unscheduled uplink transmission and is set to a second value when the second configuration is used for the unscheduled uplink transmission. In some cases, the CW duration is set to a first value for scheduled uplink transmission and is set to a second value for unscheduled uplink transmissions.

RRC component 1445 may receive RRC signaling that may include configuration information. In some cases, the one or more self-contained radio subframes are semi-statically configured for unscheduled uplink transmissions. In some cases, the configuration is received via RRC signaling to semi-statically configure the unscheduled uplink transmissions.

Feedback manager 1450 may receive a downlink transmission responsive to the unscheduled uplink transmission during a portion of the self-contained radio subframe, which may include an acknowledgment indicating successful or unsuccessful receipt of the unscheduled uplink transmission. In some cases, the acknowledgment may be received in a downlink channel or in downlink control information (DCI) associated with the unscheduled uplink transmission.

Channel estimation component 1455 may measure a channel quality of the identified wireless resources based on a reference signal in the first downlink transmission. Uplink transmission parameter component 1460 may determine one or more uplink transmission parameters for the unscheduled uplink transmission based on the channel quality.

Figure 15:
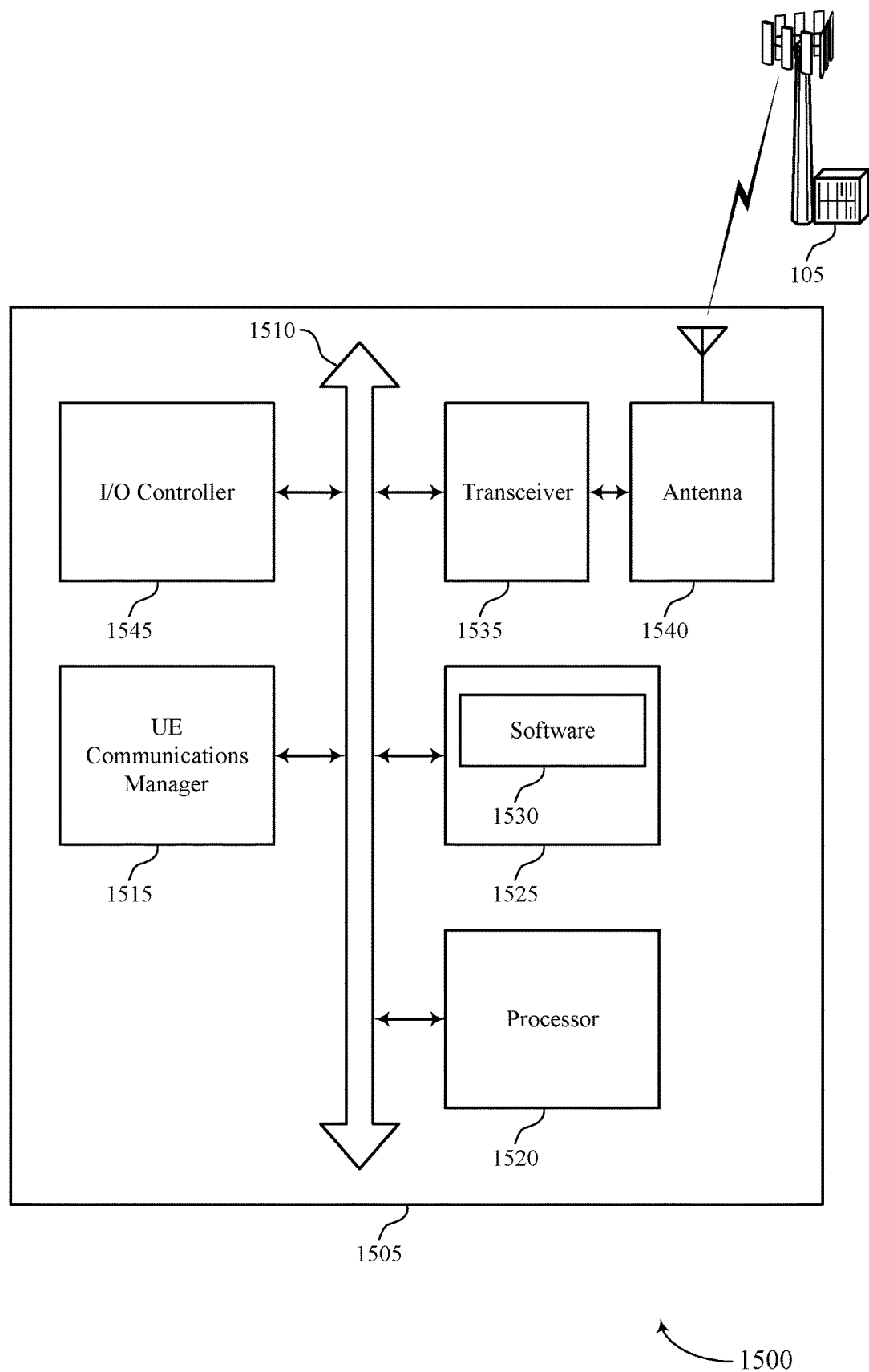
FIG. 15 illustrates a block diagram of a system including a UE that supports uplink transmission techniques in shared spectrum wireless communications in accordance with aspects of the present disclosure.

FIG. 15 shows a diagram of a system 1500 including a device 1505 that supports uplink transmission techniques in shared spectrum wireless communications in accordance with aspects of the present disclosure. Device 1505 may be an example of or include the components of wireless device 1205, wireless device 1305, or a UE 115 as described above, e.g., with reference to FIGS. 12 and 13. Device 1505 may include components for bi-directional voice and data communications including components for transmitting and receiving communications, including UE communications manager 1515, processor 1520, memory 1525, software 1530, transceiver 1535, antenna 1540, and I/O controller 1545. These components may be in electronic communication via one or more buses (e.g., bus 1510). Device 1505 may communicate wirelessly with one or more base stations 105.

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting uplink transmission techniques in shared spectrum wireless communications).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware or software operation such as the interaction with peripheral components or devices.

Software 1530 may include code to implement aspects of the present disclosure, including code to support uplink transmission techniques in shared spectrum wireless communications. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

Figure 16:
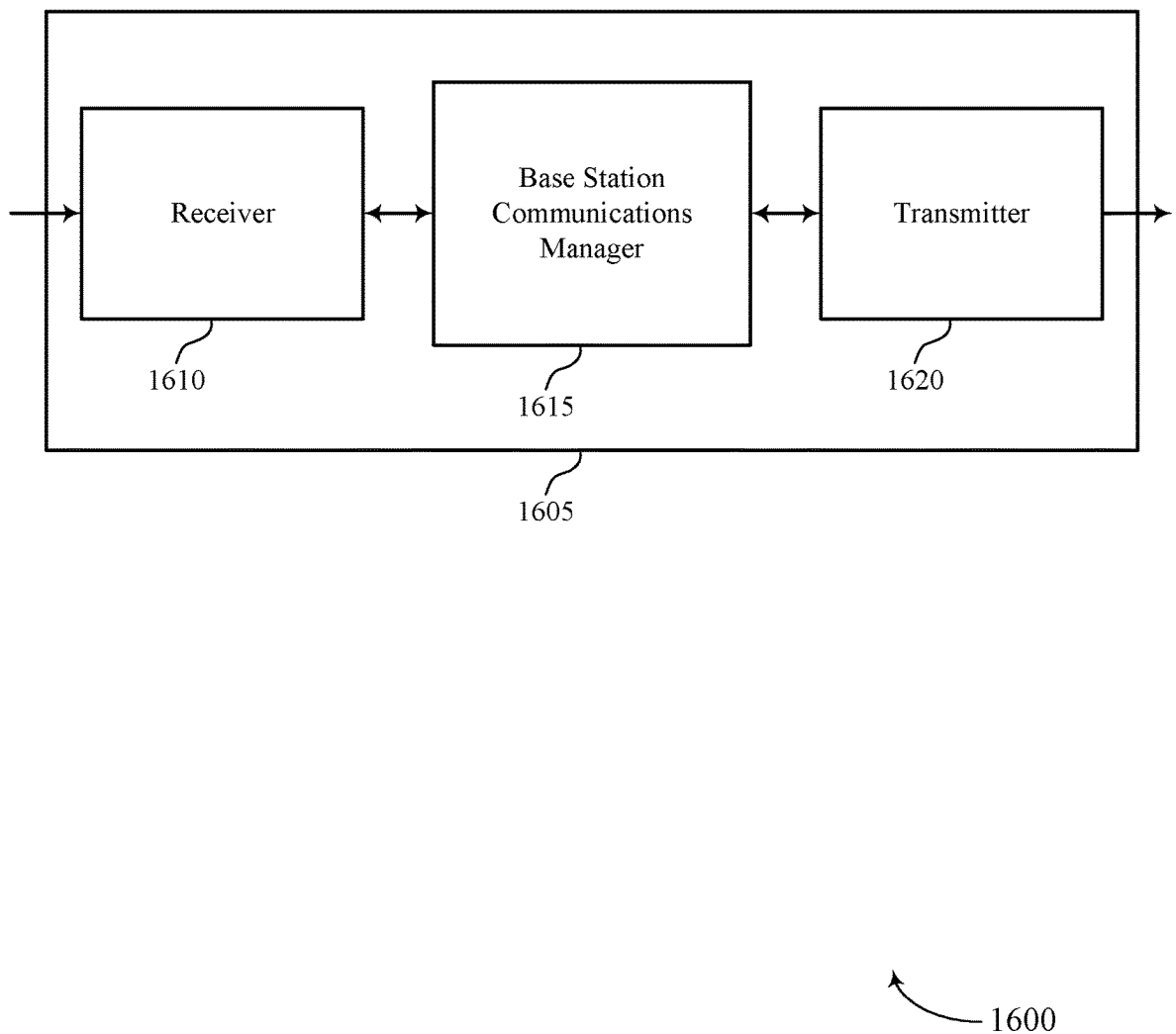
FIGS. 16 through 18 show block diagrams of a device that supports uplink transmission techniques in shared spectrum wireless communications in accordance with aspects of the present disclosure.

FIG. 16 shows a block diagram 1600 of a wireless device 1605 that supports uplink transmission techniques in shared spectrum wireless communications in accordance with aspects of the present disclosure. Wireless device 1605 may be an example of aspects of a base station 105 as described herein. Wireless device 1605 may include receiver 1610, base station communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to uplink transmission techniques in shared spectrum wireless communications, etc.). Information may be passed on to other components of the device. The receiver 1610 may be an example of aspects of the transceiver 1935 described with reference to FIG. 19. The receiver 1610 may utilize a single antenna or a set of antennas.

Base station communications manager 1615 may be an example of aspects of the base station communications manager 1915 described with reference to FIG. 19.

Base station communications manager 1615 and/or at least some of its various sub-components may be implemented in hardware, software executed by a processor, firmware, or any combination thereof. If implemented in software executed by a processor, the functions of the base station communications manager 1615 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1615 and/or at least some of its various sub-components may be physically located at various positions, including being distributed such that portions of functions are implemented at different physical locations by one or more physical devices. In some examples, base station communications manager 1615 and/or at least some of its various sub-components may be a separate and distinct component in accordance with various aspects of the present disclosure. In other examples, base station communications manager 1615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1615 may identify wireless resources within a shared radio frequency spectrum band that are available for an unscheduled uplink transmission within a self-contained radio subframe, indicate that the wireless resources within the self-contained radio subframe are available for the unscheduled uplink transmission to a UE, and receive the unscheduled uplink transmission from the UE during the self-contained radio subframe. The base station communications manager 1615 may also configure a UE with a first configuration and a second configuration for transmitting an unscheduled uplink transmission in a shared radio frequency spectrum band and to select the first configuration or the second configuration based on an operator priority for accessing the shared radio frequency spectrum band, identify wireless resources within the shared radio frequency spectrum band that are available for unscheduled uplink transmissions, and monitor the identified wireless resources for the unscheduled uplink transmission. The base station communications manager 1615 may also configure wireless resources of one or more transmission beams within a shared radio frequency spectrum band that are available for an unscheduled uplink transmission by a UE, transmit configuration information to the UE that indicates the wireless resources of the one or more transmission beams configured for unscheduled uplink transmissions, and monitor the configured wireless resources of the one or more transmission beams for the unscheduled uplink transmission from the UE.

The base station communications manager 1615 may, in some cases, configure a UE with a plurality of uplink configurations, the plurality of uplink configurations for unscheduled uplink transmissions from the UE to a base station, identify wireless resources that are available for unscheduled uplink transmissions, transmit an indication of the identified wireless resources that are available for unscheduled uplink transmissions and a first uplink configuration of the plurality of uplink configurations to be used for unscheduled uplink transmissions using the identified wireless resources, and monitor the identified wireless resources for a first unscheduled uplink transmission from the UE.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may utilize a single antenna or a set of antennas.

Figure 17:
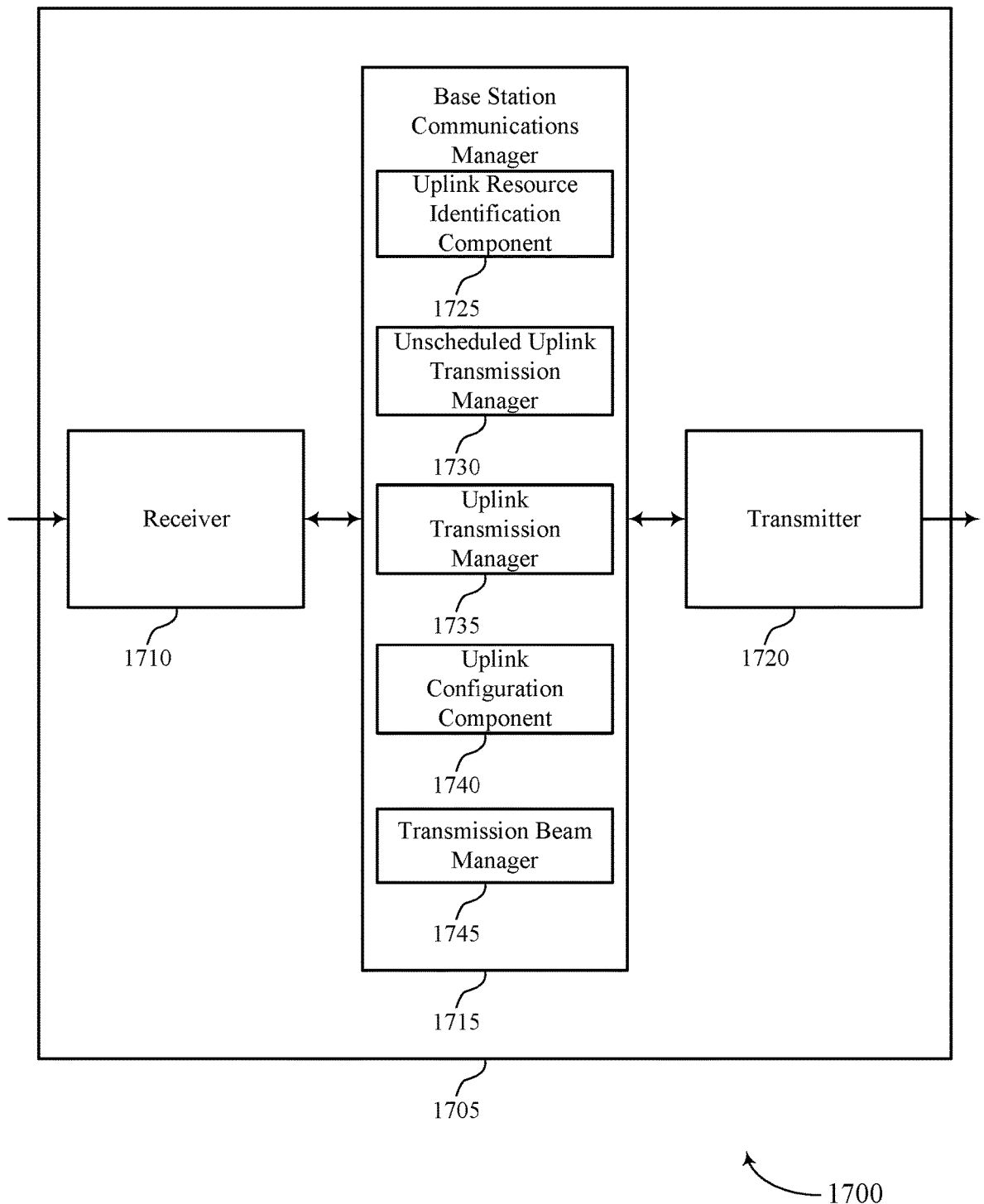

FIG. 17 shows a block diagram 1700 of a wireless device 1705 that supports uplink transmission techniques in shared spectrum wireless communications in accordance with aspects of the present disclosure. Wireless device 1705 may be an example of aspects of a wireless device 1605 or a base station 105 as described with reference to FIG. 16. Wireless device 1705 may include receiver 1710, base station communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to uplink transmission techniques in shared spectrum wireless communications, etc.). Information may be passed on to other components of the device. The receiver 1710 may be an example of aspects of the transceiver 1935 described with reference to FIG. 19. The receiver 1710 may utilize a single antenna or a set of antennas.

Base station communications manager 1715 may be an example of aspects of the base station communications manager 1915 described with reference to FIG. 19. Base station communications manager 1715 may also include uplink resource identification component 1725, unscheduled uplink transmission manager 1730, uplink transmission manager 1735, uplink configuration component 1740, and transmission beam manager 1745.

Uplink resource identification component 1725 may identify wireless resources within a shared radio frequency spectrum band that are available for an unscheduled uplink transmission within a self-contained radio subframe, and transmit configuration information to the UE that indicates the wireless resources configured for unscheduled uplink transmissions. In some cases, resources may be dynamically allocated for unscheduled uplink transmissions in a common physical downlink control channel (PDCCH) transmission. In some cases, uplink resource identification component 1725 may activate or withdraw at least a portion of semi-statically allocated resources in the common PDCCH transmission. In some cases, the identifying includes configuring one or more self-contained radio subframes for unscheduled uplink transmissions, the one or more self-contained radio subframes including first resources for uplink data transmissions and second resources for downlink transmissions responsive to the uplink data transmissions.

Unscheduled uplink transmission manager 1730 may indicate that the wireless resources within the self-contained radio subframe are available for the unscheduled uplink transmission to a UE. In some cases, the indicating includes transmitting configuration information to the UE that indicates the one or more self-contained radio subframes for unscheduled uplink transmissions. In some cases, the one or more self-contained radio subframes are semi-statically configured for unscheduled uplink transmissions using RRC signaling. In some cases, the indicating includes transmitting a first downlink transmission in a first portion of the self-contained radio subframe that indicates that a second portion of the self-contained radio subframe is available for the unscheduled uplink transmission. In some cases, an availability of the self-contained radio subframe for the unscheduled uplink transmission is dynamically indicated in the first downlink transmission.

Uplink transmission manager 1735 may receive the unscheduled uplink transmission from the UE during the self-contained radio subframe, transmit, subsequent to receiving the unscheduled uplink transmission, an indication to continue or to discontinue transmitting unscheduled uplink transmissions, monitor the identified wireless resources for the unscheduled uplink transmission, and monitor the configured wireless resources of the one or more transmission beams for the unscheduled uplink transmission from the UE.

Uplink configuration component 1740 may configure a UE with a number of different uplink transmission configurations that may be selected for one or more unscheduled uplink transmissions from the UE. In some cases, uplink configuration component 1740 may indicate (e.g., via DCI or a MAC-CE) which of the configured uplink transmission configurations is to be used by the UE for one or more subsequent unscheduled uplink transmissions. In some cases, uplink configuration component 1740 may configure a UE with a first configuration and a second configuration for transmitting an unscheduled uplink transmission in a shared radio frequency spectrum band and to select the first configuration or the second configuration based on an operator priority for accessing the shared radio frequency spectrum band. In some cases, the operator priority indicates whether an operator associated with the UE has priority over one or more other operators in a time duration, and the first configuration provides a first set of channel access parameters for use when the operator associated with the UE has higher priority than other operators, and the second configuration provides a second set of channel access parameters for use when the operator associated with the UE has lower priority than at least one other operator, the second set of channel access parameters allowing channel access only when at least the portion of the identified wireless resources are unused by any higher priority operator.

Transmission beam manager 1745 may configure wireless resources of one or more transmission beams within a shared radio frequency spectrum band that are available for an unscheduled uplink transmission by a UE and configure a beam width of the wireless resources of the one or more transmission beams based on an operator priority of an operator associated with the base station. In some cases, the beam width is configured to be a wider beam width when the operator priority of the operator associated with the base station is a lower priority than one or more other operators, and is configured to be a narrower beam width when the operator priority of the operator associated with the base station is a higher priority than any other operators. In some cases, transmission beam manager 1745 may configure one or more of a transmission power offset, additional transmission bandwidth or time resources, or a MCS/rank offset relative to a scheduled uplink transmission to compensate for beamforming loss associated with the unscheduled uplink transmission. In some cases, the transmission beam manager 1745 may transmit the configuration information to a set of UEs in a common PDCCH transmission having a wider transmission beam width than a transmission beam width of a physical downlink shared channel (PDSCH) transmission to a single UE.

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may utilize a single antenna or a set of antennas.

Figure 18:
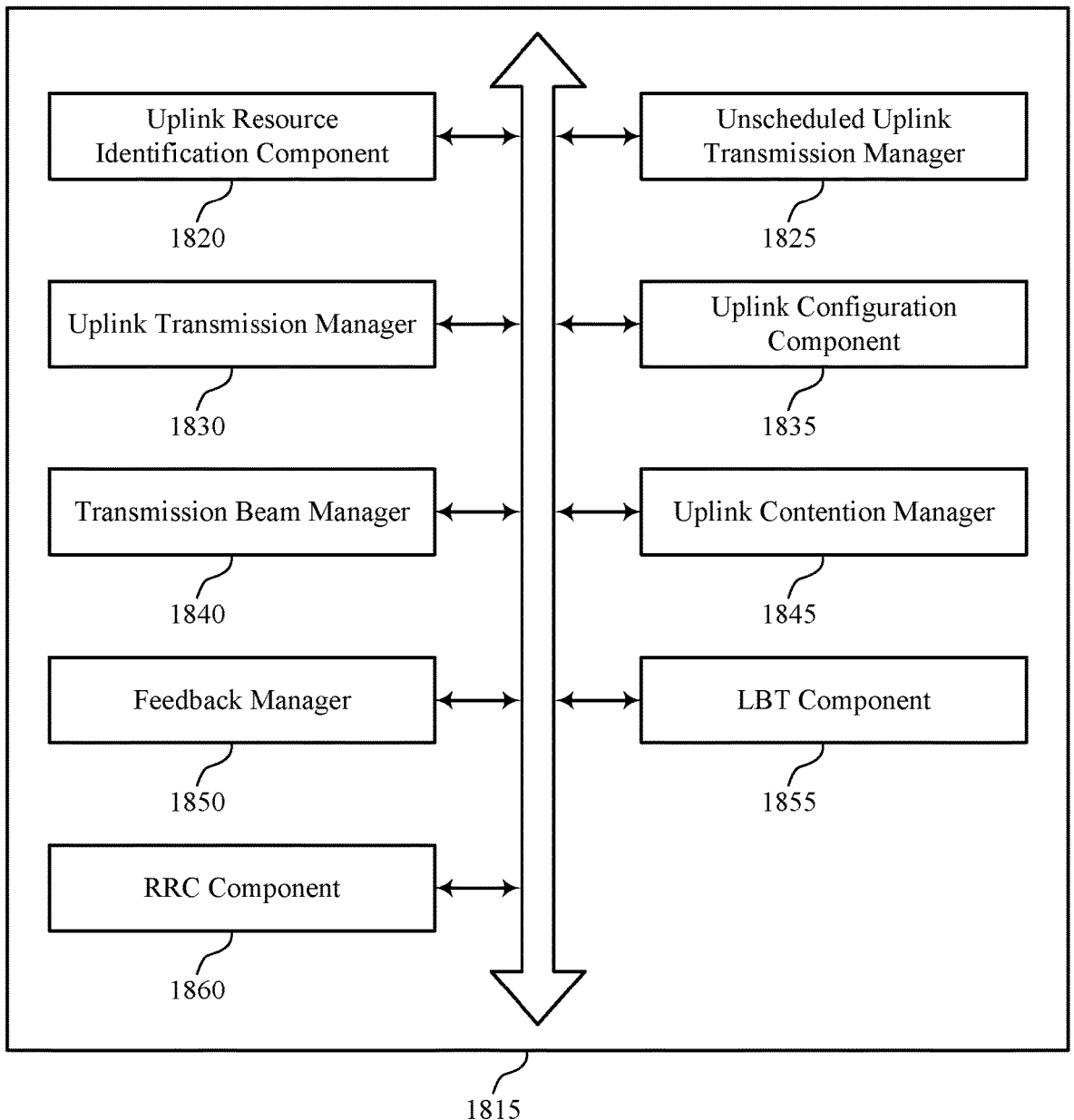

FIG. 18 shows a block diagram 1800 of a base station communications manager 1815 that supports uplink transmission techniques in shared spectrum wireless communications in accordance with aspects of the present disclosure. The base station communications manager 1815 may be an example of aspects of a base station communications manager 1915 described with reference to FIGS. 16, 17, and 19. The base station communications manager 1815 may include uplink resource identification component 1820, unscheduled uplink transmission manager 1825, uplink transmission manager 1830, uplink configuration component 1835, transmission beam manager 1840, uplink contention manager 1845, feedback manager 1850, LBT component 1855, and RRC component 1860. Each of these modules may communicate, directly or indirectly, with one another (e.g., via one or more buses).

Uplink resource identification component 1820 may identify wireless resources within a shared radio frequency spectrum band that are available for an unscheduled uplink transmission within a self-contained radio subframe, and transmit configuration information to the UE that indicates the wireless resources configured for unscheduled uplink transmissions. In some cases, resources may be dynamically allocated for unscheduled uplink transmissions in a common physical downlink control channel (PDCCH) transmission. In some cases, uplink resource identification component 1820 may activate or withdraw at least a portion of semi-statically allocated resources in the common PDCCH transmission. In some cases, uplink resource identification component 1820 may configure one or more self-contained radio subframes for unscheduled uplink transmissions, the one or more self-contained radio subframes including first resources for uplink data transmissions and second resources for downlink transmissions responsive to the uplink data transmissions.

Unscheduled uplink transmission manager 1825 may indicate that the wireless resources within the self-contained radio subframe are available for the unscheduled uplink transmission to a UE. In some cases, the indicating includes transmitting configuration information to the UE that indicates the one or more self-contained radio subframes for unscheduled uplink transmissions. In some cases, the one or more self-contained radio subframes are semi-statically configured for unscheduled uplink transmissions using RRC signaling. In some cases, the indicating includes transmitting a first downlink transmission in a first portion of the self-contained radio subframe that indicates that a second portion of the self-contained radio subframe is available for the unscheduled uplink transmission. In some cases, an availability of the self-contained radio subframe for the unscheduled uplink transmission is dynamically indicated in the first downlink transmission.

Uplink transmission manager 1830 may receive the unscheduled uplink transmission from the UE during the self-contained radio subframe, transmit, subsequent to receiving the unscheduled uplink transmission, an indication to continue or to discontinue transmitting unscheduled uplink transmissions, monitor the identified wireless resources for the unscheduled uplink transmission, and monitor the configured wireless resources of the one or more transmission beams for the unscheduled uplink transmission from the UE.

Uplink configuration component 1835 may configure a UE with a number of different uplink transmission configurations that may be selected for one or more unscheduled uplink transmissions from the UE. In some cases, uplink configuration component 1835 may indicate (e.g., via DCI or a MAC-CE) which of the configured uplink transmission configurations is to be used by the UE for one or more subsequent unscheduled uplink transmissions. In some cases, uplink configuration component 1835 may configure a UE with a first configuration and a second configuration for transmitting an unscheduled uplink transmission in a shared radio frequency spectrum band and to select the first configuration or the second configuration based on an operator priority for accessing the shared radio frequency spectrum band. In some cases, the operator priority indicates whether an operator associated with the UE has priority over one or more other operators in a time duration, and the first configuration provides a first set of channel access parameters for use when the operator associated with the UE has higher priority than other operators, and the second configuration provides a second set of channel access parameters for use when the operator associated with the UE has lower priority than at least one other operator, the second set of channel access parameters allowing channel access only when at least the portion of the identified wireless resources are unused by any higher priority operator.

Transmission beam manager 1840 may configure wireless resources of one or more transmission beams within a shared radio frequency spectrum band that are available for an unscheduled uplink transmission by a UE and configure a beam width of the wireless resources of the one or more transmission beams based on an operator priority of an operator associated with the base station. In some cases, the beam width is configured to be a wider beam width when the operator priority of the operator associated with the base station is a lower priority than one or more other operators, and is configured to be a narrower beam width when the operator priority of the operator associated with the base station is a higher priority than any other operators. In some cases, the transmission beam manager 1840 may configure one or more of a transmission power offset, additional transmission bandwidth or time resources, or a MCS/rank offset relative to a scheduled uplink transmission to compensate for beamforming loss associated with the unscheduled uplink transmission. In some cases, the transmission beam manager 1840 may transmit the configuration information to a set of UEs in a common PDCCH transmission having a wider transmission beam width than a transmission beam width of a physical downlink shared channel (PDSCH) transmission to a single UE.

Uplink contention manager 1845 may manage contention among UEs for unscheduled uplink resources. In some cases, the uplink contention manager 1845 may receive an indication, during a first portion of the self-contained radio subframe, that the UE has uplink data to transmit, select the UE for transmitting the uplink data during the self-contained radio subframe, and authorize the UE is to transmit the uplink data in the self-contained radio subframe.

Feedback manager 1850 may determine whether the unscheduled uplink transmission is successfully received and transmit an acknowledgment of successful or unsuccessful receipt of the unscheduled uplink transmission in a downlink channel or in DCI associated with the unscheduled uplink transmission.

LBT component 1855 may configure one or more LBT parameters. In some cases, the configuring includes configuring the UE to determine a CW duration based on the identified first configuration or second configuration. In some cases, the CW duration is set to a first value when the first configuration is used for the unscheduled uplink transmission and is set to a second value when the second configuration is used for the unscheduled uplink transmission. In some cases, the CW duration is set to a first value for scheduled uplink transmission and is set to a second value for unscheduled uplink transmissions.

RRC component 1860 may semi-statically allocate resources for unscheduled uplink transmissions using RRC signaling and, in some cases, provide a number of different uplink configurations to one or more UEs that may be selected for transmitting one or more unscheduled uplink transmissions.

Figure 19:
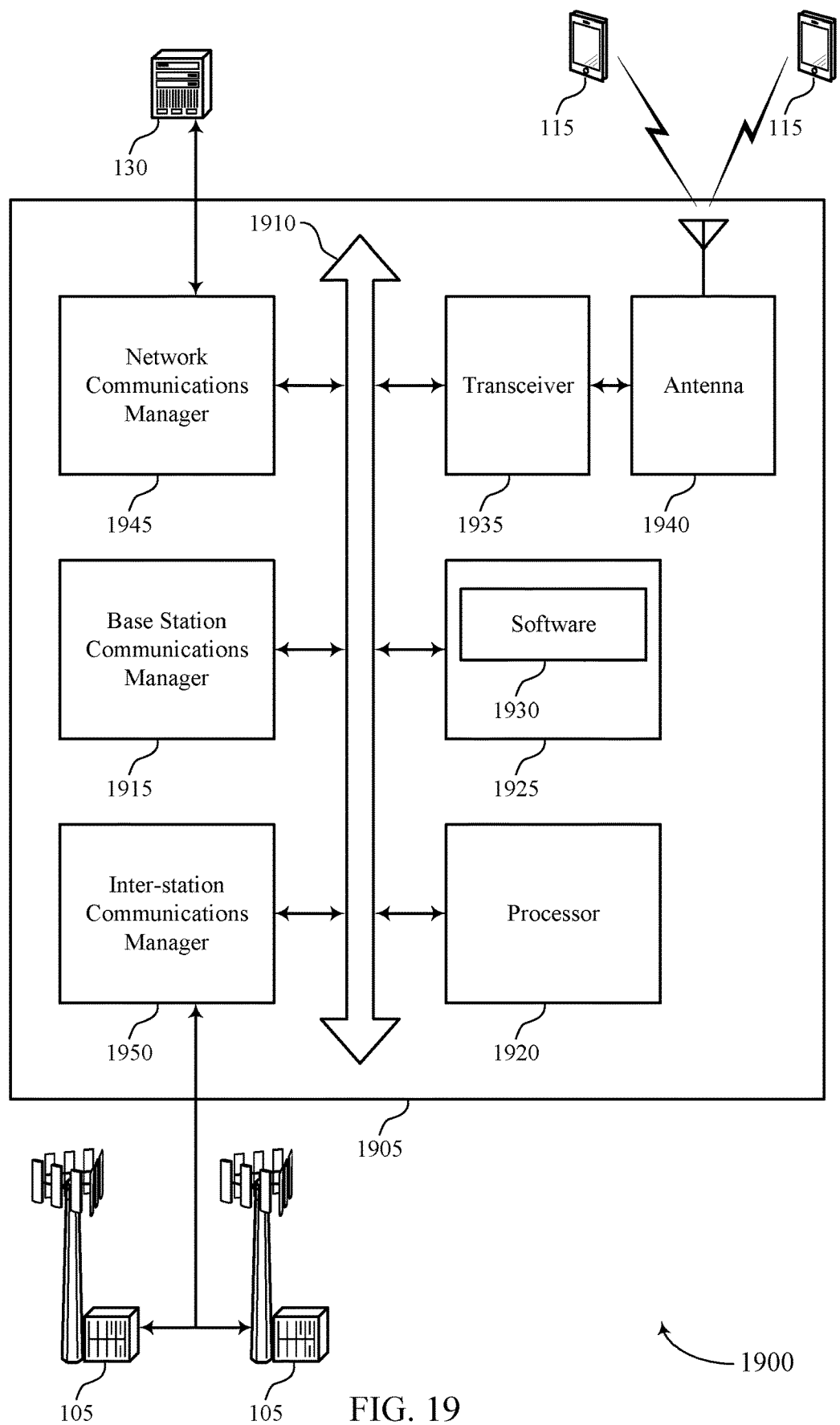
FIG. 19 illustrates a block diagram of a system including a base station that supports uplink transmission techniques in shared spectrum wireless communications in accordance with aspects of the present disclosure.

FIG. 19 shows a diagram of a system 1900 including a device 1905 that supports uplink transmission techniques in shared spectrum wireless communications in accordance with aspects of the present disclosure. Device 1905 may be an example of or include the components of base station 105 as described above, e.g., with reference to FIG. 1. Device 1905 may include components for bi-directional voice and data communications including components for transmitting and receiving communications, including base station communications manager 1915, processor 1920, memory 1925, software 1930, transceiver 1935, antenna 1940, network communications manager 1945, and inter-station communications manager 1950. These components may be in electronic communication via one or more buses (e.g., bus 1910). Device 1905 may communicate wirelessly with one or more UEs 115.

Processor 1920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting uplink transmission techniques in shared spectrum wireless communications).

Memory 1925 may include RAM and ROM. The memory 1925 may store computer-readable, computer-executable software 1930 including instructions that, when executed, cause the processor to perform various functions described herein. In some cases, the memory 1925 may contain, among other things, a BIOS which may control basic hardware or software operation such as the interaction with peripheral components or devices.

Software 1930 may include code to implement aspects of the present disclosure, including code to support uplink transmission techniques in shared spectrum wireless communications. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

In some cases, the wireless device may include a single antenna 1940. However, in some cases the device may have more than one antenna 1940, which may be capable of concurrently transmitting or receiving multiple wireless transmissions.

Network communications manager 1945 may manage communications with the core network (e.g., via one or more wired backhaul links). For example, the network communications manager 1945 may manage the transfer of data communications for client devices, such as one or more UEs 115.

Inter-station communications manager 1950 may manage communications with other base station 105, and may include a controller or scheduler for controlling communications with UEs 115 in cooperation with other base stations 105. For example, the inter-station communications manager 1950 may coordinate scheduling for transmissions to UEs 115 for various interference mitigation techniques such as beamforming or joint transmission. In some examples, inter-station communications manager 1950 may provide an X2 interface within an Long Term Evolution (LTE)/LTE-A wireless communication network technology to provide communication between base stations 105.

Figure 20:
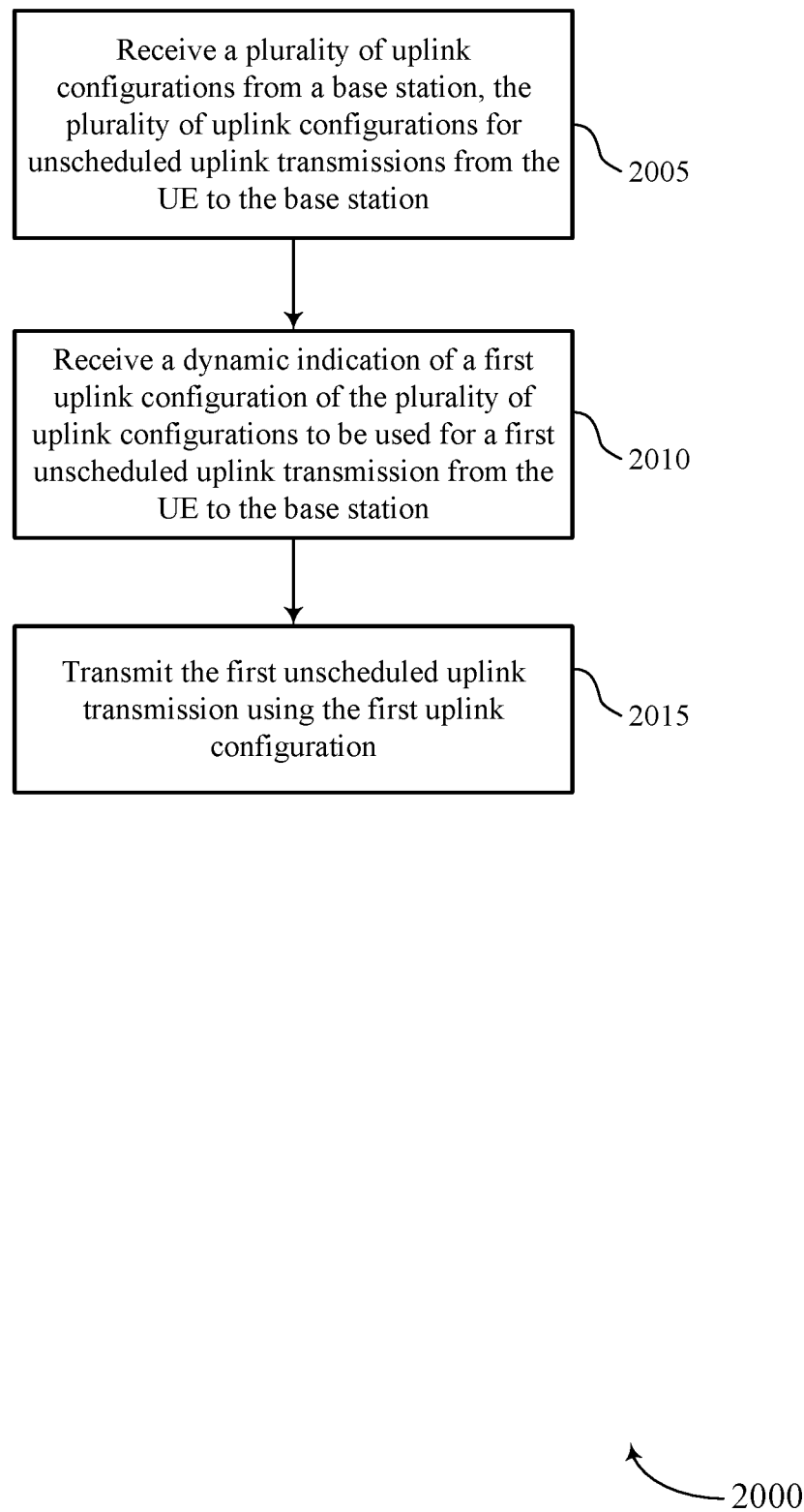
FIGS. 20 through 31 illustrate methods for uplink transmission techniques in shared spectrum wireless communications in accordance with aspects of the present disclosure.

FIG. 20 shows a flowchart illustrating a method 2000 for uplink transmission techniques in shared spectrum wireless communications in accordance with aspects of the present disclosure. The operations of method 2000 may be implemented by a UE 115 or its components as described herein. For example, the operations of method 2000 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may receive a plurality of uplink configurations from a base station, the plurality of uplink configurations for unscheduled uplink transmissions from the UE to the base station. The operations of block 2005 may be performed according to the methods described herein. In certain examples, aspects of the operations of block 2005 may be performed by an uplink configuration component as described with reference to FIGS. 12 through 15.

At block 2010 the UE 115 may receive a dynamic indication of a first uplink configuration of the plurality of uplink configurations to be used for a first unscheduled uplink transmission from the UE to the base station. The operations of block 2010 may be performed according to the methods described herein. In certain examples, aspects of the operations of block 2010 may be performed by a uplink transmission manager as described with reference to FIGS. 12 through 15.

At block 2015 the UE 115 may transmit the first unscheduled uplink transmission using the first uplink configuration. The operations of block 2015 may be performed according to the methods described herein. In certain examples, aspects of the operations of block 2015 may be performed by a uplink transmission manager as described with reference to FIGS. 12 through 15.

Figure 21:
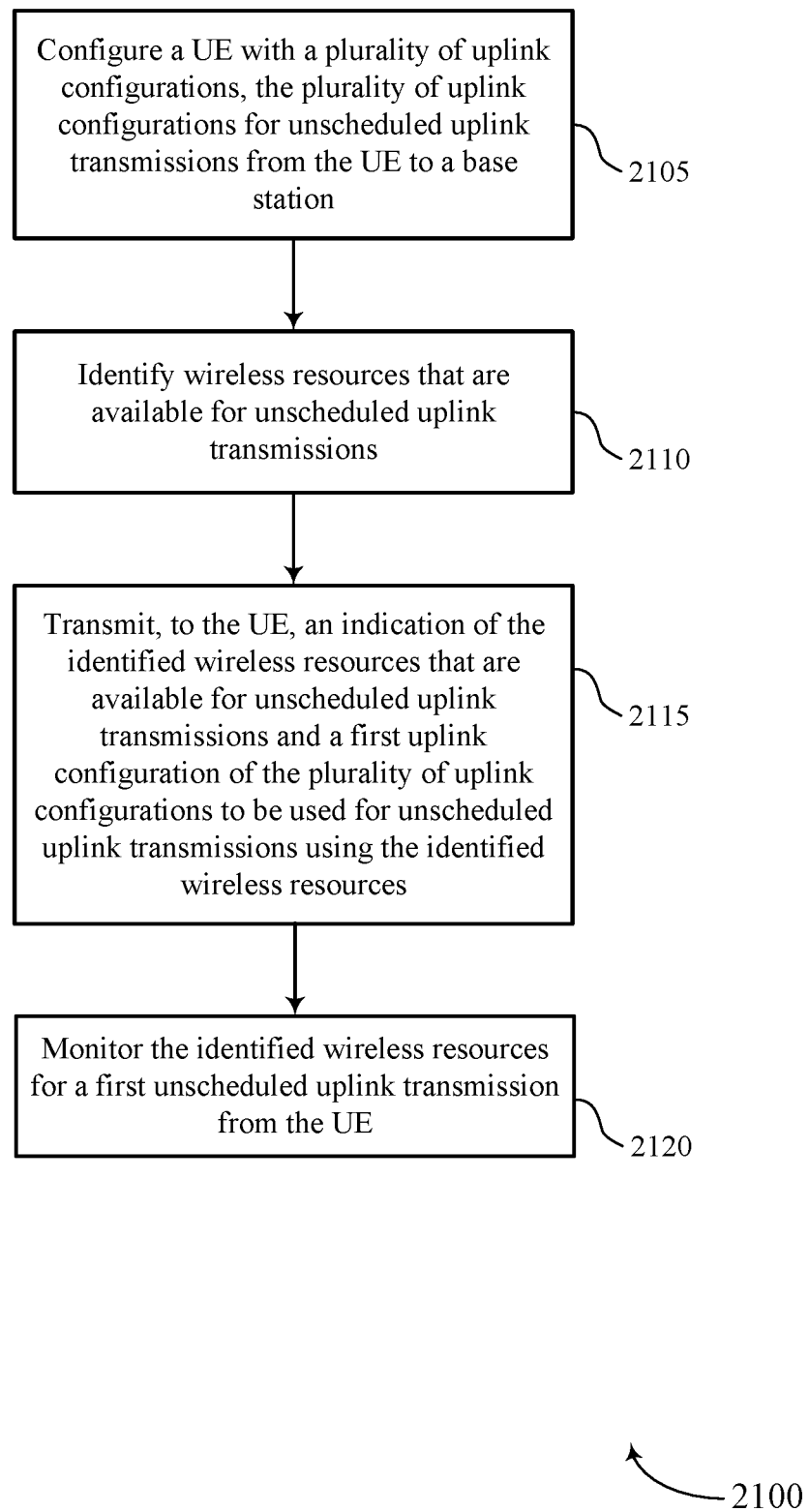

FIG. 21 shows a flowchart illustrating a method 2100 for uplink transmission techniques in shared spectrum wireless communications in accordance with aspects of the present disclosure. The operations of method 2100 may be implemented by a base station 105 or its components as described herein. For example, the operations of method 2100 may be performed by a base station communications manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may configure a UE with a plurality of uplink configurations, the plurality of uplink configurations for unscheduled uplink transmissions from the UE to a base station. The operations of block 2105 may be performed according to the methods described herein. In certain examples, aspects of the operations of block 2105 may be performed by an uplink configuration component and/or RRC component as described with reference to FIGS. 16 through 19.

At block 2110 the base station 105 may identify wireless resources that are available for unscheduled uplink transmissions. The operations of block 2110 may be performed according to the methods described herein. In certain examples, aspects of the operations of block 2110 may be performed by a unscheduled uplink transmission manager as described with reference to FIGS. 16 through 19.

At block 2115 the base station 105 may transmit an indication of the identified wireless resources that are available for unscheduled uplink transmissions and a first uplink configuration of the plurality of uplink configurations to be used for unscheduled uplink transmissions using the identified wireless resources. The operations of block 2115 may be performed according to the methods described herein. In certain examples, aspects of the operations of block 2115 may be performed by an uplink transmission manager as described with reference to FIGS. 16 through 19.

At block 2120 the base station 105 may monitor the identified wireless resources for a first unscheduled uplink transmission from the UE. The operations of block 2115 may be performed according to the methods described herein. In certain examples, aspects of the operations of block 2115 may be performed by an uplink transmission manager as described with reference to FIGS. 16 through 19.

Figure 22:
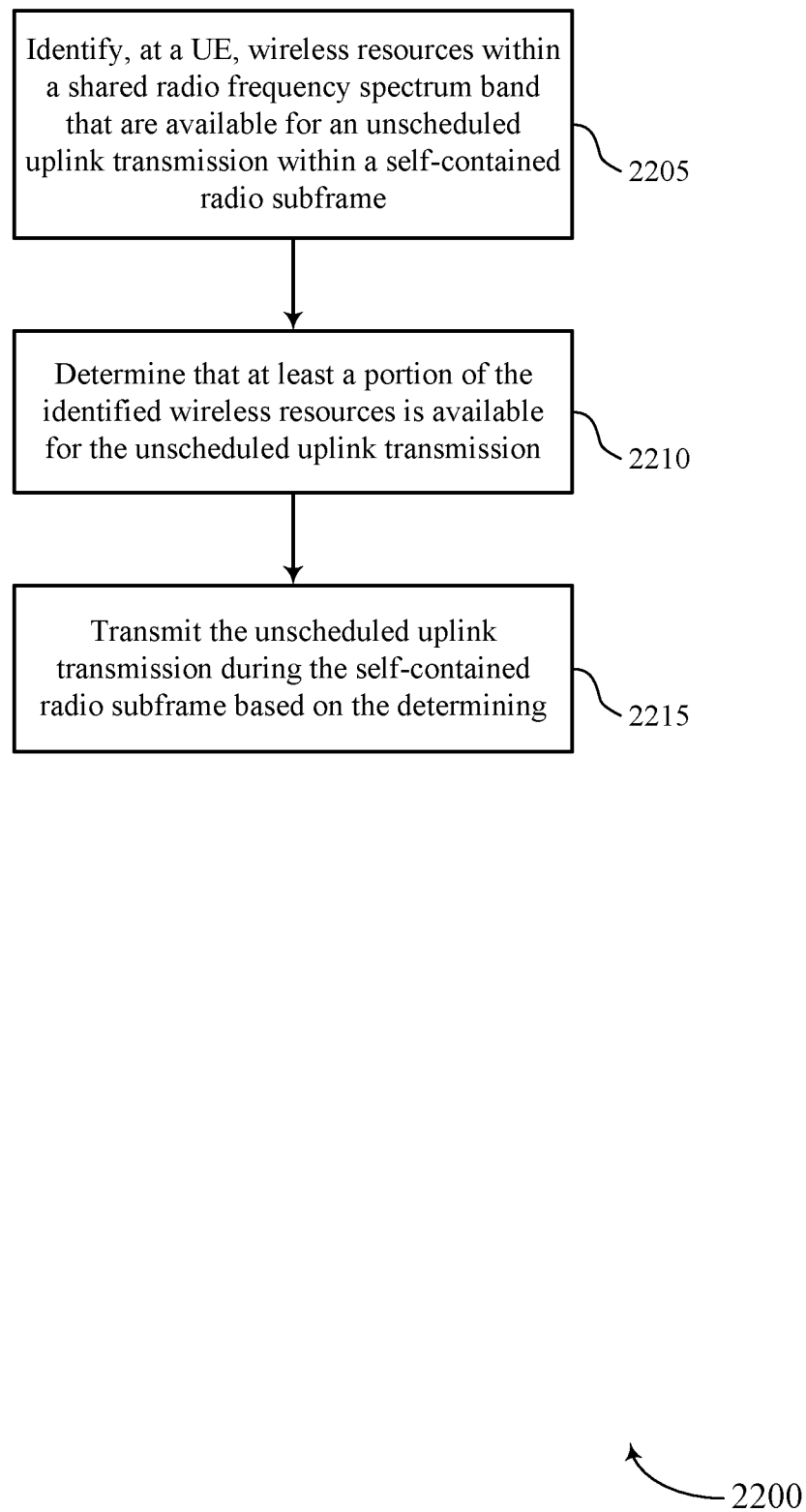

FIG. 22 shows a flowchart illustrating a method 2200 for uplink transmission techniques in shared spectrum wireless communications in accordance with aspects of the present disclosure. The operations of method 2200 may be implemented by a UE 115 or its components as described herein. For example, the operations of method 2200 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may identify wireless resources within a shared radio frequency spectrum band that are available for an unscheduled uplink transmission within a self-contained radio subframe. The operations of block 2205 may be performed according to the methods described herein. In certain examples, aspects of the operations of block 2205 may be performed by a uplink resource identification component as described with reference to FIGS. 12 through 15.

At block 2210 the UE 115 may determine that at least a portion of the identified wireless resources is available for the unscheduled uplink transmission. The operations of block 2210 may be performed according to the methods described herein. In certain examples, aspects of the operations of block 2210 may be performed by a resource availability component as described with reference to FIGS. 12 through 15.

At block 2215 the UE 115 may transmit the unscheduled uplink transmission during the self-contained radio subframe based at least in part on the determining. The operations of block 2215 may be performed according to the methods described herein. In certain examples, aspects of the operations of block 2215 may be performed by a uplink transmission manager as described with reference to FIGS. 12 through 15.

Figure 23:
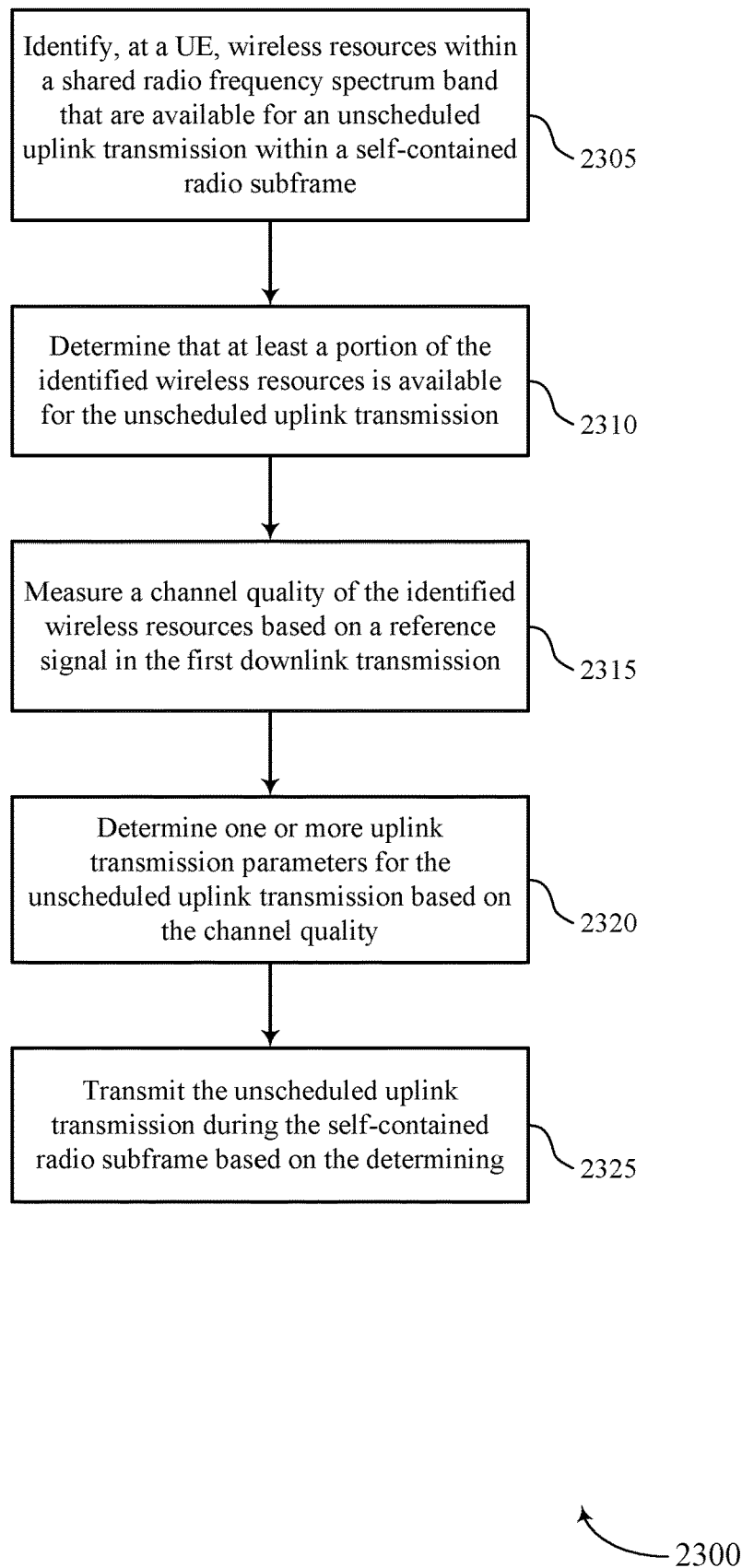

FIG. 23 shows a flowchart illustrating a method 2300 for uplink transmission techniques in shared spectrum wireless communications in accordance with aspects of the present disclosure. The operations of method 2300 may be implemented by a UE 115 or its components as described herein. For example, the operations of method 2300 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2305 the UE 115 may identify wireless resources within a shared radio frequency spectrum band that are available for an unscheduled uplink transmission within a self-contained radio subframe. The operations of block 2305 may be performed according to the methods described herein. In certain examples, aspects of the operations of block 2305 may be performed by a uplink resource identification component as described with reference to FIGS. 12 through 15. In some cases, the identifying comprises receiving a first downlink transmission in a first portion of the self-contained radio subframe that indicates that a second portion of the self-contained radio subframe is available for the unscheduled uplink transmission.

At block 2310 the UE 115 may determine that at least a portion of the identified wireless resources is available for the unscheduled uplink transmission. The operations of block 2310 may be performed according to the methods described herein. In certain examples, aspects of the operations of block 2310 may be performed by a resource availability component as described with reference to FIGS. 12 through 15.

At block 2315 the UE 115 may measure a channel quality of the identified wireless resources based at least in part on a reference signal in the first downlink transmission. The operations of block 2315 may be performed according to the methods described herein. In certain examples, aspects of the operations of block 2315 may be performed by a channel estimation component as described with reference to FIGS. 12 through 15.

At block 2320 the UE 115 may determine one or more uplink transmission parameters for the unscheduled uplink transmission based at least in part on the channel quality. The operations of block 2320 may be performed according to the methods described herein. In certain examples, aspects of the operations of block 2320 may be performed by a uplink transmission parameter component as described with reference to FIGS. 12 through 15.

At block 2325 the UE 115 may transmit the unscheduled uplink transmission during the self-contained radio subframe based at least in part on the determining. The operations of block 2325 may be performed according to the methods described herein. In certain examples, aspects of the operations of block 2325 may be performed by a uplink transmission manager as described with reference to FIGS. 12 through 15.

Figure 24:
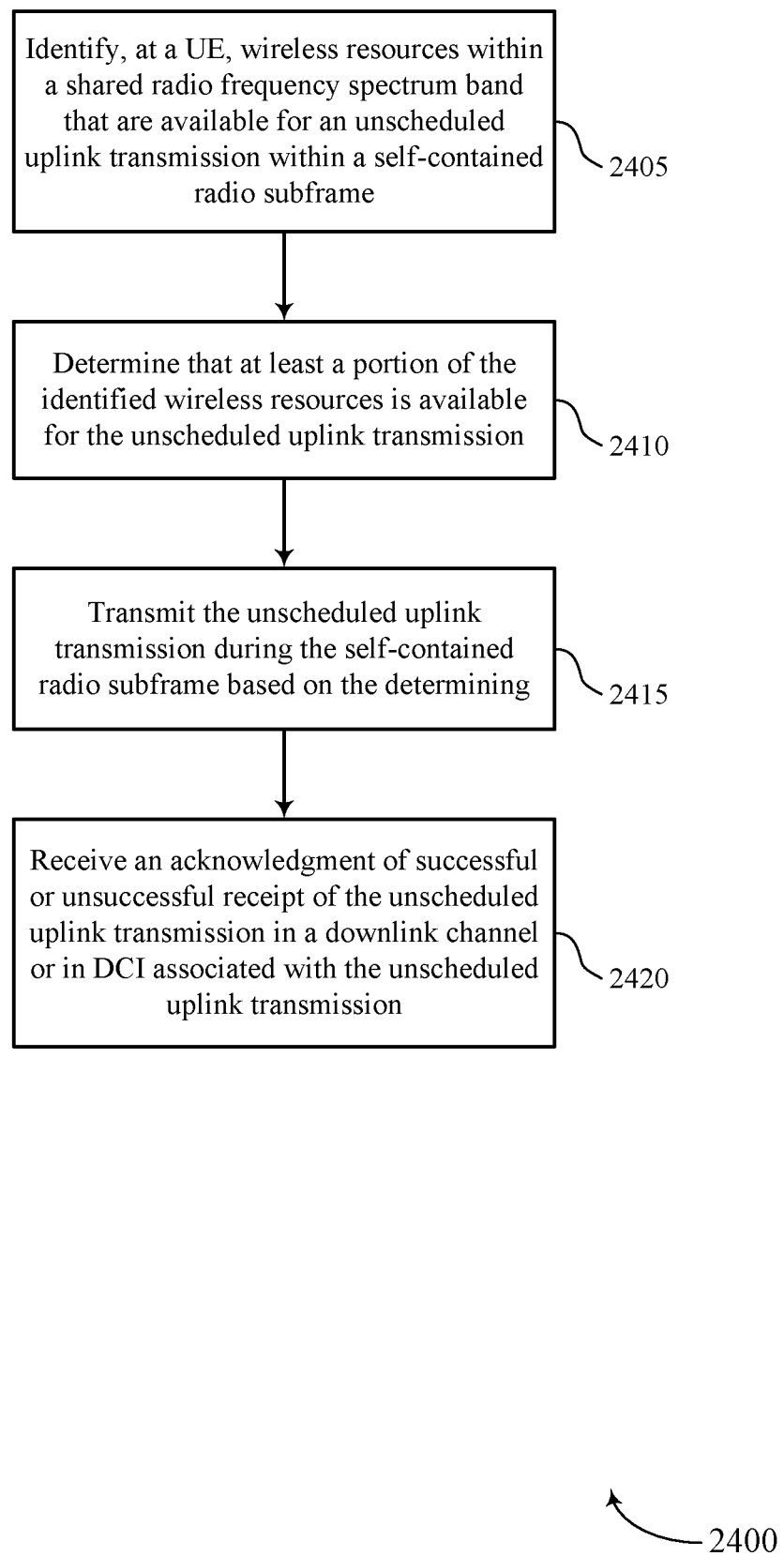

FIG. 24 shows a flowchart illustrating a method 2400 for uplink transmission techniques in shared spectrum wireless communications in accordance with aspects of the present disclosure. The operations of method 2400 may be implemented by a UE 115 or its components as described herein. For example, the operations of method 2400 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2405 the UE 115 may identify wireless resources within a shared radio frequency spectrum band that are available for an unscheduled uplink transmission within a self-contained radio subframe. The operations of block 2405 may be performed according to the methods described herein. In certain examples, aspects of the operations of block 2405 may be performed by a uplink resource identification component as described with reference to FIGS. 12 through 15.

At block 2410 the UE 115 may determine that at least a portion of the identified wireless resources is available for the unscheduled uplink transmission. The operations of block 2410 may be performed according to the methods described herein. In certain examples, aspects of the operations of block 2410 may be performed by a resource availability component as described with reference to FIGS. 12 through 15.

At block 2415 the UE 115 may transmit the unscheduled uplink transmission during the self-contained radio subframe based at least in part on the determining. The operations of block 2415 may be performed according to the methods described herein. In certain examples, aspects of the operations of block 2415 may be performed by a uplink transmission manager as described with reference to FIGS. 12 through 15.

At block 2420 the UE 115 may receive an acknowledgment of successful or unsuccessful receipt of the unscheduled uplink transmission in a downlink channel or in DCI associated with the unscheduled uplink transmission. The operations of block 2420 may be performed according to the methods described herein. In certain examples, aspects of the operations of block 2420 may be performed by a feedback manager as described with reference to FIGS. 12 through 15.

Figure 25:
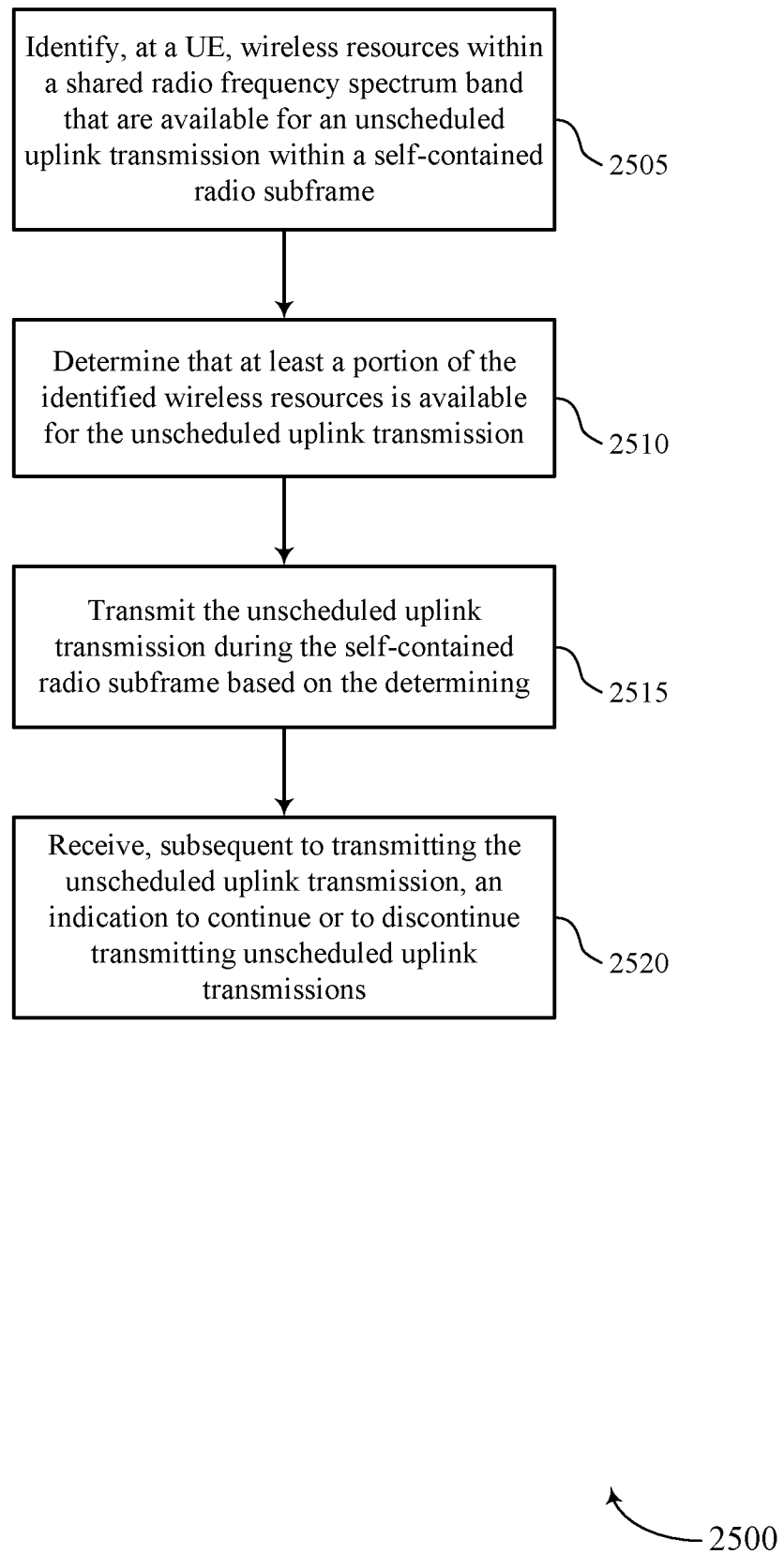

FIG. 25 shows a flowchart illustrating a method 2500 for uplink transmission techniques in shared spectrum wireless communications in accordance with aspects of the present disclosure. The operations of method 2500 may be implemented by a UE 115 or its components as described herein. For example, the operations of method 2500 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2505 the UE 115 may identify wireless resources within a shared radio frequency spectrum band that are available for an unscheduled uplink transmission within a self-contained radio subframe. The operations of block 2505 may be performed according to the methods described herein. In certain examples, aspects of the operations of block 2505 may be performed by a uplink resource identification component as described with reference to FIGS. 12 through 15.

At block 2510 the UE 115 may determine that at least a portion of the identified wireless resources is available for the unscheduled uplink transmission. The operations of block 2510 may be performed according to the methods described herein. In certain examples, aspects of the operations of block 2510 may be performed by a resource availability component as described with reference to FIGS. 12 through 15.

At block 2515 the UE 115 may transmit the unscheduled uplink transmission during the self-contained radio subframe based at least in part on the determining. The operations of block 2515 may be performed according to the methods described herein. In certain examples, aspects of the operations of block 2515 may be performed by a uplink transmission manager as described with reference to FIGS. 12 through 15.

At block 2520 the UE 115 may receive, subsequent to transmitting the unscheduled uplink transmission, an indication to continue or to discontinue transmitting unscheduled uplink transmissions. The operations of block 2520 may be performed according to the methods described herein. In certain examples, aspects of the operations of block 2520 may be performed by a uplink transmission manager as described with reference to FIGS. 12 through 15.

Figure 26:
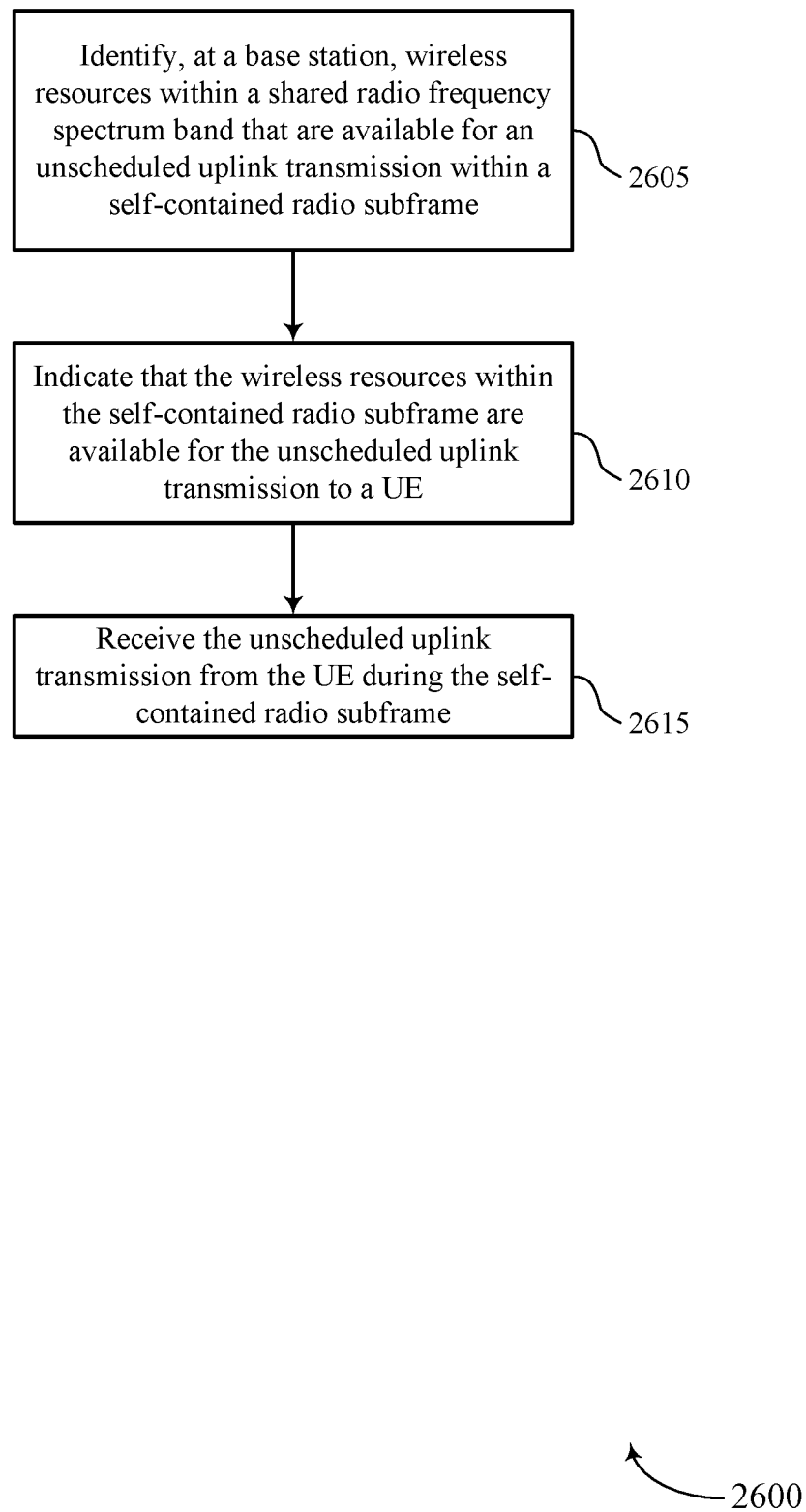

FIG. 26 shows a flowchart illustrating a method 2600 for uplink transmission techniques in shared spectrum wireless communications in accordance with aspects of the present disclosure. The operations of method 2600 may be implemented by a base station 105 or its components as described herein. For example, the operations of method 2600 may be performed by a base station communications manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 2605 the base station 105 may identify wireless resources within a shared radio frequency spectrum band that are available for an unscheduled uplink transmission within a self-contained radio subframe. The operations of block 2605 may be performed according to the methods described herein. In certain examples, aspects of the operations of block 2605 may be performed by a uplink resource identification component as described with reference to FIGS. 16 through 19.

At block 2610 the base station 105 may indicate that the wireless resources within the self-contained radio subframe are available for the unscheduled uplink transmission to a UE. The operations of block 2610 may be performed according to the methods described herein. In certain examples, aspects of the operations of block 2610 may be performed by a unscheduled uplink transmission manager as described with reference to FIGS. 16 through 19.

At block 2615 the base station 105 may receive the unscheduled uplink transmission from the UE during the self-contained radio subframe. The operations of block 2615 may be performed according to the methods described herein. In certain examples, aspects of the operations of block 2615 may be performed by a uplink transmission manager as described with reference to FIGS. 16 through 19.

Figure 27:
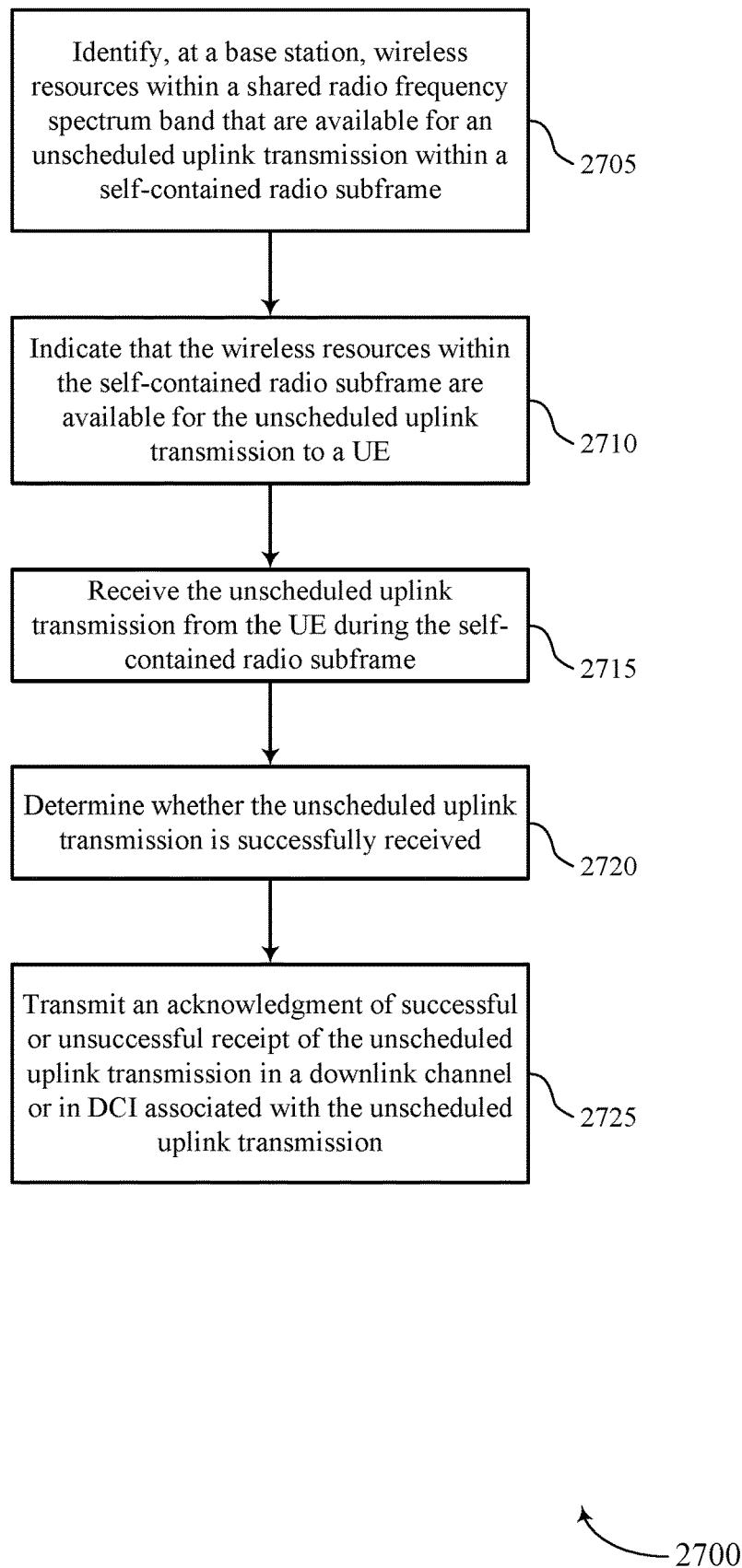

FIG. 27 shows a flowchart illustrating a method 2700 for uplink transmission techniques in shared spectrum wireless communications in accordance with aspects of the present disclosure. The operations of method 2700 may be implemented by a base station 105 or its components as described herein. For example, the operations of method 2700 may be performed by a base station communications manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 2705 the base station 105 may identify wireless resources within a shared radio frequency spectrum band that are available for an unscheduled uplink transmission within a self-contained radio subframe. The operations of block 2705 may be performed according to the methods described herein. In certain examples, aspects of the operations of block 2705 may be performed by a uplink resource identification component as described with reference to FIGS. 16 through 19.

At block 2710 the base station 105 may indicate that the wireless resources within the self-contained radio subframe are available for the unscheduled uplink transmission to a UE. The operations of block 2710 may be performed according to the methods described herein. In certain examples, aspects of the operations of block 2710 may be performed by a unscheduled uplink transmission manager as described with reference to FIGS. 16 through 19.

At block 2715 the base station 105 may receive the unscheduled uplink transmission from the UE during the self-contained radio subframe. The operations of block 2715 may be performed according to the methods described herein. In certain examples, aspects of the operations of block 2715 may be performed by a uplink transmission manager as described with reference to FIGS. 16 through 19.

At block 2720 the base station 105 may determine whether the unscheduled uplink transmission is successfully received. The operations of block 2720 may be performed according to the methods described herein. In certain examples, aspects of the operations of block 2720 may be performed by a feedback manager as described with reference to FIGS. 16 through 19.

At block 2725 the base station 105 may transmit an acknowledgment of successful or unsuccessful receipt of the unscheduled uplink transmission in a downlink channel or in DCI associated with the unscheduled uplink transmission. The operations of block 2725 may be performed according to the methods described herein. In certain examples, aspects of the operations of block 2725 may be performed by a feedback manager as described with reference to FIGS. 16 through 19.

Figure 28:
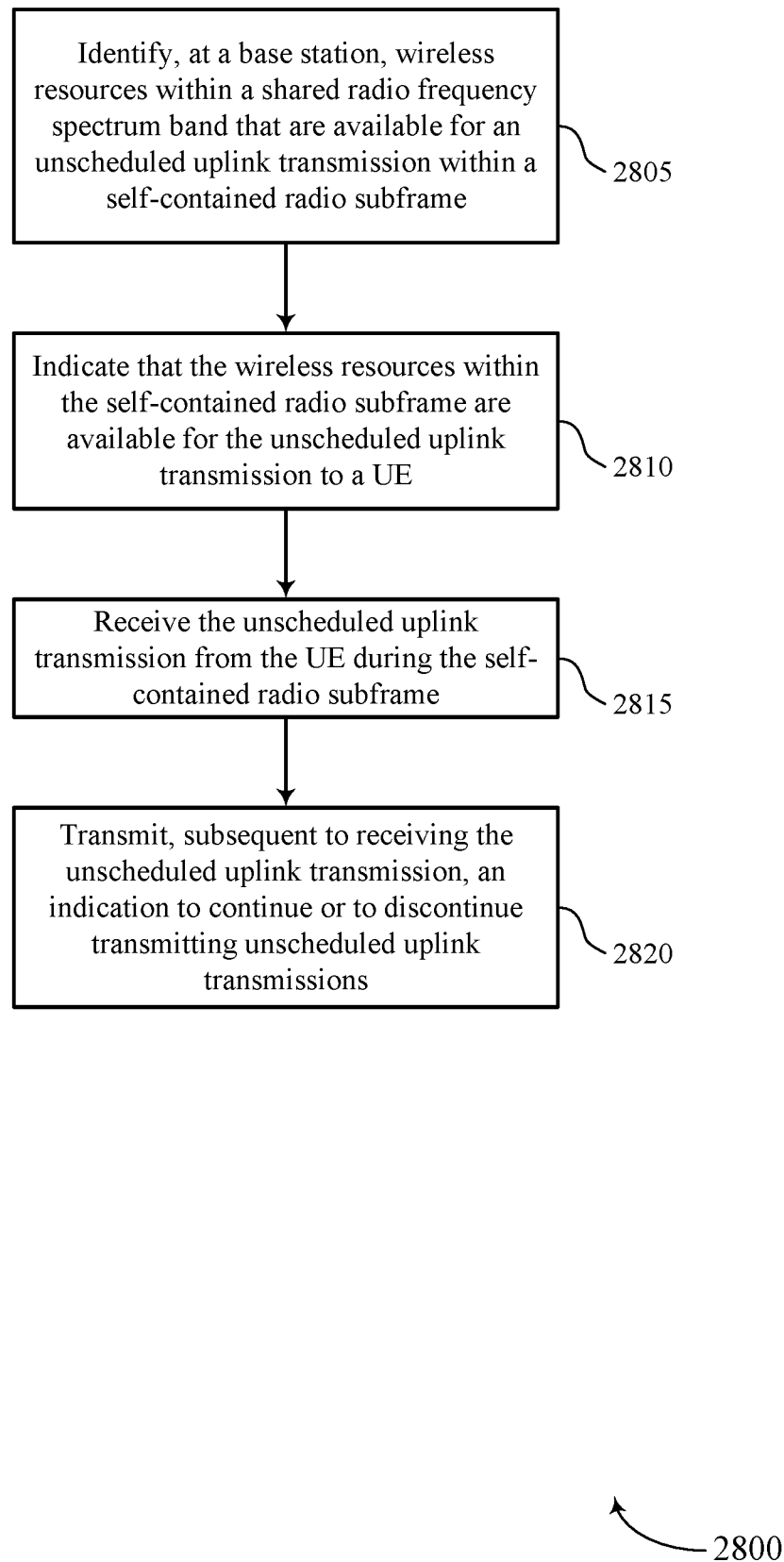

FIG. 28 shows a flowchart illustrating a method 2800 for uplink transmission techniques in shared spectrum wireless communications in accordance with aspects of the present disclosure. The operations of method 2800 may be implemented by a base station 105 or its components as described herein. For example, the operations of method 2800 may be performed by a base station communications manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 2805 the base station 105 may identify wireless resources within a shared radio frequency spectrum band that are available for an unscheduled uplink transmission within a self-contained radio subframe. The operations of block 2805 may be performed according to the methods described herein. In certain examples, aspects of the operations of block 2805 may be performed by a uplink resource identification component as described with reference to FIGS. 16 through 19.

At block 2810 the base station 105 may indicate that the wireless resources within the self-contained radio subframe are available for the unscheduled uplink transmission to a UE. The operations of block 2810 may be performed according to the methods described herein. In certain examples, aspects of the operations of block 2810 may be performed by a unscheduled uplink transmission manager as described with reference to FIGS. 16 through 19.

At block 2815 the base station 105 may receive the unscheduled uplink transmission from the UE during the self-contained radio subframe. The operations of block 2815 may be performed according to the methods described herein. In certain examples, aspects of the operations of block 2815 may be performed by a uplink transmission manager as described with reference to FIGS. 16 through 19.

At block 2820 the base station 105 may transmit, subsequent to receiving the unscheduled uplink transmission, an indication to continue or to discontinue transmitting unscheduled uplink transmissions. The operations of block 2820 may be performed according to the methods described herein. In certain examples, aspects of the operations of block 2820 may be performed by a uplink transmission manager as described with reference to FIGS. 16 through 19.

Figure 29:
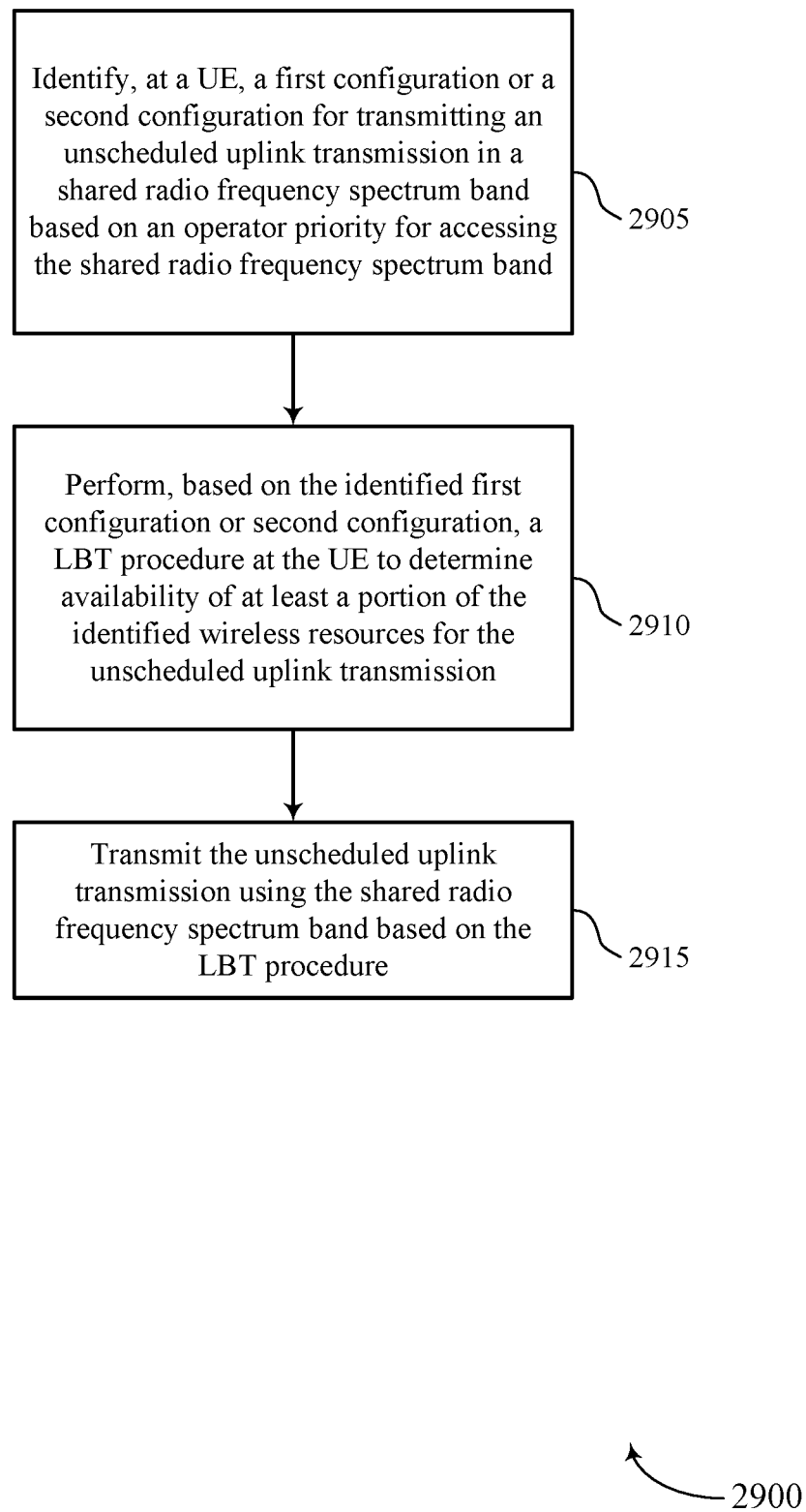

FIG. 29 shows a flowchart illustrating a method 2900 for uplink transmission techniques in shared spectrum wireless communications in accordance with aspects of the present disclosure. The operations of method 2900 may be implemented by a UE 115 or its components as described herein. For example, the operations of method 2900 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2905 the UE 115 may identify a first configuration or a second configuration for transmitting an unscheduled uplink transmission in a shared radio frequency spectrum band based at least in part on an operator priority for accessing the shared radio frequency spectrum band. The operations of block 2905 may be performed according to the methods described herein. In certain examples, aspects of the operations of block 2905 may be performed by a uplink configuration component as described with reference to FIGS. 12 through 15.

At block 2910 the UE 115 may perform, based at least in part on the identified first configuration or second configuration, a LBT procedure at the UE to determine availability of at least a portion of the identified wireless resources for the unscheduled uplink transmission. The operations of block 2910 may be performed according to the methods described herein. In certain examples, aspects of the operations of block 2910 may be performed by a LBT component as described with reference to FIGS. 12 through 15.

At block 2915 the UE 115 may transmit the unscheduled uplink transmission using the shared radio frequency spectrum band based at least in part on the LBT procedure. The operations of block 2915 may be performed according to the methods described herein. In certain examples, aspects of the operations of block 2915 may be performed by a uplink transmission manager as described with reference to FIGS. 12 through 15.

Figure 30:
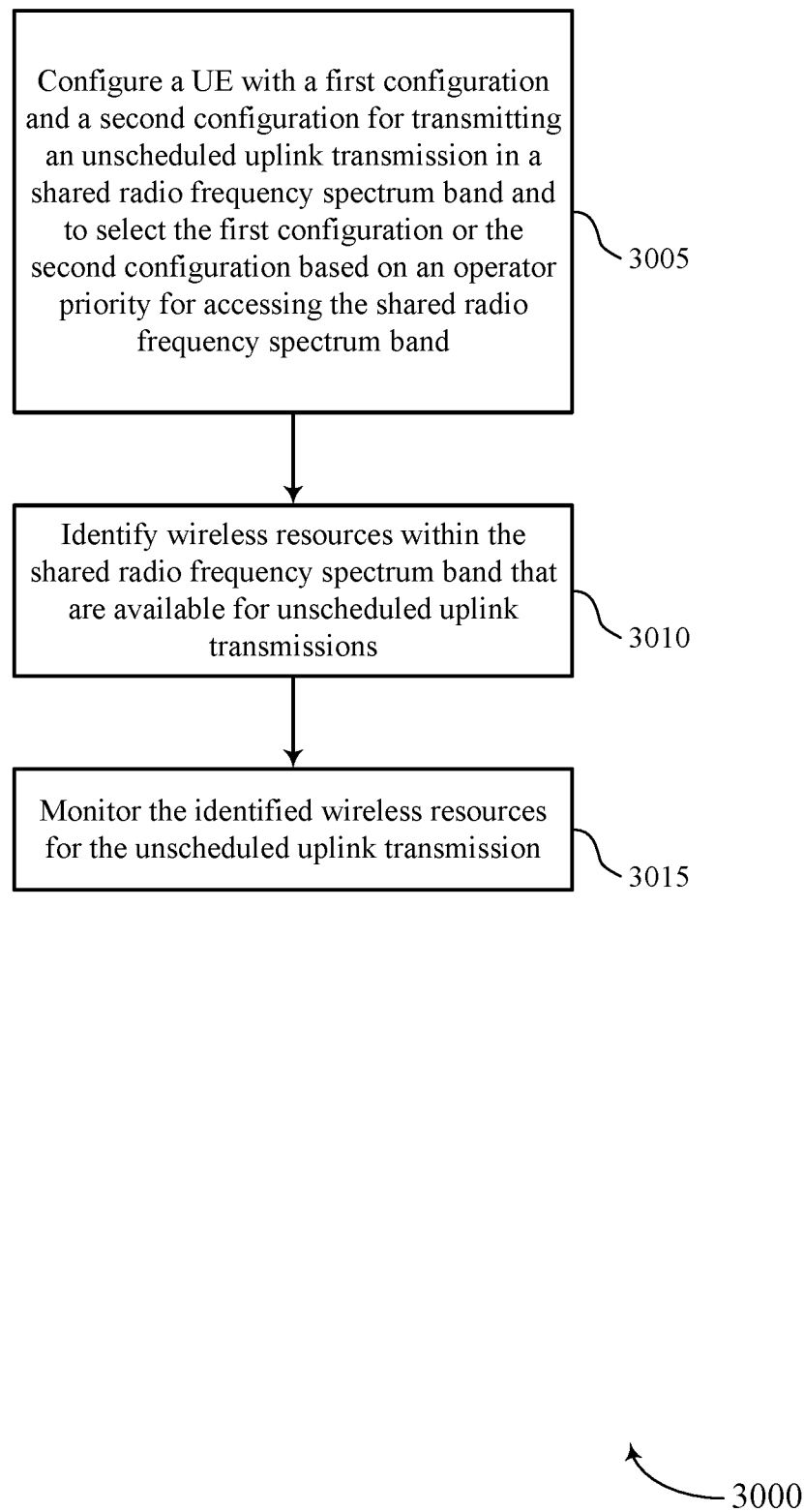

FIG. 30 shows a flowchart illustrating a method 3000 for uplink transmission techniques in shared spectrum wireless communications in accordance with aspects of the present disclosure. The operations of method 3000 may be implemented by a base station 105 or its components as described herein. For example, the operations of method 3000 may be performed by a base station communications manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 3005 the base station 105 may configure a UE with a first configuration and a second configuration for transmitting an unscheduled uplink transmission in a shared radio frequency spectrum band and to select the first configuration or the second configuration based at least in part on an operator priority for accessing the shared radio frequency spectrum band. The operations of block 3005 may be performed according to the methods described herein. In certain examples, aspects of the operations of block 3005 may be performed by a uplink configuration component as described with reference to FIGS. 16 through 19.

At block 3010 the base station 105 may identify wireless resources within the shared radio frequency spectrum band that are available for unscheduled uplink transmissions. The operations of block 3010 may be performed according to the methods described herein. In certain examples, aspects of the operations of block 3010 may be performed by a uplink resource identification component as described with reference to FIGS. 16 through 19.

At block 3015 the base station 105 may monitor the identified wireless resources for the unscheduled uplink transmission. The operations of block 3015 may be performed according to the methods described herein. In certain examples, aspects of the operations of block 3015 may be performed by a uplink transmission manager as described with reference to FIGS. 16 through 19.

Figure 31:
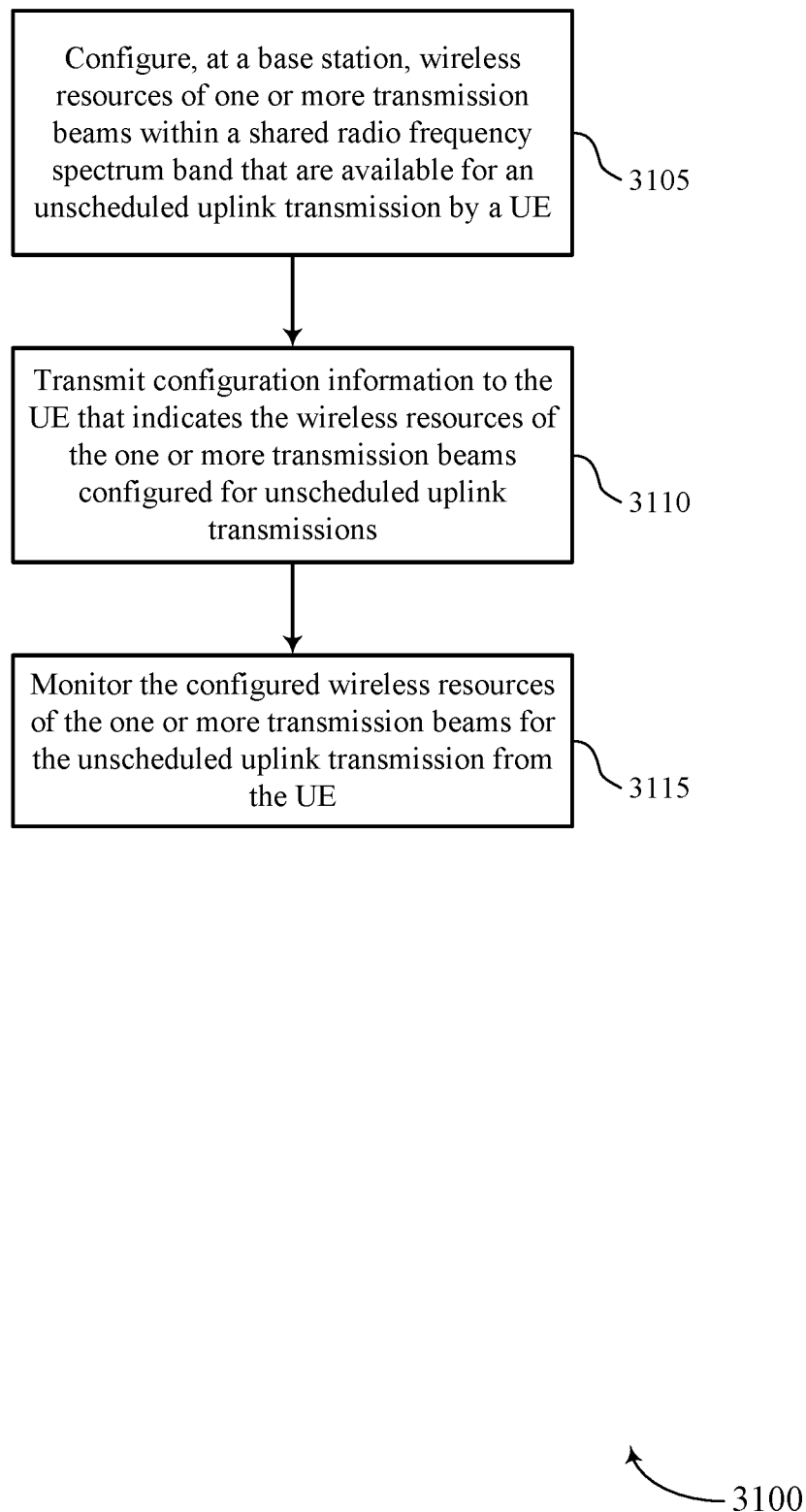

FIG. 31 shows a flowchart illustrating a method 3100 for uplink transmission techniques in shared spectrum wireless communications in accordance with aspects of the present disclosure. The operations of method 3100 may be implemented by a base station 105 or its components as described herein. For example, the operations of method 3100 may be performed by a base station communications manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At block 3105 the base station 105 may configure wireless resources of one or more transmission beams within a shared radio frequency spectrum band that are available for an unscheduled uplink transmission by a UE. The operations of block 3105 may be performed according to the methods described herein. In certain examples, aspects of the operations of block 3105 may be performed by a transmission beam manager as described with reference to FIGS. 16 through 19.

At block 3110 the base station 105 may transmit configuration information to the UE that indicates the wireless resources of the one or more transmission beams configured for unscheduled uplink transmissions. The operations of block 3110 may be performed according to the methods described herein. In certain examples, aspects of the operations of block 3110 may be performed by a uplink resource identification component as described with reference to FIGS. 16 through 19.

At block 3115 the base station 105 may monitor the configured wireless resources of the one or more transmission beams for the unscheduled uplink transmission from the UE. The operations of block 3115 may be performed according to the methods described herein. In certain examples, aspects of the operations of block 3115 may be performed by a uplink transmission manager as described with reference to FIGS. 16 through 19.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a user equipment (UE), a plurality of uplink configurations from a base station, the plurality of uplink configurations each including parameters for transmission of uplink data in one or more unscheduled uplink transmissions from the UE to the base station, wherein the parameters for each of the uplink configurations comprise:
a rank indication;
a number of transport blocks (TBs) to be carried in each unscheduled uplink transmission according to the uplink configuration;
a scheduling set size that indicates a size of each unscheduled uplink transmission according to the uplink configuration;
an interlace allocation for each unscheduled uplink transmission according to the uplink configuration;
a number of configured hybrid acknowledgment repeat request (HARQ) processes for the number of TBs to be carried in each unscheduled uplink transmission according to the uplink configuration;
an acknowledgment/negative-acknowledgment (ACK/NACK) bundling scheme for each unscheduled uplink transmission according to the uplink configuration;
a scaling factor to be used to determine uplink control information (UCI) resources for each unscheduled uplink transmission according to the uplink configuration, the scaling factor based at least in part on the rank indication and number of TBs; and
a number of repetitions for each unscheduled uplink transmission according to the uplink configuration;
receiving, at the UE, a dynamic indication of a first uplink configuration of the plurality of uplink configurations to be used for a first unscheduled uplink transmission from the UE to the base station; and
transmitting the first unscheduled uplink transmission using the first uplink configuration.

2. The method of claim 1, wherein the receiving the plurality of uplink configurations comprises:
receiving radio resource control (RRC) signaling from the base station that includes the plurality of uplink configurations.

3. The method of claim 1, wherein the receiving the dynamic indication of the first uplink configuration comprises:
receiving downlink control information (DCI) or a medium access control (MAC) control element from the base station that indicates the first uplink configuration is to be used for the first unscheduled uplink transmission.

4. The method of claim 1, wherein each uplink configuration of the plurality of uplink configurations comprises parameters associated with an unscheduled uplink transmission, the parameters including a demodulation reference signal (DMRS) configuration for each unscheduled uplink transmission according to the uplink configuration.

5. The method of claim 1, wherein each of the plurality of uplink configurations includes an identification index number, and wherein the dynamic indication includes the identification index number of the first uplink configuration.

6. The method of claim 1, wherein the dynamic indication of the first uplink configuration of the plurality of uplink configurations is used for a plurality of unscheduled uplink transmissions from the UE to the base station until a second dynamic indication indicates a different uplink configuration is to be used for uplink transmissions.

7. The method of claim 1, wherein the transmitting comprises:
identifying, at the UE, wireless resources within a shared radio frequency spectrum band that are available for unscheduled uplink transmissions;
determining that at least a portion of the identified wireless resources are available for the first unscheduled uplink transmission; and
transmitting the first unscheduled uplink transmission based at least in part on the determining.

8. The method of claim 7, wherein the determining comprises:
performing a listen-before-talk (LBT) procedure at the UE to determine availability of at least the portion of the identified wireless resources for the first unscheduled uplink transmission.

9. The method of claim 7, wherein the identifying comprises:
receiving a first downlink transmission in a first portion of a self-contained radio subframe that indicates that a second portion of the self-contained radio subframe is available for the unscheduled uplink transmission, and wherein the first downlink transmission includes the dynamic indication of the first uplink configuration of the plurality of uplink configurations.

10. The method of claim 1, further comprising:
receiving, subsequent to transmitting the first unscheduled uplink transmission, an acknowledgment indicating successful or unsuccessful receipt of the first unscheduled uplink transmission at the base station.

11. A method for wireless communication, comprising:
configuring a user equipment (UE) with a plurality of uplink configurations, the plurality of uplink configurations each including parameters for transmission of uplink data in one or more unscheduled uplink transmissions from the UE to a base station, wherein the parameters for each of the uplink configurations comprise:
a rank indication;
a number of transport blocks (TBs) to be carried in each unscheduled uplink transmission according to the uplink configuration;
a scheduling set size that indicates a size of each unscheduled uplink transmission according to the uplink configuration;
an interlace allocation for each unscheduled uplink transmission according to the uplink configuration;
a number of configured hybrid acknowledgment repeat request (HARQ) processes for the number of TBs to be carried in each unscheduled uplink transmission according to the uplink configuration;

an acknowledgment/negative-acknowledgment (ACK/NACK) bundling scheme for each unscheduled uplink transmission according to the uplink configuration;
a scaling factor to be used to determine uplink control information (UCI) resources for each unscheduled uplink transmission according to the uplink configuration, the scaling factor based at least in part on the rank indication and number of TBs; and
a number of repetitions for each unscheduled uplink transmission according to the uplink configuration;
identifying wireless resources that are available for unscheduled uplink transmissions;
transmitting, to the UE, an indication of the identified wireless resources that are available for unscheduled uplink transmissions and a first uplink configuration of the plurality of uplink configurations to be used for unscheduled uplink transmissions using the identified wireless resources; and
monitoring the identified wireless resources for a first unscheduled uplink transmission from the UE.

12. The method of claim 11, wherein the configuring the UE with the plurality of uplink configurations comprises:
transmitting radio resource control (RRC) signaling to the UE that includes the plurality of uplink configurations.

13. The method of claim 11, wherein the transmitting the indication of the identified wireless resources and the first uplink configuration comprises:
transmitting downlink control information (DCI) or a medium access control (MAC) control element to the UE that indicates the first uplink configuration is to be used for unscheduled uplink transmissions in the identified wireless resources.

14. The method of claim 11, wherein each uplink configuration of the plurality of uplink configurations comprises parameters associated with an unscheduled uplink transmission, the parameters
a demodulation reference signal (DMRS) configuration for each unscheduled uplink transmission according to the uplink configuration.

15. The method of claim 11, further comprising:
receiving the first unscheduled uplink transmission from the UE according to the first uplink configuration;
determining whether information contained in the first unscheduled uplink transmission is successfully decoded at the base station; and
transmitting a downlink transmission that includes an acknowledgment/negative-acknowledgment (ACK/NACK) indicating successful or unsuccessful receipt of the first unscheduled uplink transmission at the base station.

16. An apparatus for wireless communication, comprising:
a processor;
memory in electronic communication with the processor; and
instructions stored in the memory and operable, when executed by the processor, to cause the apparatus to:
receive a plurality of uplink configurations from a base station, the plurality of uplink configurations each including parameters for transmission of uplink data in one or more unscheduled uplink transmissions from a user equipment (UE) to the base station, wherein the parameters for each of the uplink configurations comprise:
a rank indication;
a number of transport blocks (TBs) to be carried in each unscheduled uplink transmission according to the uplink configuration;
a scheduling set size that indicates a size of each unscheduled uplink transmission according to the uplink configuration;
an interlace allocation for each unscheduled uplink transmission according to the uplink configuration;
a number of configured hybrid acknowledgment repeat request (HARQ) processes for the number of TBs to be carried in each unscheduled uplink transmission according to the uplink configuration;
an acknowledgment/negative-acknowledgment (ACK/NACK) bundling scheme for each unscheduled uplink transmission according to the uplink configuration;
a scaling factor to be used to determine uplink control information (UCI) resources for each unscheduled uplink transmission according to the uplink configuration, the scaling factor based at least in part on the rank indication and number of TB s; and
a number of repetitions for each unscheduled uplink transmission according to the uplink configuration;
receive a dynamic indication of a first uplink configuration of the plurality of uplink configurations to be used for a first unscheduled uplink transmission from the UE to the base station; and
transmit the first unscheduled uplink transmission using the first uplink configuration.

17. The apparatus of claim 16, wherein the instructions are further operable to cause the apparatus to:
receive radio resource control (RRC) signaling from the base station that includes the plurality of uplink configurations.

18. The apparatus of claim 16, wherein the instructions are further operable to cause the apparatus to:
receive downlink control information (DCI) or a medium access control (MAC) control element from the base station that indicates the first uplink configuration is to be used for the first unscheduled uplink transmission.

19. The apparatus of claim 16, wherein each uplink configuration of the plurality of uplink configurations comprises parameters associated with an unscheduled uplink transmission, the parameters including
a demodulation reference signal (DMRS) configuration for each unscheduled uplink transmission according to the uplink configuration; or.

20. The apparatus of claim 16, wherein each of the plurality of uplink configurations includes an identification index number, and wherein the dynamic indication includes the identification index number of the first uplink configuration.

21. The apparatus of claim 16, wherein the dynamic indication of the first uplink configuration of the plurality of uplink configurations is used for a plurality of unscheduled uplink transmissions from the UE to the base station until a second dynamic indication indicates a different uplink configuration is to be used for uplink transmissions.

22. The apparatus of claim 16, wherein the instructions are further operable to cause the apparatus to:
identify wireless resources within a shared radio frequency spectrum band that are available for unscheduled uplink transmissions;

determine that at least a portion of the identified wireless resources are available for the first unscheduled uplink transmission; and transmit the first unscheduled uplink transmission based at least in part on the determination.

23. The apparatus of claim 22, wherein the instructions are further operable to cause the apparatus to:

perform a listen-before-talk (LBT) procedure to determine availability of at least the portion of the identified wireless resources for the first unscheduled uplink transmission.

24. The apparatus of claim 22, wherein the instructions are further operable to cause the apparatus to:

receive a first downlink transmission in a first portion of a self-contained radio subframe that indicates that a second portion of the self-contained radio subframe is available for the unscheduled uplink transmission, and wherein the first downlink transmission includes the dynamic indication of the first uplink configuration of the plurality of uplink configurations.

25. The apparatus of claim 16, wherein the instructions are further operable to cause the apparatus to:

receive, subsequent to transmission of the first unscheduled uplink transmission, an acknowledgment indicating successful or unsuccessful receipt of the first unscheduled uplink transmission at the base station.

26. An apparatus for wireless communication, comprising:

a processor;

memory in electronic communication with the processor; and instructions stored in the memory and operable, when executed by the processor, to cause the apparatus to:

configure a user equipment (UE) with a plurality of uplink configurations, the plurality of uplink configurations each including parameters for transmission of uplink data in one or more unscheduled uplink transmissions from the UE to a base station, wherein the parameters for each of the uplink configurations comprise:

a rank indication;

a number of transport blocks (TBs) to be carried in each unscheduled uplink transmission according to the uplink configuration;

a scheduling set size that indicates a size of each unscheduled uplink transmission according to the uplink configuration;

an interlace allocation for each unscheduled uplink transmission according to the uplink configuration;

a number of configured hybrid acknowledgment repeat request (HARQ) processes for the number of TBs to be carried in each unscheduled uplink transmission according to the uplink configuration;

an acknowledgment/negative-acknowledgment (ACK/NACK) bundling scheme for each unscheduled uplink transmission according to the uplink configuration;

a scaling factor to be used to determine uplink control information (UCI) resources for each unscheduled uplink transmission according to the uplink configuration, the scaling factor based at least in part on the rank indication and number of TBs; and a number of repetitions for each unscheduled uplink transmission according to the uplink configuration;

identify wireless resources that are available for unscheduled uplink transmissions;

transmit, to the UE, an indication of the identified wireless resources that are available for unscheduled uplink transmissions and a first uplink configuration of the plurality of uplink configurations to be used for unscheduled uplink transmissions using the identified wireless resources; and monitor the identified wireless resources for a first unscheduled uplink transmission from the UE.

27. The apparatus of claim 26, wherein the instructions are further operable to cause the apparatus to:

transmit radio resource control (RRC) signaling to the UE that includes the plurality of uplink configurations.

28. The apparatus of claim 26, wherein the instructions are further operable to cause the apparatus to:

transmit downlink control information (DCI) or a medium access control (MAC) control element to the UE that indicates the first uplink configuration is to be used for unscheduled uplink transmissions in the identified wireless resources.

29. The apparatus of claim 26, wherein each uplink configuration of the plurality of uplink configurations comprises parameters associated with an unscheduled uplink transmission, the parameters including a demodulation reference signal (DMRS) configuration for each unscheduled uplink transmission according to the uplink configuration.

30. The apparatus of claim 26, wherein the instructions are further operable to cause the apparatus to:

receive the first unscheduled uplink transmission from the UE according to the first uplink configuration;

determine whether information contained in the first unscheduled uplink transmission is successfully decoded at the base station; and transmit a downlink transmission that includes an acknowledgment/negative-acknowledgment (ACK/NACK) indicating successful or unsuccessful receipt of the first unscheduled uplink transmission at the base station.

\* \* \* \* \*